US012158040B1

(12) United States Patent
Kelley et al.

(10) Patent No.: US 12,158,040 B1
(45) Date of Patent: Dec. 3, 2024

(54) COMPOUND FENESTRATION ASSEMBLY MULL JOINTS AND METHODS

(71) Applicant: ANDERSEN CORPORATION, Bayport, MN (US)

(72) Inventors: Timothy J. Kelley, Stillwater, MN (US); Duane Fier, Hudson, WI (US); Jeremiah Boe, Lino Lakes, MN (US); Jon Dekko, Stillwater, MN (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 18/243,837

(22) Filed: Sep. 8, 2023

Related U.S. Application Data

(63) Continuation of application No. 17/954,955, filed on Sep. 28, 2022, now Pat. No. 11,773,645, which is a continuation of application No. 17/205,603, filed on Mar. 18, 2021, now Pat. No. 11,499,364, which is a continuation of application No. 16/811,222, filed on Mar. 6, 2020, now Pat. No. 10,968,687, which is a continuation of application No. 16/284,156, filed on Feb. 25, 2019, now Pat. No. 10,626,664, which is a continuation-in-part of application No. 15/916,641, filed on Mar. 9, 2018, now Pat. No. 10,233,688, which is a continuation-in-part of application No. 15/044,610, filed on Feb. 16, 2016, now Pat. No. 9,932,765.

(60) Provisional application No. 62/116,826, filed on Feb. 16, 2015.

(51) Int. Cl.
*E06B 3/96* (2006.01)
*E06B 1/60* (2006.01)

(52) U.S. Cl.
CPC .......... *E06B 3/9624* (2013.01); *E06B 1/6007* (2013.01)

(58) Field of Classification Search
CPC ........ E06B 1/6007; E06B 1/366; E06B 1/363; E06B 1/524; E06B 3/9624; E06B 3/964; E06B 3/673; E04B 1/6179; E04B 1/6175
See application file for complete search history.

(56) References Cited

U.S. PATENT DOCUMENTS

| | | |
|---|---|---|
| 1,760,265 A | 5/1930 | Carr |
| 3,103,710 A | 9/1963 | Fredrickson |
| 3,711,995 A | 1/1973 | Anderson |

(Continued)

FOREIGN PATENT DOCUMENTS

| | | | | |
|---|---|---|---|---|
| DE | 102008029935 B3 * | 12/2009 | ........... E04B 1/6179 |
| GB | 2273123 A | 6/1994 | |
| WO | WO-2010013233 A2 * | 2/2010 | ............. E04C 2/543 |

OTHER PUBLICATIONS

"Aluminum Structural Reinforcement (Factory Application)," *Sierra Pacific Windows*, Updated May 2013.

*Primary Examiner* — Christine T Cajilig
(74) *Attorney, Agent, or Firm* — Mueting Raasch Group

(57) ABSTRACT

Compound fenestration assembly mull joints, compound fenestration assemblies using those mull joints, and methods of making and using the same are described herein. The mull joints in compound fenestration assemblies as described herein use universal joining strips to form both sides of a mull joint, as well as other universal components such as, e.g., corner gussets, locator plates, end plugs, seal members, etc. that may be used as needed to form mull joints as required in a compound fenestration assembly.

20 Claims, 63 Drawing Sheets

(56) References Cited

U.S. PATENT DOCUMENTS

| | | | | |
|---|---|---|---|---|
| 3,923,411 | A | 12/1975 | Berghman | |
| 3,967,911 | A | 7/1976 | Miers | |
| 3,975,875 | A | 8/1976 | Goss, Jr. | |
| 4,076,439 | A | 2/1978 | Sakashita | |
| 4,188,764 | A * | 2/1980 | Gode | E04H 15/02 52/656.1 |
| 4,272,941 | A * | 6/1981 | Hasselbacher | E06B 3/26307 52/844 |
| 4,328,644 | A | 5/1982 | Scott et al. | |
| 4,691,489 | A | 9/1987 | Shea, Jr. | |
| 4,809,463 | A | 3/1989 | Schroder et al. | |
| 4,810,321 | A | 3/1989 | Wank et al. | |
| 4,811,533 | A | 3/1989 | Wetsel | |
| 4,924,647 | A | 5/1990 | Drucker | |
| 5,076,034 | A | 12/1991 | Bandy | |
| 5,435,106 | A | 7/1995 | Garries et al. | |
| 5,485,705 | A | 1/1996 | Guillemet | |
| 5,540,019 | A | 7/1996 | Beske et al. | |
| 5,625,992 | A | 5/1997 | Strick et al. | |
| 5,910,086 | A | 6/1999 | Fisher | |
| 5,941,033 | A | 8/1999 | Adams | |
| 5,941,046 | A | 8/1999 | Prather | |
| 6,082,674 | A | 7/2000 | White et al. | |
| 6,138,419 | A | 10/2000 | Sekiguchi et al. | |
| 6,148,883 | A | 11/2000 | Wilson | |
| 6,173,542 | B1 | 1/2001 | Wright | |
| 6,360,498 | B1 * | 3/2002 | Westphal | E06B 1/6007 52/204.5 |
| 6,389,763 | B1 | 5/2002 | Clauss | |
| 6,449,903 | B1 | 9/2002 | Borcherding | |
| 6,494,002 | B1 | 12/2002 | Gieseke | |
| 6,500,558 | B2 | 12/2002 | Yamaguchi | |
| 6,523,311 | B2 | 2/2003 | Edger | |
| 6,560,944 | B1 | 5/2003 | Wilson | |
| 6,662,512 | B2 * | 12/2003 | Westphal | E06B 1/6007 52/204.5 |
| 6,722,089 | B2 * | 4/2004 | Budzinski | E06B 1/6007 52/204.5 |
| 6,745,523 | B2 | 6/2004 | Petta | |
| D493,234 | S | 7/2004 | Vastine | |
| 6,807,778 | B2 | 10/2004 | Engebretson | |
| 6,811,893 | B2 | 11/2004 | Wakayama et al. | |
| 6,829,865 | B2 | 12/2004 | Smith | |
| 7,010,888 | B2 | 3/2006 | Tumlin et al. | |
| 7,454,865 | B2 | 11/2008 | Kerscher | |
| 7,481,028 | B2 * | 1/2009 | Tufts | E06B 1/366 52/204.5 |
| 8,061,103 | B2 * | 11/2011 | McMahon | E06B 1/6007 52/584.1 |
| 8,266,851 | B2 * | 9/2012 | Campbell | E06B 1/6007 49/504 |
| 8,464,480 | B2 | 6/2013 | Libby et al. | |
| 8,756,884 | B2 | 6/2014 | Tufts et al. | |
| 9,316,040 | B2 * | 4/2016 | Saunders | E06B 1/6007 |
| 9,932,765 | B1 | 4/2018 | Kelley et al. | |
| 10,233,688 | B1 | 3/2019 | Kelley et al. | |
| 10,626,664 | B1 | 4/2020 | Kelley et al. | |
| 10,968,687 | B1 | 4/2021 | Kelley et al. | |
| 11,499,364 | B1 | 11/2022 | Kelley et al. | |
| 2003/0217523 | A1 * | 11/2003 | Budzinski | E06B 1/6007 52/204.5 |
| 2004/0187408 | A1 | 9/2004 | Smith | |
| 2004/0200163 | A1 | 10/2004 | Wright | |
| 2005/0050815 | A1 | 3/2005 | Engebretson | |
| 2005/0193654 | A1 | 9/2005 | Primozich | |
| 2010/0192488 | A1 * | 8/2010 | Campbell | E06B 1/366 52/204.5 |
| 2015/0010350 | A1 * | 1/2015 | Emanuel | E04B 1/74 403/364 |

* cited by examiner

COMPOUND FENESTRATION ASSEMBLY MULL JOINTS AND METHODS

RELATED APPLICATIONS

This application is a continuation of U.S. patent application Ser. No. 17/954,955, filed Sep. 28, 2022, which is a continuation of U.S. patent application Ser. No. 17/205,603, filed on Mar. 18, 2021, now U.S. Pat. No. 11,499,364, which is a continuation of U.S. patent application Ser. No. 16/811,222, filed on Mar. 6, 2020, now U.S. Pat. No. 10,968,687, which is a continuation of U.S. patent application Ser. No. 16/284,156, filed on Feb. 25, 2019, now U.S. U.S. Pat. No. 10,626,664, which is a continuation-in-part of U.S. patent application Ser. No. 15/916,641 entitled "COMPOUND FENESTRATION ASSEMBLY MULL JOINTS AND METHODS" filed on Mar. 9, 2018, now U.S. Pat. No. 10,233,688, which is a continuation-in-part of U.S. patent application Ser. No. 15/044,610 entitled "COMPOUND FENESTRATION ASSEMBLY MULL JOINTS AND METHODS" filed on Feb. 16, 2016, now U.S. Pat. No. 9,932,765, which claims the benefit under 35 U.S.C. Section 119 of U.S. Provisional Patent Application Ser. No. 62/116,826 entitled "COMPOUND FENESTRATION ASSEMBLY MULL JOINTS AND METHODS" and filed on Feb. 16, 2015, each of which is incorporated herein by reference in its entirety.

Compound fenestration assembly mull joints, compound fenestration assemblies using those mull joints, and methods of making and using the same are described herein.

BACKGROUND

Compound fenestration assemblies, sometimes referred to as mulled fenestration assemblies, are formed by attaching two or more individual fenestration units (e.g., windows and/or doors) along one or more mull joints to form a combination of windows, doors, or windows and doors, that can be handled and installed as a single assembly, and which give the appearance of being a single assembly. A simple system for joining the component units involves the placing of one or more spacer boards between the units to be joined and installing screws or other fasteners through the frames of the component units, into the one or more spacer boards, to join the units. Other systems for joining the units involve the use of interlocking brackets or other like devices that can be separately installed on the facing surfaces of the frames to be joined and then coupled together to form the compound unit.

Mull joint strength must be sufficient to maintain integrity of the compound fenestration assembly when subjected to, e.g., wind, etc. The need for sufficient mull joint strength may be amplified with an increase in the number of adjacent fenestration units in a given compound fenestration assembly. Furthermore, some compound fenestration assemblies may include factory manufactured mull joints while others may include mull joints which are completed in the field, but which must still provide sufficient strength to resist anticipated wind loads and other forces.

SUMMARY

Compound fenestration assembly mull joints, compound fenestration assemblies using those mull joints, and methods of making and using the same are described herein. In one or more embodiments, the mull joints in compound fenestration assemblies as described herein use universal joining strips to form both sides of a mull joint, as well as other universal components such as, e.g., gussets, corner gussets, locator plates, end plugs, seal members, etc. that may be used as needed to form mull joints as required in a compound fenestration assembly as described herein. As a result, in one or more embodiments, the number of different mull joint components may be reduced as compared to the number of components needed to form known mull joints.

In one or more embodiments, the mull joints used to construct compound fenestration assemblies as described herein do not require disassembly of the fenestration units forming the compound fenestration assembly to connect adjacent fenestration units in a compound fenestration assembly.

In one or more embodiments, the mull joints used to construct compound fenestration assemblies as described herein do not impact visible areas of the individual fenestration units forming the compound fenestration assemblies, e.g., the mull joints do not require fasteners to be located in positions where they could be exposed on one or more of the fenestration units of a compound fenestration assembly as described herein.

In one or more embodiments, the mull joints used to construct compound fenestration assemblies as described herein include mechanically interlocking components that are configured to transfer mechanical loads (e.g., wind loads, etc.) between the fenestration units and, ultimately, to the opening in which the compound fenestration assemblies are located. In one or more embodiments, mechanical loads may also be transferred within the compound fenestration assembly between horizontal and vertical mull joints where horizontal and vertical mull joints intersect in a compound fenestration assembly as described herein.

In one or more embodiments, the mull joints used to construct compound fenestration assemblies as described herein may include components (e.g., flanges, base plates, etc.) to secure the fenestration assembly to one or more frame members of, e.g., a rough opening in a manner that assists in transferring mechanical loads (e.g., wind loads, etc.) between the mull joint and the frame members of the rough opening in which the compound fenestration assemblies are installed.

In one aspect, one or more embodiments of a compound fenestration assembly as described herein may include: a first frame member of a first fenestration unit attached to a second frame member of a second fenestration unit along a mull joint having a first end and a second end, wherein the mull joint defines a mull joint axis extending along a length of the mull joint between the first and second ends of the mull joint, wherein the first and second frame members comprise exterior sides facing in the same direction and interior sides facing in an opposite direction from the exterior sides, wherein an interior/exterior axis extends between the interior and exterior sides in a direction transverse to the mull joint axis. The first frame member of the compound fenestration assembly faces the second frame member across the mull joint, wherein a separation axis extends through the mull joint between the first and second frame members, the separation axis extending in a direction transverse to both the mull joint axis and the interior/exterior axis. The compound fenestration assembly may also include a first joining strip attached to the first frame member of the first fenestration unit, the first joining strip comprising a first end proximate the first end of the mull joint and a second end proximate the second end of the mull joint, wherein the first joining strip comprises a pair of channels extending along the length of the first frame member, wherein each channel of the pair of channels is aligned with the mull joint axis and opens towards the exterior side of the first fenestration unit; and a second joining strip attached to the second frame member of the second fenestration unit, the second joining strip comprising a first end proximate the first end of the mull joint and a second end proximate the second end of the mull joint, wherein the second joining strip comprises a pair of channels extending along the length of the second frame member, wherein each channel of the pair of channels on the second joining strip is aligned with the mull joint axis and opens towards the interior side of the second fenestration unit such that each channel of the pair of channels on the first joining strip mechanically interlocks with one channel of the pair of channels on the second joining strip, wherein the mechanically interlocking channels prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis. The second joining strip is a mirror image of the first joining strip across the mull joint such that the channels on the second joining strip face the channels on the first joining strip and the channels on the second joining strip and the channels on the first joining strip open in opposite directions.

In one or more embodiments of the compound fenestration assemblies described herein, the first joining strip extends over a majority of the length of the first frame member and the second joining strip extends over a majority of the length of the second frame member.

In one or more embodiments of the compound fenestration assemblies described herein, the pair of channels of the first joining strip extend along the entire length of the of the first joining strip and wherein the pair of channels of the second joining strip extend along the entire length of the of the second joining strip.

In one or more embodiments of the compound fenestration assemblies described herein, the interior and exterior sides of the first and second frame members define a frame depth along the interior/exterior axis, and wherein the mechanically interlocking channels on the first and second joining strips are positioned such that a bottom of the channel on the first joining strip that is closest to the interior side of the first frame member is located within 20% or less of the frame depth from the interior side of the first frame member and a bottom of the channel on the second joining strip that is closest to the exterior side of the second frame member is located within 20% or less of the frame depth from the exterior side of the second frame member.

In one or more embodiments of the compound fenestration assemblies described herein, the interior and exterior sides of the first and second frame members define a frame depth along the interior/exterior axis, and wherein the mechanically interlocking channels on the first and second joining strips are positioned such that a bottom of the channel on the first joining strip that is closest to the interior side of the first frame member is located within 15% or less of the frame depth from the interior side of the first frame member and a bottom of the channel on the second joining strip that is closest to the exterior side of the second frame member is located within 15% or less of the frame depth from the exterior side of the second frame member.

In one or more embodiments of the compound fenestration assemblies described herein, a first locator plate is positioned between the first joining strip and the first frame member, the first locator plate comprising a frame surface facing the first frame member and a joining strip surface facing the first joining strip, wherein the frame surface and the first frame member comprise complementary mating features configured to position the first locator plate in one selected location and orientation relative to the first frame member, and wherein the joining strip surface and the first joining strip comprise complementary mating features configured to position the first locator plate in one selected location and orientation relative to the first joining strip such that the first locator plate is configured to position the first joining strip in one selected orientation relative to the first frame member and in one selected location on the first frame member along the interior/exterior axis. In one or more embodiments, a second locator plate is positioned between the second joining strip and the second frame member, the second locator plate comprising a frame surface facing the second frame member and a joining strip surface facing the second joining strip, wherein the frame surface of the second locator plate and the second frame member comprise complementary mating features configured to position the second locator plate in one selected location and orientation relative to the second frame member, and wherein the joining strip surface of the second locator plate and the second joining strip comprise complementary mating features configured to position the second locator plate in one selected location and orientation relative to the second joining strip such that the second locator plate is configured to position the second joining strip in one selected orientation relative to the second frame member and in one selected location on the second frame member along the interior/exterior axis.

In one or more embodiments of the compound fenestration assemblies described herein, the first and second joining strips are separate and discrete lengths of a common profile.

In one or more embodiments of the compound fenestration assemblies described herein, the first and second joining strips consist essentially of one or more non-metallic materials.

In one or more embodiments of the compound fenestration assemblies described herein, the assembly may further comprise: an intermediate end plug cavity formed between the first joining strip and the second joining strip, wherein the intermediate end plug cavity comprises a first opening at the first ends of the first and second joining strips and a second opening at the second ends of the first and second joining strips; and a first end plug comprising a base and a cavity leg extending away from the base, wherein the cavity leg is positioned in the first opening of the intermediate end plug cavity when the base is positioned between the first and second frame members at the first ends of the first and second joining strips, wherein the cavity leg prevents disengagement of the mechanically interlocking channels on the first and second joining strips at the first ends of first and second joining strips. In one or more embodiments, the intermediate end plug cavity is located between the pairs of channels on the first and second joining strips. In one or more embodiments, the assembly further comprises a second end plug comprising a base and a cavity leg extending away from the base, wherein the cavity leg is positioned in the second opening of the intermediate end plug cavity when the base of the second end plug is positioned between the first and second frame members at the second ends of the first and second joining strips, wherein the cavity leg of the second end plug prevents disengagement of the mechanically interlocking channels on the first and second joining strips at the second ends of first and second joining strips. In one or more embodiments of the compound fenestration assemblies described herein, a first end seal member is located between the first and second frame members at the first ends of the first and second joining strips, wherein the first end seal member is located in a first recess between the base of the first end plug and the exterior sides of the first and second frame members, wherein the first end seal member comprises a sealant port in fluid communication with a sealant reservoir positioned between the first and second frame members and the first ends of the first and second joining strips. In one or more embodiments, the assembly further comprises a gusset plate attached to the base of the first end plug, wherein the gusset plate spans the first end of the mull joint such that the base of the first end plug is located between the first ends of the first and second joining strips and the gusset plate, wherein the gusset plate is directly attached to the first and second fenestration units on opposite sides of the first end of the mull joint.

In one or more embodiments of the compound fenestration assemblies described herein, the assembly may further comprise a flanged corner gusset assembly that includes: a first flanged corner gusset attached to the first fenestration unit, wherein the first flanged corner gusset comprises a first gusset plate leg positioned between the first joining strip and the first frame member of the first fenestration unit at the first end of the mull joint; a first base plate attached to the first gusset plate leg, wherein the first base plate extends over and is attached to a frame member of the first fenestration unit meeting the first frame member at a corner of the first fenestration unit proximate the first end of the mull joint; and a first gusset flange attached to an edge of the first base plate and extending away from the first fenestration unit, wherein the first gusset flange is configured for attachment to an exterior surface of an opening in which the first fenestration unit is located. The flanged corner gusset assembly may also include a second flanged corner gusset attached to the second fenestration unit, wherein the second flanged corner gusset comprises a second gusset plate leg positioned between the second joining strip and the second frame member of the second fenestration unit at the first end of the mull joint; a second base plate attached to the second gusset plate leg, wherein the second base plate extends over and is attached to a frame member of the second fenestration unit meeting the second frame member at a corner of the second fenestration unit proximate the first end of the mull joint; and a second gusset flange attached to an edge of the second base plate and extending away from the second fenestration unit, wherein the second gusset flange is configured for attachment to an exterior surface of an opening in which the second fenestration unit is located.

In one or more embodiments of the compound fenestration assemblies including a flanged corner gusset assembly as described herein, the first ends of the first and second joining strips terminate at a recessed location between first frame member of the first fenestration unit and the second frame member of the second fenestration unit at the first end of the mull joint, wherein a first recess is formed at the first end of the mull joint between the first and second frame members; and the assembly further comprises a locking clip located in the first recess between the first and second frame members at the first ends of the first and second joining strips, wherein the locking clip plug mechanically interlocks with the first gusset plate leg and the second gusset plate leg to restrict disengagement of the channels on the first and second joining strips at the first ends of first and second joining strips.

In one or more embodiments of the compound fenestration assemblies including a flanged corner gusset assembly as described herein, a retainer plug is positioned in the locking clip in the first recess. In one or more embodiments, the retainer plug comprises a sealant port in fluid communication with a sealant reservoir positioned between the first and second frame members and the first ends of the first and second joining strips.

In one or more embodiments of the compound fenestration assemblies including a flanged corner gusset assembly as described herein, the first ends of the first and second joining strips terminate at a recessed location between first frame member of the first fenestration unit and the second frame member of the second fenestration unit at the first end of the mull joint, wherein a first recess is formed at the first end of the mull joint between the first and second frame members; and the assembly further comprises a retainer plug located in the first recess between the first and second frame members at the first ends of the first and second joining strips, wherein the retainer plug mechanically interlocks with the first gusset plate leg and the second gusset plate leg to restrict disengagement of the channels on the first and second joining strips at the first ends of first and second joining strips. In one or more embodiments, the retainer plug is located in the first recess and comprises a sealant port in fluid communication with a sealant reservoir positioned between the first and second frame members and the first ends of the first and second joining strips. In one or more embodiments, the sealant port faces the same direction as the exterior sides of the of the first and second frame members. In one or more embodiments, the sealant port faces a direction aligned with the mull joint axis.

In one or more embodiments of the compound fenestration assemblies described herein, the assembly may further comprise a stacked corner gusset assembly that includes: a first corner gusset attached to the first fenestration unit, wherein the first corner gusset comprises a first gusset plate leg positioned between the first joining strip and the first frame member of the first fenestration unit at the first end of the mull joint, and a first base plate attached to the first gusset plate leg and extending away from a corner of the first fenestration unit proximate the first end of the mull joint, wherein the first base plate extends away from the first fenestration unit in a direction aligned with the separation axis, wherein first base plate is configured for attachment to an interior surface of an opening in which the first fenestration unit is located; and a second corner gusset attached to the second fenestration unit, wherein the second corner gusset comprises: a second gusset plate leg positioned between the second joining strip and the second frame member of the second fenestration unit at the first end of the mull joint, and a second base plate attached to the second gusset plate leg, wherein the second base plate extends over and is attached to a frame member of the second fenestration unit meeting the second frame member at a corner of the second fenestration unit proximate the first end of the mull joint. In one or more embodiments, the second base plate is stacked with the first base plate when the channels on the first joining strip on the first fenestration unit mechanically interlock with the channels on the second joining strip on the second fenestration unit such that the second base plate is located between the first base plate and the second fenestration unit.

In one or more embodiments of the compound fenestration assemblies including a stacked corner gusset assembly as described herein, the first ends of the first and second joining strips terminate at a recessed location between first frame member of the first fenestration unit and the second frame member of the second fenestration unit at the first end of the mull joint, wherein a first recess is formed at the first end of the mull joint between the first and second frame members; and the assembly further comprises a locking clip located in the first recess between the first and second frame members at the first ends of the first and second joining strips, wherein the locking clip plug mechanically interlocks with the first gusset plate leg and the second gusset plate leg to restrict disengagement of the channels on the first and second joining strips at the first ends of first and second joining strips. In one or more embodiments, a retainer plug is positioned in the locking clip in the first recess. In one or more embodiments, the retainer plug comprises a sealant port in fluid communication with a sealant reservoir positioned between the first and second frame members and the first ends of the first and second joining strips.

In one or more embodiments of the compound fenestration assemblies including a stacked corner gusset assembly as described herein, the first ends of the first and second joining strips terminate at a recessed location between first frame member of the first fenestration unit and the second frame member of the second fenestration unit at the first end of the mull joint, wherein a first recess is formed at the first end of the mull joint between the first and second frame members; and the assembly further comprises a retainer plug located in the first recess between the first and second frame members at the first ends of the first and second joining strips, wherein the retainer plug mechanically interlocks with the first gusset plate leg and the second gusset plate leg to restrict disengagement of the channels on the first and second joining strips at the first ends of first and second joining strips. In one or more embodiments, the retainer plug is located in the first recess and comprises a sealant port in fluid communication with a sealant reservoir positioned between the first and second frame members and the first ends of the first and second joining strips.

In another aspect, one or more embodiments of the methods of forming a mull joint as described herein may include: attaching a first joining strip to a first frame member of a first fenestration unit, wherein the first joining strip comprises a pair of channels extending along a length of the first frame member, wherein each channel of the pair of channels is aligned with a mull joint axis and opens towards an exterior side of the first fenestration unit, wherein the mull joint axis is aligned with the length of the first frame member along one side of the first fenestration unit; attaching a second joining strip to a second frame member of a second fenestration unit, wherein the second joining strip comprises a pair of channels extending along the length of the second frame member, wherein each channel of the pair of channels on the second joining strip is aligned with the mull joint axis and opens towards an interior side of the second fenestration unit; and aligning the first frame member of the first fenestration unit with the second frame member of the second fenestration unit into alignment with each other such that an exterior side of the second fenestration unit is aligned with the exterior side of the first fenestration unit and an interior side of the first fenestration is aligned with the interior side of the second fenestration unit, and wherein the aligning mechanically interlocks each channel of the pair of channels on the first joining strip with one channel of the pair of channels on the second joining strip, wherein the mechanically interlocked channels prevent movement of the first frame member away from the second frame member along a separation axis extending through the first and second frame members and the first and second joining strips in a direction transverse to the mull joint axis; wherein the second joining strip is a mirror image of the first joining strip across the mull joint such that the channels on the second joining strip face the channels on the first joining strip and the channels on the second joining strip and the channels on the first joining strip open in opposite directions.

In one or more embodiments of the methods described herein, the first joining strip extends over a majority of the length of the first frame member and the second joining strip extends over a majority of the length of the second frame member.

In one or more embodiments of the methods described herein, the pair of channels of the first joining strip extend along the entire length of the of the first joining strip and wherein the pair of channels of the second joining strip extend along the entire length of the of the second joining strip.

In one or more embodiments of the methods described herein, the interior and exterior sides of the first and second frame members define a frame depth along the interior/exterior axis, and wherein the mechanically interlocking channels on the first and second joining strips are positioned such that a bottom of the channel on the first joining strip that is closest to the interior side of the first frame member is located within 20% or less of the frame depth from the interior side of the first frame member and a bottom of the channel on the second joining strip that is closest to the exterior side of the second frame member is located within 20% or less of the frame depth from the exterior side of the second frame member.

In one or more embodiments of the methods described herein, the interior and exterior sides of the first and second frame members define a frame depth along the interior/exterior axis, and wherein the mechanically interlocking channels on the first and second joining strips are positioned such that a bottom of the channel on the first joining strip that is closest to the interior side of the first frame member is located within 15% or less of the frame depth from the interior side of the first frame member and a bottom of the channel on the second joining strip that is closest to the exterior side of the second frame member is located within 15% or less of the frame depth from the exterior side of the second frame member.

In one or more embodiments of the methods described herein, the method comprises inserting a cavity leg of a first end plug in an opening of an intermediate end plug cavity, wherein the intermediate end plug cavity is formed between the first joining strip and the second joining strip when the channels on the first and second joining strips are mechanically interlocked with each other, wherein the cavity leg prevents disengagement of the mechanically interlocking channels on the first and second joining strips at the first ends of first and second joining strips.

In another aspect, one or more embodiments of the compound fenestration assemblies described herein may include: a bracket plug comprising a base and a cavity leg extending away from the base, wherein the cavity leg of the bracket plug is positioned in the second opening of the intermediate end plug cavity when the base of the second end plug is positioned between the first and second frame members at the second ends of the first and second joining strips, wherein the cavity leg of the bracket plug prevents disengagement of the mechanically interlocking channels on the first and second joining strips at the second ends of first and second joining strips, and wherein the base of the bracket plug comprises a base fastener bore aligned along the interior/exterior axis proximate the second end of the mull joint; and wherein the assembly further comprises a bracket plate comprising a base configured for attachment to an interior surface of an opening in which the first and second fenestration units are located, wherein the bracket plate comprises a fastener block attached to the base, the fastener block configured to be located between the first and second frame members at the second ends of the first and second joining strips when the base is attached to the interior surface of the opening in which the first and second fenestration units are located, and further wherein the fastener block comprises a block fastener bore aligned with the base fastener bore in the base of the bracket plug when the fastener block is located between the first and second frame members at the second ends of the first and second joining strips. In one or more embodiments, the fastener block is configured for movement relative to the base of the bracket plate. In one or more embodiments, the fastener block is configured for movement along a direction transverse to both the interior/exterior axis and the mull joint axis. In one or more embodiments, the second ends of the first and second joining strips terminate at a recessed location between first frame member of the first fenestration unit and the second frame member of the second fenestration unit at the second end of the mull joint, wherein a second recess is formed at the second end of the mull joint between the first and second frame members, and wherein the base of the bracket plug is located in the second recess.

In one or more embodiments, the assembly further comprises a second end seal member located between the first and second frame members at the second ends of the first and second joining strips, wherein the second end seal member is located between the base of the bracket plug and the exterior side of the first fenestration unit, wherein the second end seal member comprises a sealant port opening away from the base of the second end plug, wherein the sealant port is in fluid communication with a sealant reservoir positioned between the first and second frame members and the second ends of the first and second joining strips.

In one or more embodiments of the compound fenestration assemblies described herein, the assembly further comprises: a first side cavity formed between the first joining strip and the first frame member of the first fenestration unit, wherein the first side cavity comprises an opening at the second end of the first joining strip; a second side cavity formed between the second joining strip and the second frame member of the second fenestration unit, wherein the second side cavity comprises an opening at the second end of the second joining strip; a first composite bracket plug comprising a base and a cavity leg extending away from the base, wherein the cavity leg is positioned in the opening of the first side cavity when the base of the first composite bracket plug is positioned between the first and second frame members at the second end of the first joining strip; a first base fastener bore in the base of the first composite bracket plug, wherein the first base fastener bore is aligned with the interior/exterior axis proximate the second end of the mull joint; a second base fastener bore in the base of the second composite bracket plug, wherein the second base fastener bore is aligned with the first base fastener bore; and a bracket plate comprising a base configured for attachment to an interior surface of an opening in which the first and second fenestration units are located, wherein the bracket plate comprises a fastener block attached to the base, the fastener block configured to be located between the first and second frame members at the second ends of the first and second joining strips when the base is attached to the interior surface of the opening in which the first and second fenestration units are located, and further wherein the fastener block comprises a block fastener bore aligned with the first base fastener bore and the second base fastener bore when the fastener block is located between the first and second frame members at the second ends of the first and second joining strips. In one or more embodiments, the fastener block is configured for movement relative to the base of the bracket plate. In one or more embodiments, the fastener block is configured for movement along a direction transverse to both the interior/exterior axis and the mull joint axis. In one or more embodiments, the second ends of the first and second joining strips terminate at a recessed location between first frame member of the first fenestration unit and the second frame member of the second fenestration unit at the second end of the mull joint, wherein a second recess is formed at the second end of the mull joint between the first and second frame members, and wherein the base of the first composite bracket plug and the base of the second composite bracket plug are both located in the second recess. In one or more embodiments, the assembly further comprises a second end seal member located between the first and second frame members at the second ends of the first and second joining strips, wherein the second end seal member is located between the base of the first composite bracket plug and the exterior side of the first fenestration unit, wherein the second end seal member comprises a sealant port opening away from the base of the second end plug, wherein the sealant port is in fluid communication with a sealant reservoir positioned between the first and second frame members and the second ends of the first and second joining strips.

As used herein and in the appended claims, the singular forms “a,” “an,” and “the” include plural referents unless the context clearly dictates otherwise. Thus, for example, reference to “a” or “the” component may include one or more of the components and equivalents thereof known to those skilled in the art. Further, the term “and/or” means one or all of the listed elements or a combination of any two or more of the listed elements.

It is noted that the term “comprises” and variations thereof do not have a limiting meaning where these terms appear in the accompanying description. Moreover, “a,” “an,” “the,” “at least one,” and “one or more” are used interchangeably herein.

Where used herein, the terms “top” and “bottom” are used for reference relative to each other when the compound fenestration assemblies joined using the mulling systems and methods described herein are properly installed in a building opening.

Where used herein, the terms “exterior” and “interior” are used in a relative sense, e.g., an exterior side and an interior side of a fenestration unit describe opposite sides of the fenestration unit/assembly. In other words, an exterior side could be found within the interior of a building or other structure that would conventionally define an interior and an exterior, while an interior side could be found outside of a building or other structure that would conventionally define an interior and an exterior.

The above summary is not intended to describe each embodiment or every implementation of the compound fenestration assembly mull joints and methods described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
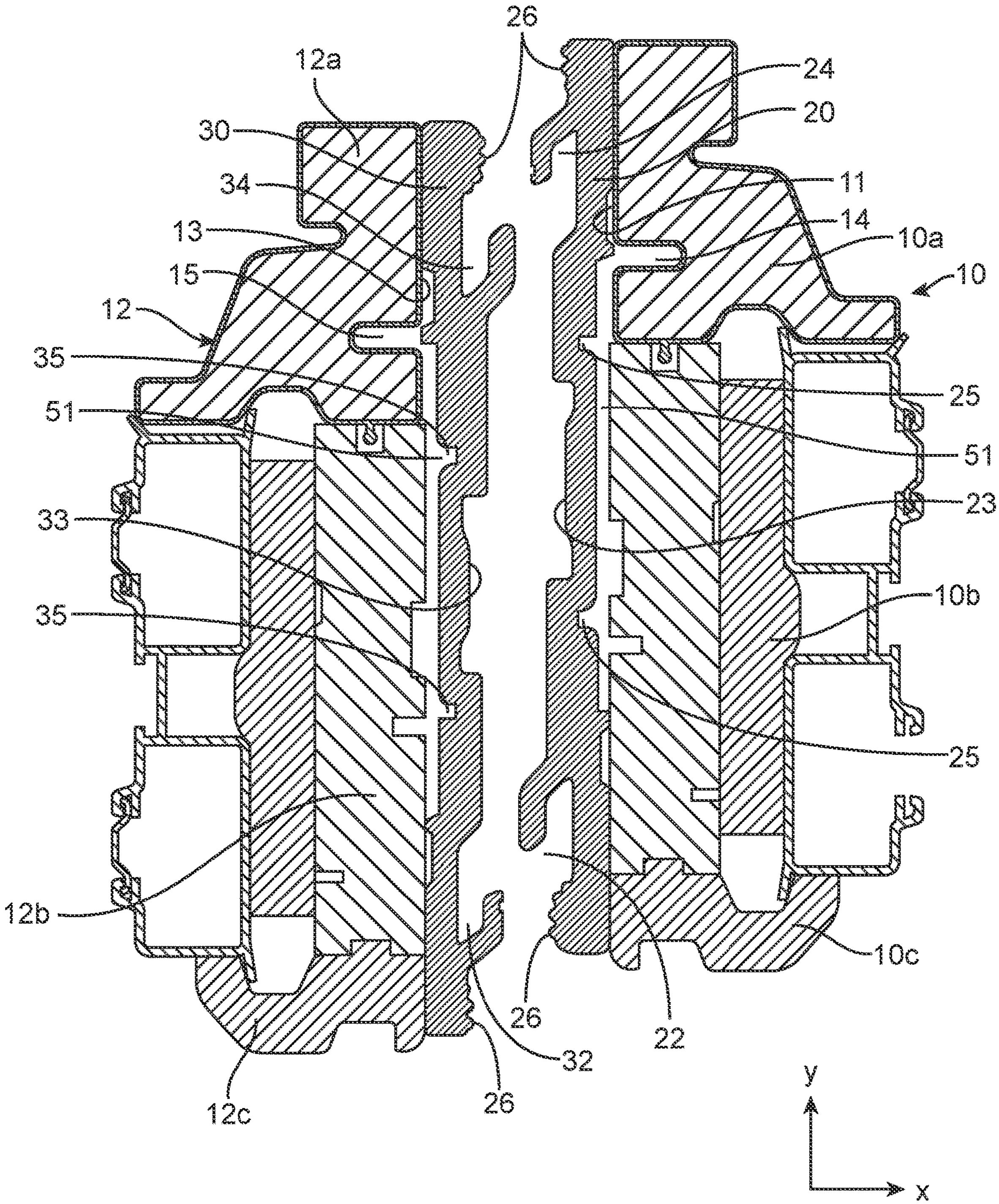
FIG. 1 is a cross-sectional view of one illustrative embodiment of a mull joint in a compound fenestration assembly as described herein in which the components on opposite sides of the mull joint are separated prior to joining.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

Figure 2A:
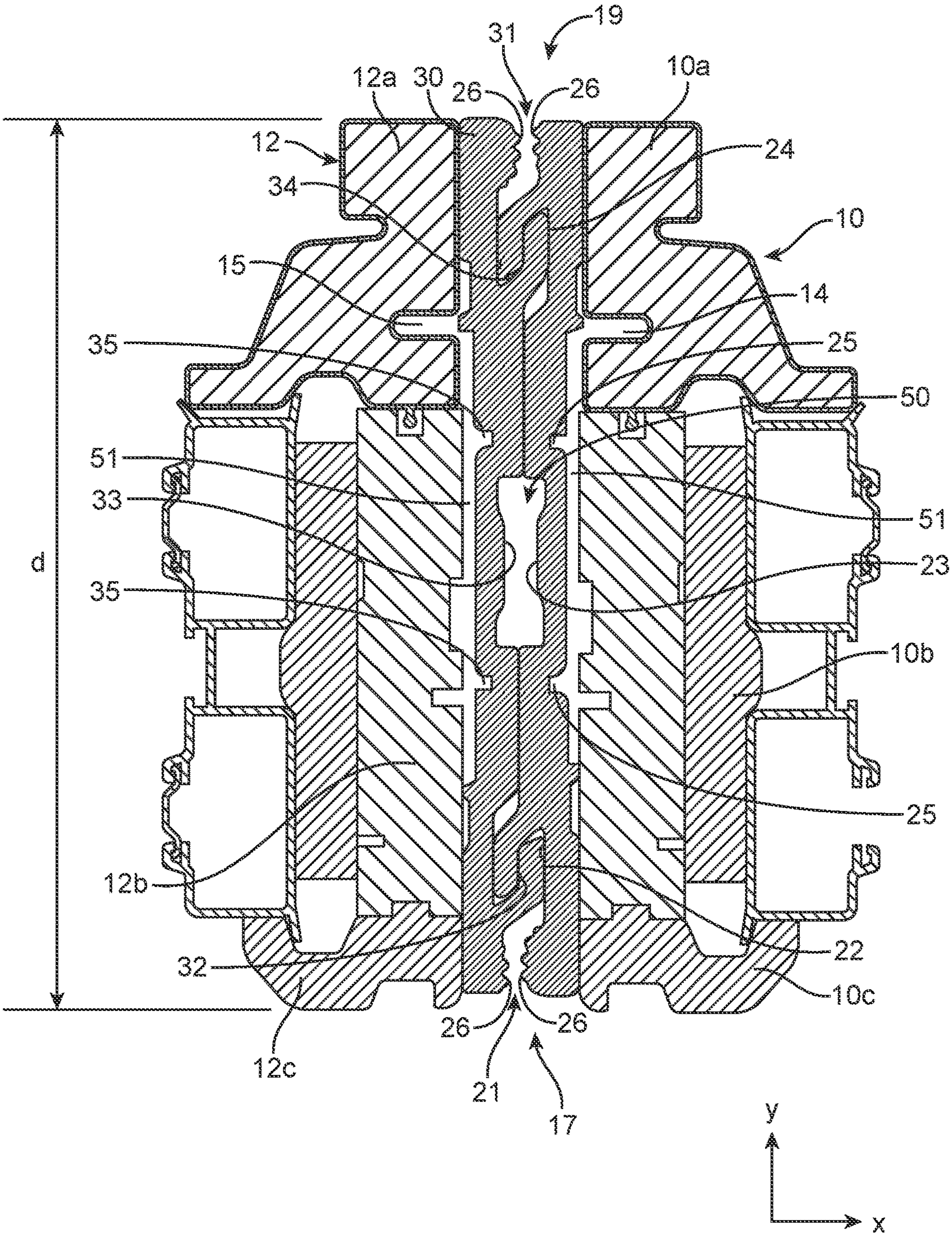
FIG. 2A is a cross-sectional view of the mull joint of FIG. 1 after the components are joined.
Figure 2B:
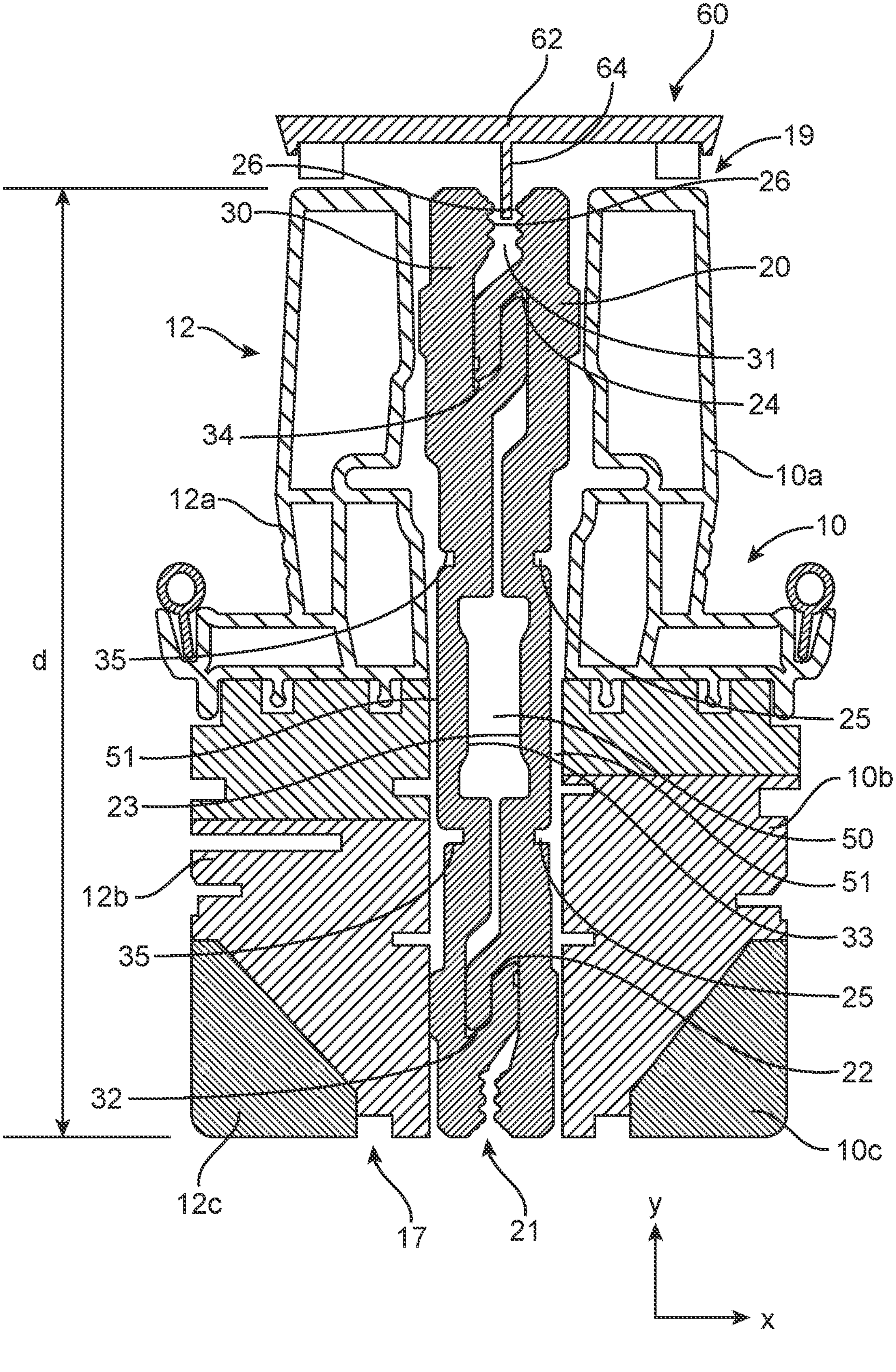
FIG. 2B is a cross-sectional view of another illustrative embodiment of a mull joint in an alternative compound fenestration assembly with a trim piece attached along one edge of the mull joint.

One illustrative embodiment of a mull joint which may be used in a compound fenestration assembly as described herein is depicted in FIGS. 1, 2A, and 2B. FIG. 1 is a cross-sectional view in which the components are depicted as being slightly separated prior to joining the components to form the mull joint, while FIG. 2A is a cross-sectional view of the mull joint of FIG. 1 after the components are joined. FIG. 2B is a cross-sectional view of another illustrative embodiment of a mull joint in an alternative compound fenestration assembly with a trim piece attached along one edge of the mull joint. For reference, one set of mull joints which may be constructed in accordance with the mull joints depicted in FIGS. 1, 2A, and 2B are depicted in the process of assembly in, e.g., FIGS. 7-9.

The depicted illustrative embodiment of the mull joint in FIGS. 1, 2A, and 2B includes a joining strip 20 attached to a frame member 10 on one side of the mull joint and a joining strip 30 attached to the frame member 12 on the opposite side of the mull joint. Frame members 10 and 12 are frame members on different fenestration units that are to be attached in a compound fenestration assembly as described herein.

Although not seen in FIGS. 1, 2A, and 2B, the mull joints of compound fenestration assemblies as described herein may include weatherstripping or other sealing features to limit the penetration of air and or water between the interior and exterior sides of a compound fenestration assembly through the mull joint. For example, in one or more embodiments, the weatherstripping or other sealing features may be located between the joining strips 20 and 30 and their respective frame members 10 and 12 and/or between the joining strips 20 and 30.

In the depicted illustrative embodiment, joining strip 20 includes channels 22 and 24 while joining strip 30 includes channels 32 and 34. In particular, channels 22 and 24 of joining strip 20 may be described as opening towards an interior side 17 of the fenestration unit that includes frame member 10 as a part thereof. Channels 32 and 34 of joining strip 30 may be described as opening towards an exterior side 19 of the fenestration unit that includes frame member 12 as a part thereof. As discussed herein, the joining strips 20 and 30 are oriented such that the legs of the joining strips 20 and 30 forming channels 22 and 32 interlock with the opposing channel in the opposing joining strip as seen in, e.g., the mull joints depicted in both FIGS. 2A and 2B. Similarly, the legs of joining strips 20 and 30 forming channels 24 and 34 mechanically interlock with the opposing channel in the opposing joining strip.

As a result, a secure connection between the joining strips is obtained through the mechanical interlocking of the channel structures in the opposing joining strips 20 and 30, with the mechanically interlocking joining strips resisting movement of their respective frame members and fenestration units relative to each other. For example, in one or more embodiments, the mull joints and compound fenestration assemblies in which the mull joints are found, may define an interior/exterior axis that extends between the interior side 17 and the exterior side 19 of the mull joint formed by joining strips 20 and 30. In, e.g., FIGS. 1, 2A, and 2B, the interior/exterior axis is aligned with the y direction.

The first frame member 10 may, in one or more embodiments, be described as facing the second frame member 12 across the mull joint, with a separation axis extending through the mull joint between the first and second frame members 10 and 12. In, e.g., FIGS. 1, 2A, and 2B, the separation axis is aligned in the x direction.

While the interior/exterior axis is aligned in the y direction and the separation axis is aligned in the x direction, mull joints in compound fenestration assemblies as described herein also define a mull joint axis that extends along a length of the mull joint between first and second ends of each of the mull joints. In, e.g., FIGS. 1, 2A, and 2B, the mull joint axis would be aligned in a z direction extending into the page in each of FIGS. 1, 2A, and 2B.

The interior/exterior axis, separation axis, and a mull joint axis are all, in one or more embodiments, transverse to each other. These relationships can be seen in many of the figures including, e.g., FIGS. 7-10, where, as described herein, the interior/exterior axis corresponds to the y direction, the separation axis corresponds to the x direction, and the mull joint axis corresponds to the z direction.

In one or more embodiments, the mechanically interlocking channels 22/32 and 24/34 of the joining strips 20 and 30 may be described as preventing movement of the frame member 10 away from frame member 12 along the separation axis (i.e., the x direction), preventing movement of the frame member 10 towards the interior side 17 of the frame member 12 along the interior/exterior axis (i.e., the y direction), and preventing movement of the frame member 12 towards the exterior side 19 of the frame member 10 along the interior/exterior axis (i.e., the y direction).

As described herein, the channels in opposing joining strips mechanically interlock with each other to assist with formation and retention of the mull joint in a compound fenestration assembly. In one or more embodiments, the phrase "mechanically interlock" means that the interlocking channels in the opposing joining strips 20 and 30 cannot be separated from each other along the separation axis (the x direction) without permanent destruction of the channel structures in one or both of the joining strips used to form mull joints in compound fenestration assemblies as described herein. Permanent destruction means that the channel structures undergo permanent deformation (i.e., non-elastic deformation) and/or fracturing or separation of components forming the channels in the joining strips.

In one or more embodiments, the joining strips forming one or more embodiments of mull joints as described herein are separate and discrete lengths of a common profile. The use of a common profile to form joining strips for one or more embodiments of mull joints as described herein may reduce the number of different parts needed to construct mull joints of compound fenestration assemblies as described herein because joining strips having only one common profile (i.e., shape) may be produced. In one or more embodiments, the common profiles used for joining strips as described herein may be formed through, e.g., extrusion or other suitable techniques, with longer lengths of joining strips being cut or separated to form discrete joining strips that may be used in mull joints as described herein. In other words, the joining strips used in one or more embodiments of mull joints as described herein are mirror images of each other, with, for example, one joining strip being rotated (relative to the opposing joining strip) 180° about the mull joint axis (i.e., the z axis) such that the channels on the two opposing joining strips face each other and open in opposite directions such that the channels can mechanically interlock with each other as described herein.

In one or more embodiments, the joining strips used in mull joints of compound fenestration assemblies as described herein may be constructed of one or more materials that provide sufficient mechanical strength as well as limiting thermal conductivity to enhance the thermal performance of compound fenestration assemblies as described herein. In one or more embodiments, the joining strips may be constructed of, e.g., one or more of fiberglass, polymeric materials, metals, etc. In one or more embodiments, the joining strips may be constructed of materials such as, e.g., fiberglass, polymeric materials, etc. that have lower thermal conductivity than, e.g., metals. In one or more embodiments, however, metals (or other more thermally conductive materials) may be used to construct the joining strips where, for example, a thermal break or other feature may be provided to limit thermal conductivity through the joining strips between the exterior and interior sides of a compound fenestration assembly as described herein.

A variety of other features that may be found in one or more embodiments of the components forming mull joints of compound fenestration assemblies as described herein are also depicted in FIGS. 1, 2A, and 2B. For example, in one or more embodiments, joining strip 20 may include a number of features facing the interior surface of the frame member 10 such as, e.g., slots 25 which, as described herein, can be used to assist in locating the joining strip 20 in a selected location on the frame member 10. The slots 25 may form part of a side cavity 51 located between the joining strip 20 and the surface 11 of the first frame member 10. A similar side cavity 51 may, in one or more embodiments, be located between the joining strip 30 and the surface 13 of the frame member 12, with the joining strips 30 including slots 35 which may form a portion of the side cavity 51 located between the joining strip 30 and the surface 13 of the frame member 12.

One or both of the side cavities 51 may be used as described herein to provide a space for one or more locator plates (see, e.g., locator plates 40) as described in connection with, e.g., FIGS. 3-6. In one or more embodiments, one or both of the side cavities 51 may be used as described herein to provide a space for one or more composite bracket plugs as described herein in connection with, e.g., FIGS. 33-35. In one or more embodiments, one or both of the side cavities 51 may include a first opening at a first end of the joining strips 20 and 30 and a second opening at the second or opposite end of the joining strips 20 and 30. In other words both ends of a mull joint formed using joining strips 20 and 30 may include openings into one or both of the side cavities 51. Further, one or both of the side cavities 51 may, in one or more embodiments, extend along the entire length of the joining strips 20 and 30 forming the mull joint.

In one or more embodiments, the joining strip 20 may also include an inset area 23 facing the opposing joining strip 30 across the mull joint, with the opposing joining strip 30 also including an inset area 33. When the joining strips 20 and 30 are interlocked to form the mull joint as seen in, e.g., FIGS. 2A and 2B, the inset areas 23 and 33 are directly opposite each other and form an intermediate end plug cavity between the joining strip 20 and the joining strip 30. In one or more embodiments, the intermediate end plug cavity 50 may include a first opening at a first end of the joining strips 20 and 30 and a second opening at the second or opposite end of the joining strips 20 and 30. In other words, both ends of a mull joint formed using joining strips 20 and 30 may include openings into this intermediate end plug cavity 50 which may, in one or more embodiments, extend along the entire length of the joining strips 20 and 30 forming the mull joint. In one or more embodiments, the intermediate end plug cavity 50 may be described as being located between the channels 22/32 and 24/34 on the first and second joining strips 20 and 30.

In one or more embodiments of mull joints in compound fenestration assemblies as described herein, an end plug having a cavity leg may be inserted into the intermediate end plug cavity 50 at one end of the joining strips 20 and 30 to prevent disengagement of the mechanically interlocking channels on the joining strips 20 and 30 at that end of the mull joint formed by the joining strips 20 and 30. This feature and illustrative embodiments of end plugs having cavity legs are depicted and/or described herein in connection with, e.g., FIGS. 10-12, 29, and 31. In essence, insertion of a components such as, e.g., a cavity leg into the intermediate end plug cavity locks the joining strips 20 and 30 relative to each other such that the channels 22/32 and 24/34 cannot be backed out of engagement with each other.

In one or more embodiments, the channels in the joining strips used to construct mull joints in compound fenestration assemblies as described herein may provide positioning of the interlocking channels within a selected distance of the interior and exterior side 17 and 19 of the frame members 10 and 12 being connected across the mull joint. Positioning the channels closer to the interior and exterior sides 17 and 19 may provide stronger mull joints as compared to mull joints in which the connections are located farther inward within a mull joint from the interior and/or exterior sides of the frame members of fenestration units connected across the mull joint.

In one or more embodiments, the frame members connected by mull joints in the compound fenestration assemblies as described herein may be constructed of multiple components, with different components defining the interior and exterior sides of the frame members. For example, in the illustrative embodiment of the mull joint as depicted in FIG. 2A, frame members 10 and 12 may each be constructed of an outer frame member 10*a*/12*a*, jamb 10*b*/12*b*, and inside stop 10*c*/12*c*. In the alternative embodiment depicted in FIG. 2B, the frame members 10 and 12 include outer frame members 10*a*/12*a*, jambs 10*b*/12*b*, and inside stops 10*c*/12*c*.

Although additional components such as, e.g., extension jams, trim pieces, etc. may be attached to the frame members 10 and 12 on the interior side 17 of the compound fenestration assembly as a part of finishing the installation of the assembly, the compound fenestration assemblies described herein would typically first be installed in a rough opening followed by addition of such additional components (although in some instances extension jambs may be applied by a manufacturer at the factory). In contrast to the additional components that may be installed on the interior side 17 of a compound fenestration assembly as described herein, however, additional components are not typically added to the components that define the exterior sides of the frame members (with the exception of a potential trim strip, one illustrative embodiment of which is described herein in connection with FIG. 2B and/or exterior brick mould or other decorative trim that can be applied to the exterior sides of the frame members).

As depicted in, e.g., FIGS. 2A and 2B, the interior and exterior sides 17 and 19 of the first and second frame members 10 and 12 define a frame depth d along the interior/exterior axis (i.e., the y direction). As discussed herein, the mechanically interlocking channels 22/32 and 24/34 on the joining strips 20 and 30 are positioned such that the bottom of channel 32 on the joining strip 30 (where the bottom is the interior surface of the channel 32 that is closest to the interior side 17 of the frame members 10 and 12) is located within 20% or less of the frame depth d from the interior side 17 of the frame members 10 and 12 and the bottom of channel 24 on the joining strip 20 (where the bottom is the interior surface of the channel 24 that is closest to the exterior side 19 of the frame members 10 and 12) is located within 20% or less of the frame depth d from the exterior sides 19 of the frame members 10 and 12. In one or more alternative embodiments, the channels 32 and 24 may be located even closer to the interior and exterior side 17 and 19, e.g., the bottoms of the channels 32 and 24 may be located within 15% or less of the frame depth d from the respective interior sides 17 or exterior sides 19 of the frame members 10 and 12.

Other optional features which may be provided in one or more embodiments of a mull joint in a compound fenestration assembly as described herein may include trim slots 21 and 31 located at opposite ends of the mull joint. In one or more embodiments, the trim slots 21 and/or 31 may be sized and positioned to receive and retain a fin 64 extending from a body 62 of a trim strip 60 such that the trim strip 60 is retained in position on one side of the mull joint (see, e.g., FIG. 2B). In one or more embodiments, the joining strips 20 and 30 may include raised ridges, ribs, or other features 26 that assist in retaining the fin 64 of a trim strip 60 within the trim slots 31 and/or 21.

Typically, a trim strip 60 will be used on an exterior side of the mull joint, however, in one or more embodiments, trim strips may be used on one or both of the exterior and interior sides of a mull joint of a compound fenestration assembly as described herein. The trim strip 60 may provide a more aesthetically pleasing appearance and, in one or more embodiments, may include weatherstripping or other sealing features to limit the passage of air and/or water between the interior and exterior sides of the mull joint.

In one or more embodiments of mull joints used in compound fenestration assemblies as described herein, a seal and and/or adhesive may be provided in one or both of the trim slots 21 and/or 31 to further assist in locking the joining strips 20 and 30 together when the opposing channels are mechanically interlocked with each other. Suitable sealants and/or adhesives may include, e.g., silicones, urethanes, epoxies, etc.

In one or more embodiments of mull joints used in compound fenestration assemblies as described herein, positioning of the joining strips on the frame members to be attached by a mull joint may be assisted through the use of, e.g., locator plates positioned between the joining strips and the frame members to which they are attached. In one or more embodiments, one, two, three or more locator plates may be positioned between a joining strip and the frame member to which the joining strip is attached. In one or more embodiments, the locator plate(s) may include a frame surface facing the frame member to which the joining strip is attached and a joining strip surface facing the joining strip. The frame surface of each locator plate and the frame member may include complementary mating features configured to position the locator plate in one selected location and orientation relative to the frame member. Furthermore, the joining strip surface of each locator plate and the first joining strip may include complementary mating features configured to position the locator plate in one selected location and orientation relative to the joining strip. The combination of complementary mating features on the frame surface and joining strip surface of the locator plates are, in one or more embodiments, configured to position the joining strip in one selected orientation relative to the frame member and in one selected location on the frame member along the interior/exterior axis (i.e., the y direction).

Figure 3:
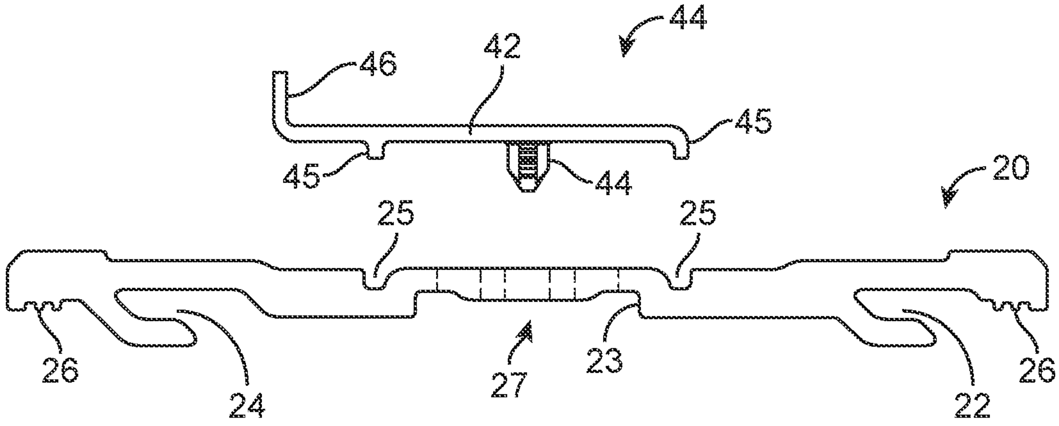
FIG. 3 is an end view of one illustrative embodiment of a locator plate and joining strip which may be used in one or more embodiments of mull joints as described herein.
Figure 4:
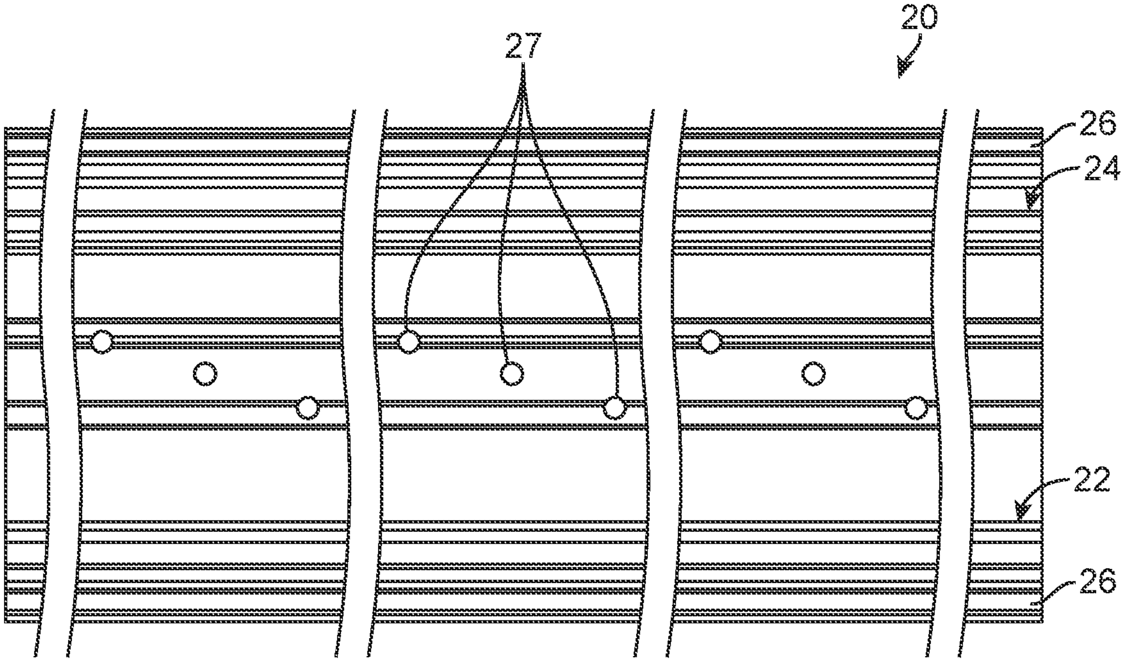
FIG. 4 is a plan view of a portion of the illustrative embodiment of a joining strip depicted in FIG. 3.
Figure 5:
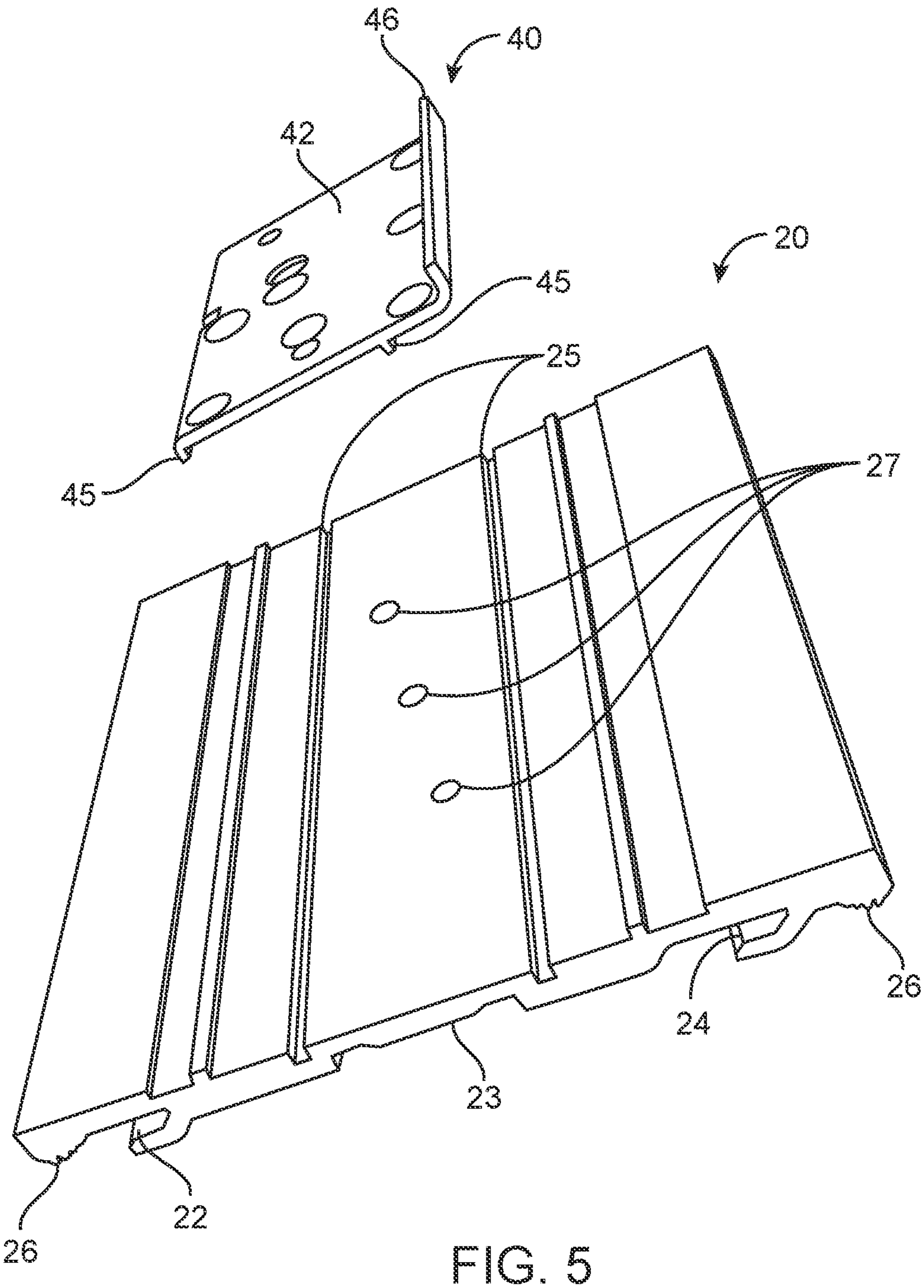
FIG. 5 is a perspective view of the locator plate and joining strip depicted in FIG. 3.

One illustrative embodiment of an optional locator plate 40 that may be used in connection with the depicted illustrative embodiment of joining strip 20 is depicted in FIGS. 3-5. The depicted illustrative embodiment of locator plate 40 includes a body 42 having one or more raised joining strip alignment features 45 on a joining strip surface facing the joining strip 20. In one or more embodiments, the raised joining strip alignment features 45 may be in the form of one or more ribs or other raised features which are sized and positioned to mate with slots 25 formed in joining strip 20 (or slots 35 in joining strip 30 if used in combination with joining strip 30).

The depicted illustrative embodiment of locator plate 40 also includes a pin 44 which is sized and positioned to fit within an aperture 27 provided in the joining strip 20. In one or more embodiments, the joining strip 20 may include a plurality of apertures 27. Although only one such aperture 27 is used to accept pin 44 of locator plate 40, one or both of the other apertures 27 may be used to provide proper placement of a fastener (e.g., a threaded fastener, etc.) they can be used to secure the joining strips to frame members as described herein. Such placement of fasteners proximate the locator plates may also be advantageous in fixing the location of the locator plates relative to the joining strips and preventing movement of the locator plates after attachment of the joining strip to a frame member of a fenestration unit of a compound fenestration assembly as described herein.

While the raised joining strip alignment features and the complementary recesses formed in the joining strip provide for placement of the locator plate 40 in a selected position and orientation on the joining strip 20, one or more embodiments of the locator plate 40 may also include frame alignment features on frame surface of the locator plate 40, i.e., the surface of the locator plate 40 that faces the frame member 10 to which the joining strip 20 is attached. In one or more embodiments, the frame alignment features on the frame surface of the locator plate 40 are configured to fit within a complementary recess in the frame member to which the joining strip 20 is attached. For example, in one or more embodiments, frame members 10 and 12 may respectively include frame slots 14 and 15.

In the depicted illustrative embodiment, locator plate 40 includes a frame alignment rib 46 that extends away from the joining strip 20. In one or more embodiments, the frame alignment rib 46 may preferably fit within the frame slot 14 in frame member 10 of the mull joint depicted in FIGS. 1 and 2A. The frame alignment rib 46 and frame slot 14 of frame member 10 may, in one or more embodiments, preferably cooperate to position the joining strip in a selected location on the frame member 10 in a mull joint of a compound fenestration assembly as described herein.

Although alignment features could potentially be formed directly in the joining strip 20, such an alignment feature may or may not be properly positioned with respect to a complementary recess in a frame member if the joining strip 20 is rotated to provide a joining strip on the opposite side of a mull joint as described herein. As a result, the use of a universal locator plate 40 that can be rotated independently of the joining strip 20 may be advantageous in one or more embodiments of compound fenestration assemblies as described herein.

Although the pin 44 and ribs 45 along with slots 25 and 35 in joining strips 20 and 30 provide one example of complementary mating features configured to position a locator plate in one selected orientation and location with respect to a joining strip, many other complementary mating structures could be used in place of those depicted in connection with the illustrative embodiment of locator plate 40. Similarly, although rib 46 on the frame surface of the locator plate 40 and corresponding frame slots 14 and 15 in frame members 10 and 12 provide one example of complementary mating features configured to position a locator plate in one selected location and orientation with respect to a frame member, many other complementary mating structures could be used in place of those depicted in connection with the illustrative embodiment of locator plate 40.

Furthermore, the illustrative embodiments of joining strips 20 and 30 depicted in connection with FIGS. 1-5 represent only illustrative examples of joining strips that may be used to form mull joints of compound fenestration assemblies as described herein. Other joining strips and/or locator plates may be used to form mull joints of compound fenestration assemblies as described herein which may have a different appearance while offering the same sets of functional features required to form a mull joint as described herein.

Although the locator plates are described as being attached to the joining strips first, in one or more embodiments, one or more locator plates may be attached to the frame member of a fenestration unit first, with the joining strip being subsequently placed over the locator plate. In such embodiments, the locator plates and frame members to which they are attached may, in one or more embodiments, include complementary mating features such as, e.g., ribs 46 on the locator plates 40 and corresponding frame slots 14 and 15 in frame members 10 and 12 to properly align the locator plates on the frame members. Further, locator plates and joining strips may include complementary features such as, e.g., ribs 45 on locator plates 40 along with slots 25 and 35 in joining strips 20 and 30, to properly align the joining strips relative to the locator plates. As a result of these different sets of complementary mating features, the joining strips may be properly aligned on the frame members.

Figure 6:
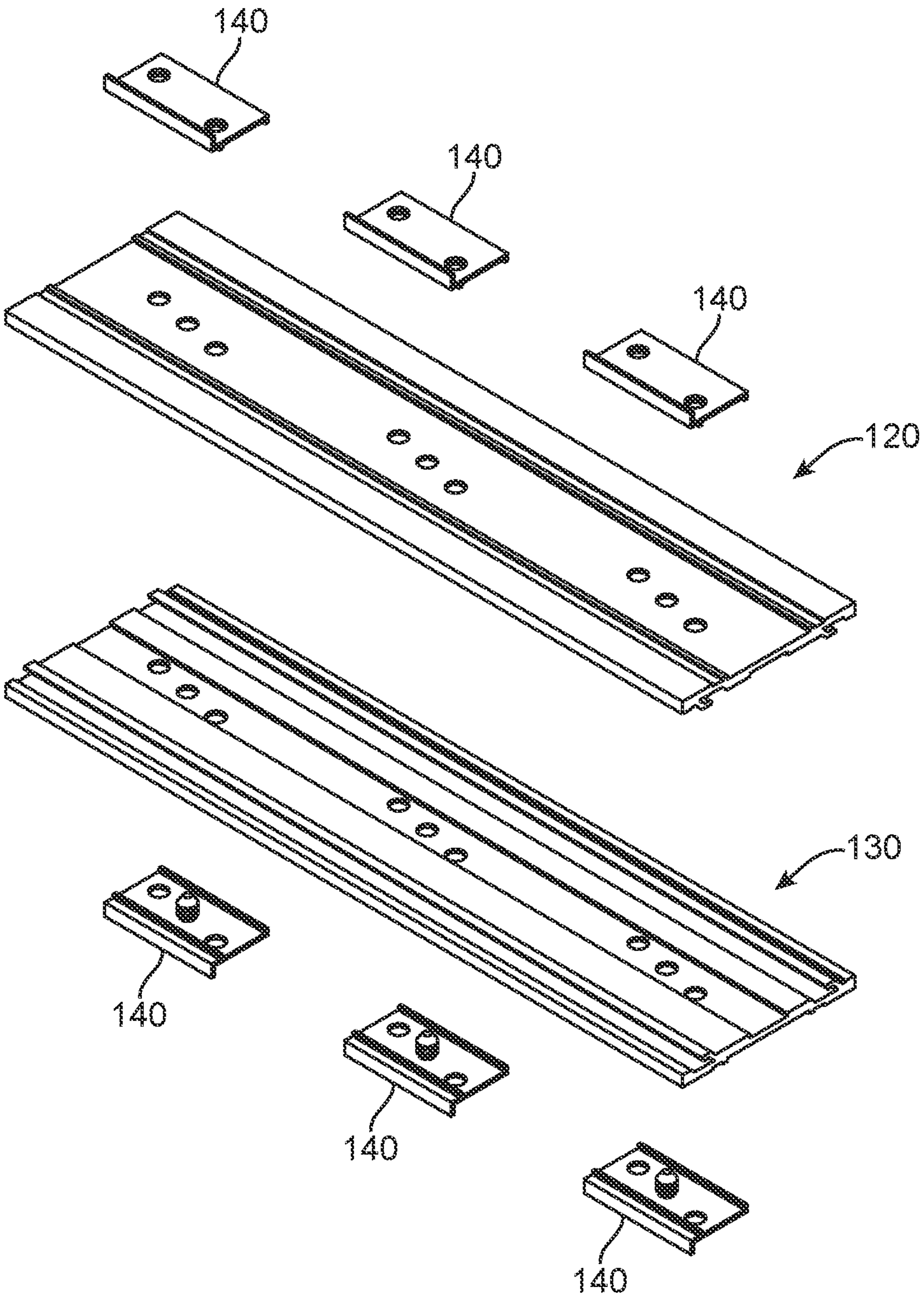
FIG. 6 is a perspective view of one illustrative embodiment of a pair of joining strips and associated locator plates that may be used to form a mull joint of a compound fenestration assembly as described herein.

Turning now to FIG. 6, a perspective view is provided of one illustrative embodiment of joining strips 120 and 130 and associated locator plates 140 that may be used to form a mull joint of a compound fenestration assembly as described herein. Although a set of three locator plates 140 is provided in connection with each of the joining strips 120 and 130, any number of locator plates 140 may be provided with one or both of joining strips 120 and 130 so long as the number of locator plates 140 is sufficient to accurately align the respective joining strip along a frame member of a fenestration unit of a compound fenestration assembly as described herein. In one or more embodiments, for example, as few as one locator plate could be used with each of the joining strips (with, for example, a single locator plate having an extended length as compared to the illustrative embodiments depicted in the figures).

Figure 7:
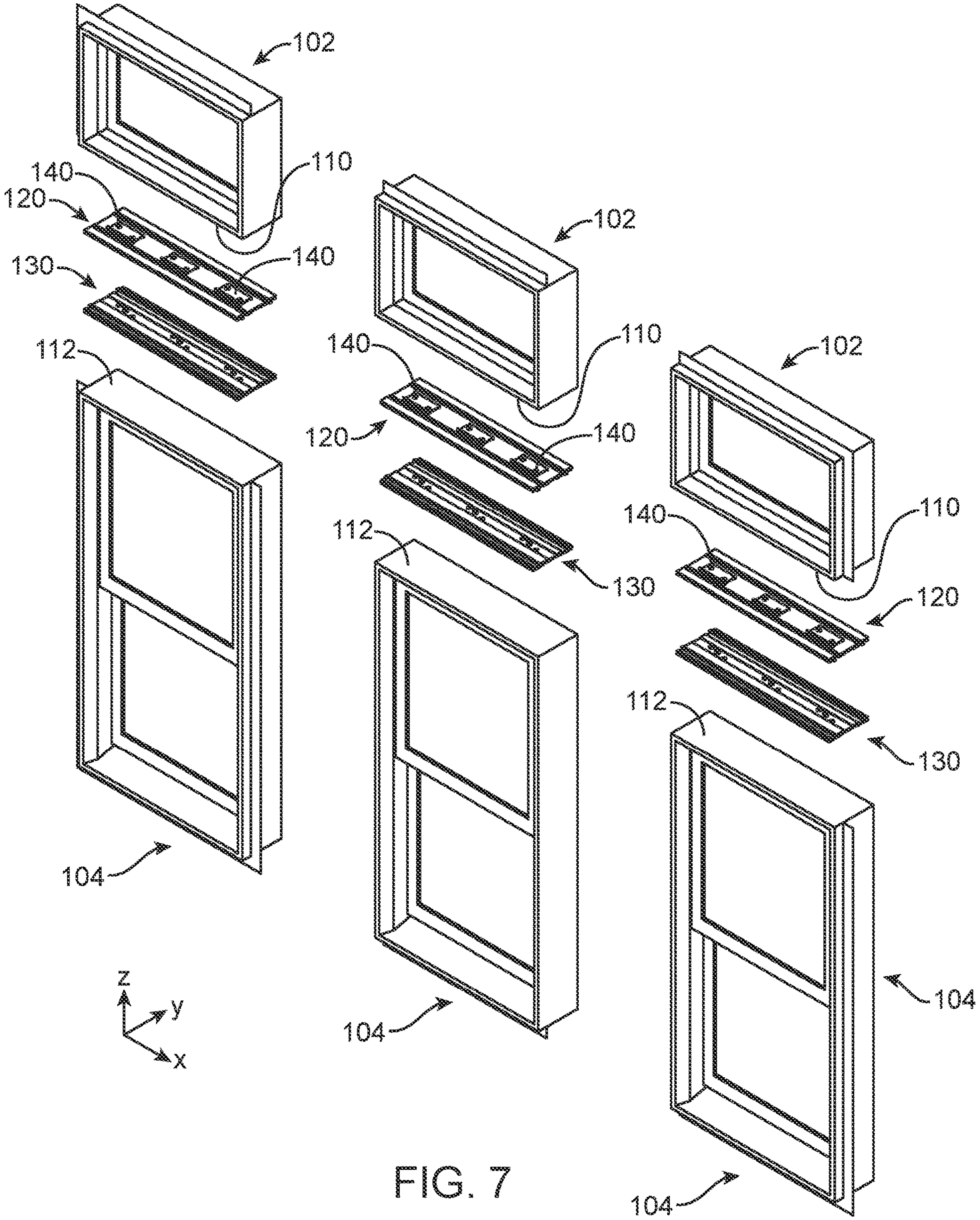
FIG. 7 is a perspective view of one illustrative embodiment of the joining strips and associated locator plates of FIG. 6 positioned between fenestration units during one illustrative embodiment of assembly of a compound fenestration assembly as described herein.

FIG. 7 is a perspective view of the joining strips 120 and 130 along with their associated locator plates 140 positioned between pairs of fenestration units 102 and 104 during assembly of one illustrative embodiment of a compound fenestration assembly as described herein. In particular, joining strips 120 are depicted as being positioned below frame members 110 of upper fenestration units 102 while joining strips 130 are depicted as positioned above frame members 112 of lower fenestration units 104. In one or more embodiments, the joining strips 120 and 130 may be described as extending over a majority of a length of the frame members to which they are attached. Doing so may, in one or more embodiments, enhance the strength of the mull joint formed by the joining strips 120 and 130.

Figure 8:
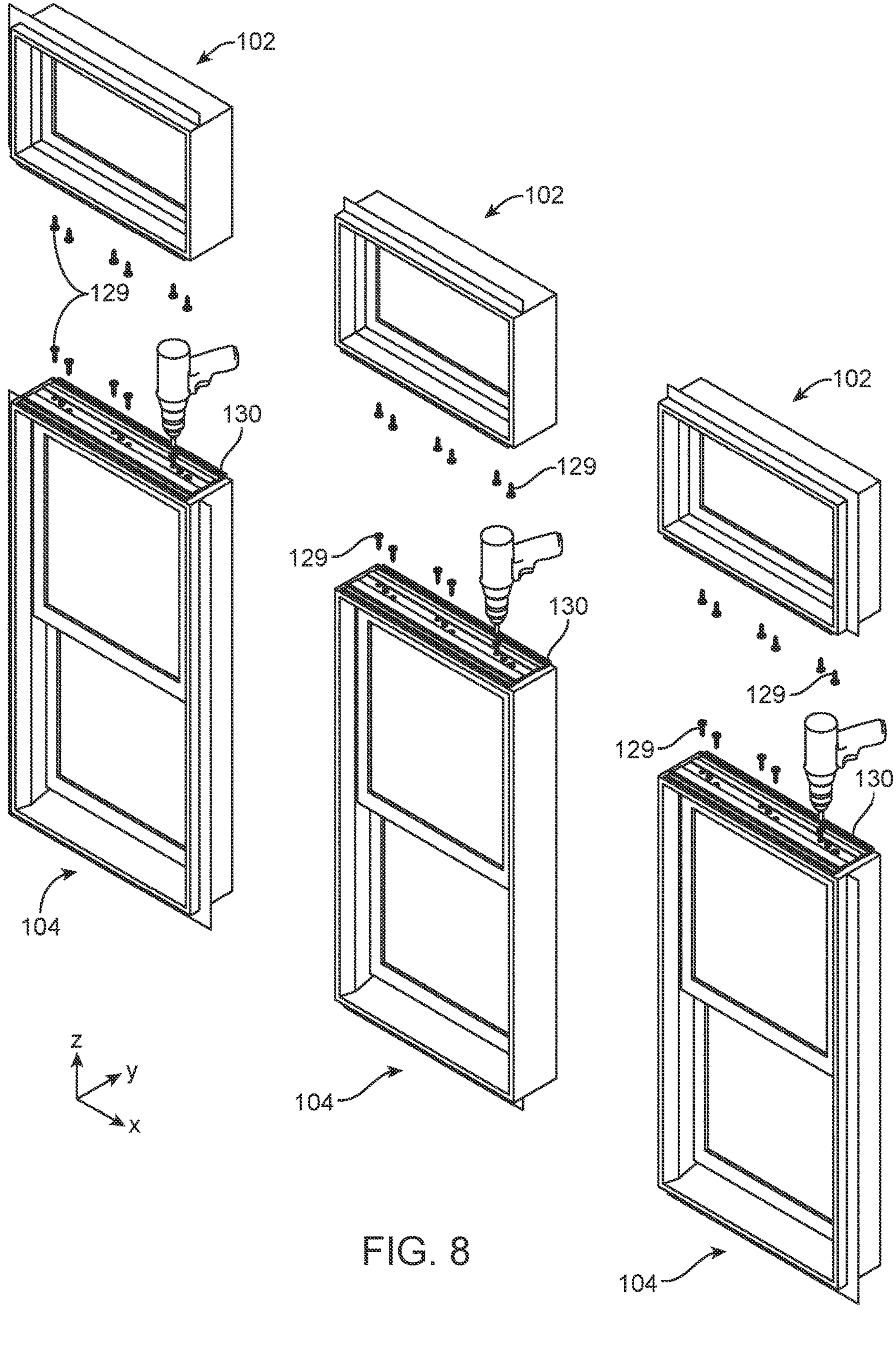
FIG. 8 is a perspective view of the compound fenestration assembly of FIG. 7 depicting one illustrative method of attaching joining strips to fenestration units as described herein.

FIG. 8 is a perspective view of the compound fenestration assembly of FIG. 7 depicting one illustrative embodiment of attachment of the joining strips 120 and 130 to fenestration units 102 and 104 (noting that joining strips 120 are in position on the bottom of the fenestration units 102 and, as a result, are not visible in the view of FIG. 8). In the depicted illustrative embodiment, the joining strips are attached to their respective fenestration units 102 or 104 using threaded fasteners 129. It will be understood, however, that the joining strips 120 and 130 may be attached to their respective fenestration units using other techniques or components such as, e.g., nails, rivets, adhesives, etc.

Before proceeding with the description of joining strips, it should be noted that although the illustrative compound fenestration assemblies depicted in, e.g., include fenestration units connected using horizontally oriented joining strips and related components (see, e.g., FIGS. 7-9), followed by attachment of vertically oriented joining strips to the compound fenestration assemblies containing the horizontally oriented joining strips (see, e.g., FIGS. 18-21), one or more alternative embodiments of the compound fenestration unit assemblies described herein may be constructed by attaching the vertically oriented joining strips. In such an embodiment, the fenestration units 102 are, e.g., connected to each other and fenestration units 104 are connected to each other before horizontally oriented joining strips are attached to the junction between the connected pair of fenestration units 102 and the connected pair of fenestration units 104. As a result, the horizontally oriented joining strips would span the vertical joints between the pair of fenestration units 102 and the pair of fenestration units 104. Further, in larger compound fenestration units, the longer joining strips that span joints may be arranged both vertically and horizontally if doing so would, e.g., simplify the assembly and installation process.

Figure 9:
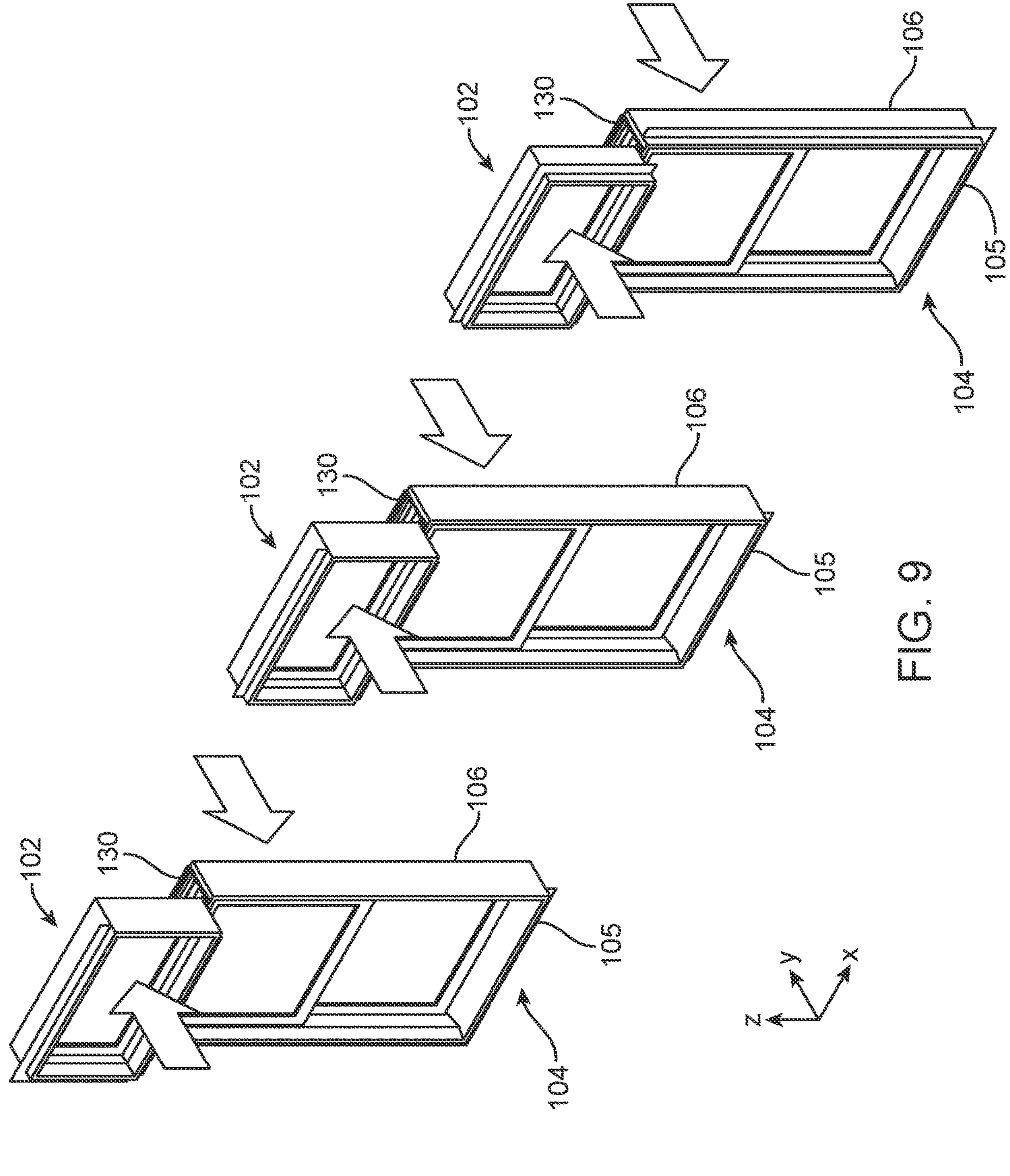
FIG. 9 is a perspective view of one illustrative method of assembling fenestration units to form a mull joint between the units as described herein.

FIG. 9 is a perspective view of one illustrative embodiment of assembly of the fenestration units 102 and 104 to form a mull joint between each of the depicted compound fenestration assemblies. As discussed herein, the lower joining strip 130 on the lower fenestration unit 104 will, in one or more embodiments, include channels opening towards the exterior side 105 of the fenestration unit 104 while the joining strip attached to the upper fenestration unit 102 will, in one or more embodiments, include channels opening towards the interior side 106 of the fenestration unit 104 so that the channels on the opposing joining strips can form a mechanically interlocking connection with each other as described herein.

Figure 10:
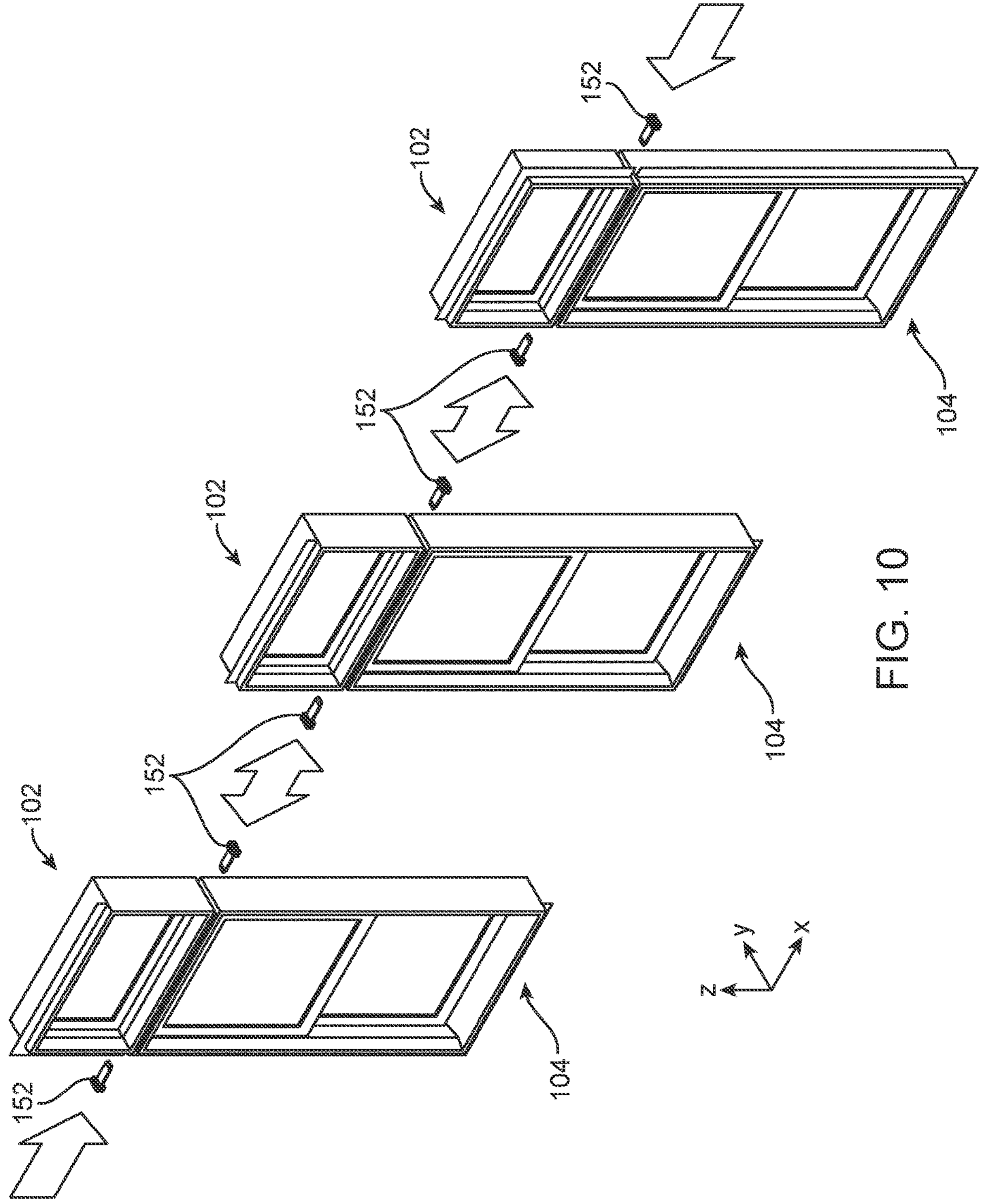
FIG. 10 is a perspective view of the compound fenestration assembly of FIGS. 7-9, depicting insertion of one illustrative embodiment of end plugs in the mull joints between fenestration units as described herein.

FIG. 10 is a perspective view of the compound fenestration assemblies of FIGS. 7-9, depicting insertion of one illustrative embodiment of end plugs 152 in the mull joints between the fenestration units 102 and 104 as described herein. As depicted, end plugs 152 are inserted into both ends of the mull joints formed between the respective pairs of upper and lower fenestration units 102 and 104.

Figure 11:
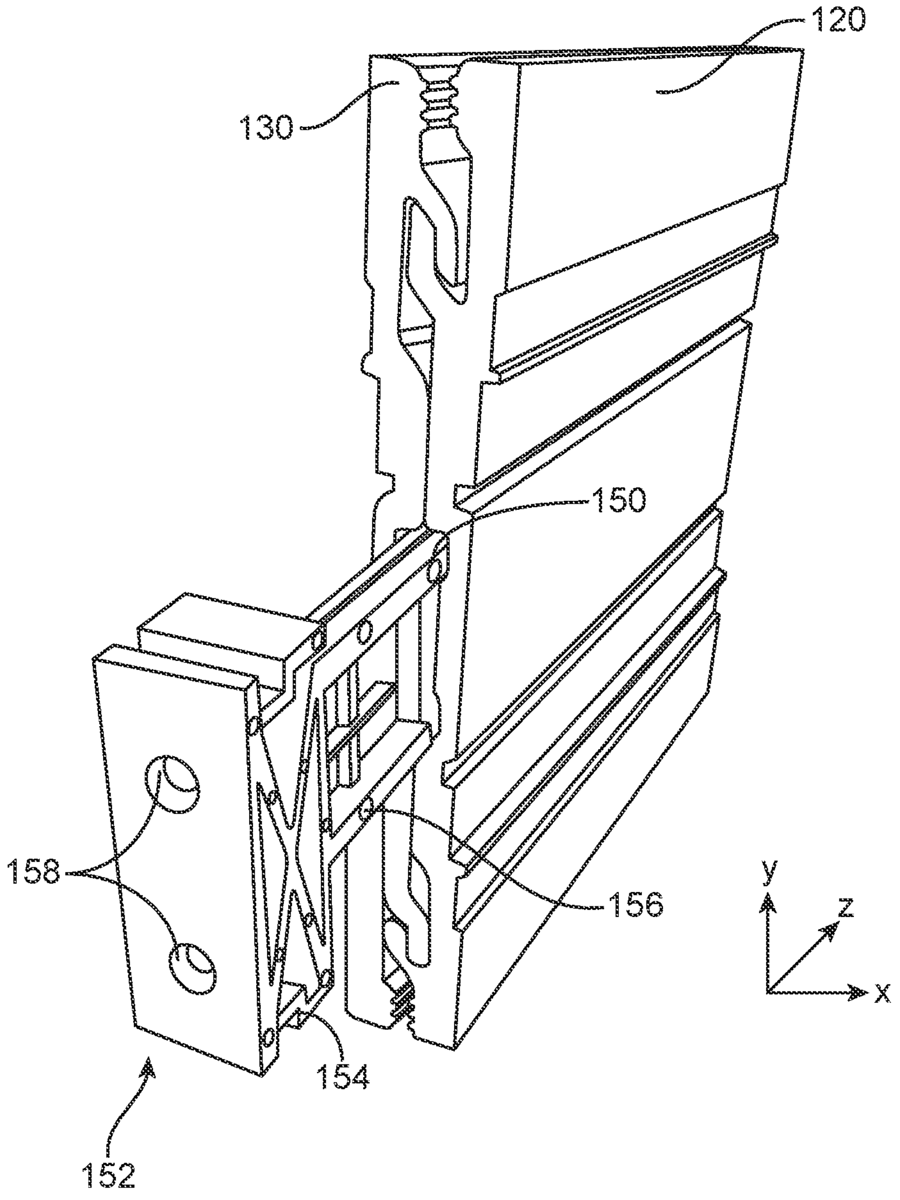
FIG. 11 is an enlarged perspective view of one illustrative embodiment of an end plug partially inserted into an intermediate end plug cavity formed between joining strips used in one illustrative embodiment of a mull joint in a compound fenestration assembly as described herein.

FIG. 11 is an enlarged perspective view of one illustrative embodiment of an end plug 152 partially inserted into an intermediate end plug cavity 150 formed between joining strips 120 and 130 used in one illustrative embodiment of a mull joint in a compound fenestration assembly as described herein. The joining strips 120 and 130 have been removed from their respective fenestration units to provide additional clarity in the arrangement and insertion of end plugs in an intermediate end plug cavity formed between joining strips in one or more embodiments of mull joints as described herein. As seen in, e.g., FIG. 11, the illustrative embodiment of end plug 152 includes a base 154 and a cavity leg 156 that extends away from the base 154. The cavity leg 156 is the portion of the end plug 152 that is positioned in the intermediate end plug cavity 150 at each end of the mull joints formed using joining strips 120 and 130.

As described herein, the cavity leg 156 may, when inserted into the intermediate end plug cavity 150, prevent disengagement of the mechanically interlocking channels on the joining strips 120 and 130 at that end of the mull joint formed by the joining strips 120 and 130. In essence, insertion of the cavity leg 156 into the intermediate end plug cavity 150 locks the joining strips 120 and 130 relative to each other such that the channels cannot be backed out of engagement with each other.

Figure 12:
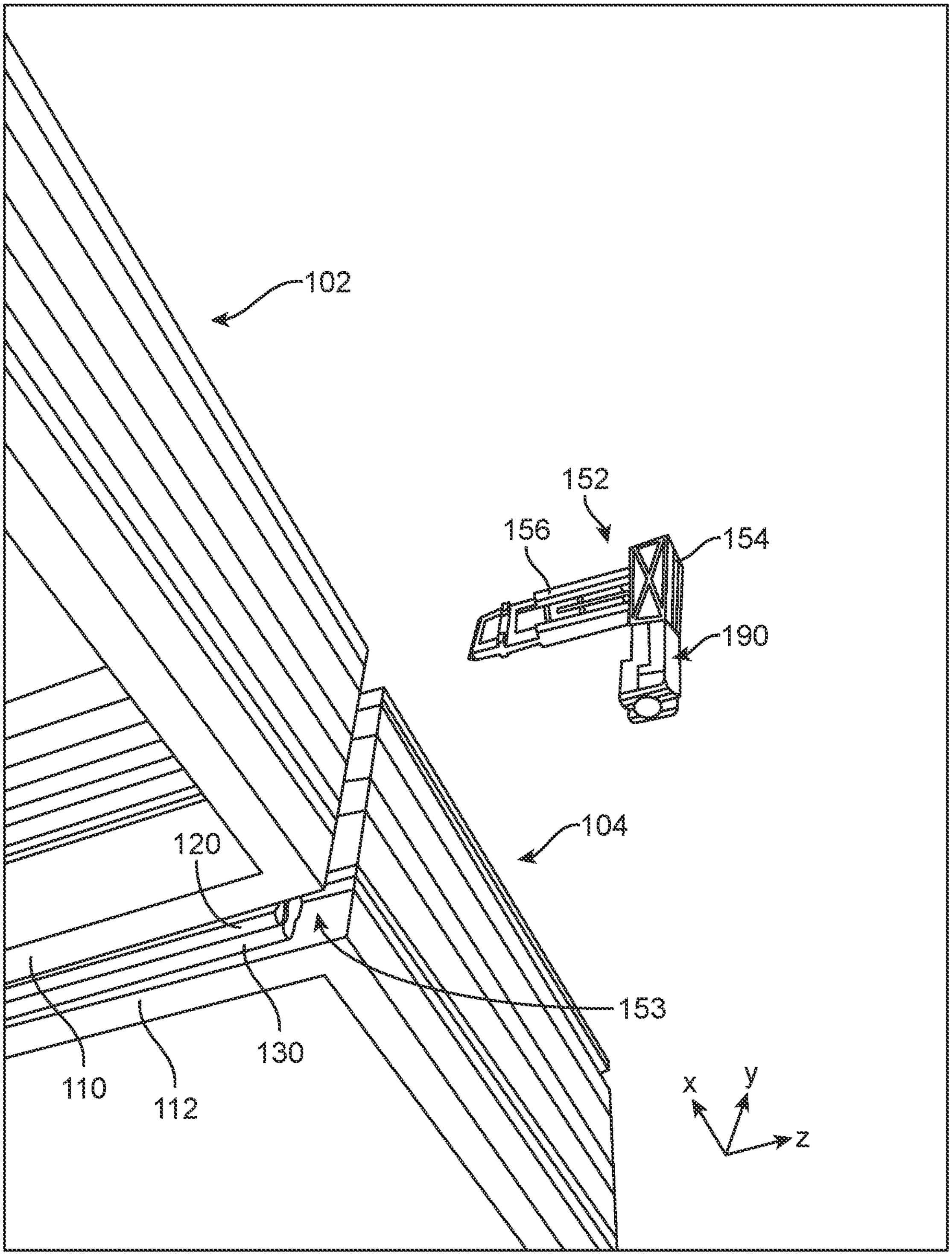
FIG. 12 is a perspective view of the illustrative embodiment of the end plug of FIG. 11 with an end seal member attached thereto prior to insertion of the end plug into the depicted mull joint of the depicted compound fenestration assembly.

In one or more embodiments, the end plug 152 may include one or more openings 158 in the base 154 that are configured to receive a threaded fastener to attach other components to the end plug and, therefore, the mull joint as described herein. FIG. 12 is a perspective view of the illustrative embodiment of end plug 152 before insertion into a mull joint formed between fenestration units 102 and 104. In the view seen in FIG. 12, the joining strips 120 and 130 terminate at a recessed location between the frame member 110 of the fenestration unit 102 and the frame member 112 of the fenestration unit 104 at the end of the depicted mull joint. As a result, a recess 153 is formed at the end of the mull joint between the frame members 110 and 112. When the cavity leg 156 of the end plug 152 is fully inserted into the intermediate end plug cavity 150 formed between the joining strips 120 and 130, the base 154 is, in one or more embodiments, completely contained within the recess 153 formed between frame members 110 and 112.

In the view of FIG. 12, an optional end seal member 190 is depicted as attached to the base 154 of the end plug 152 prior to insertion of the cavity leg 156 of the end plug 152 into the mull joint of the compound fenestration assembly. If so provided, the end seal member 190 may also be described as being located within the recess 153 formed between the frame members 110 and 112 at the ends of the joining strips 120 and 130. As described herein, however, the end seal member 190 may be positioned in the recess 153 at a later time. Further, additional details with respect to the end seal member 190 and its function with respect to the delivery of sealant into the mull joints described herein will be described below.

Figure 13:
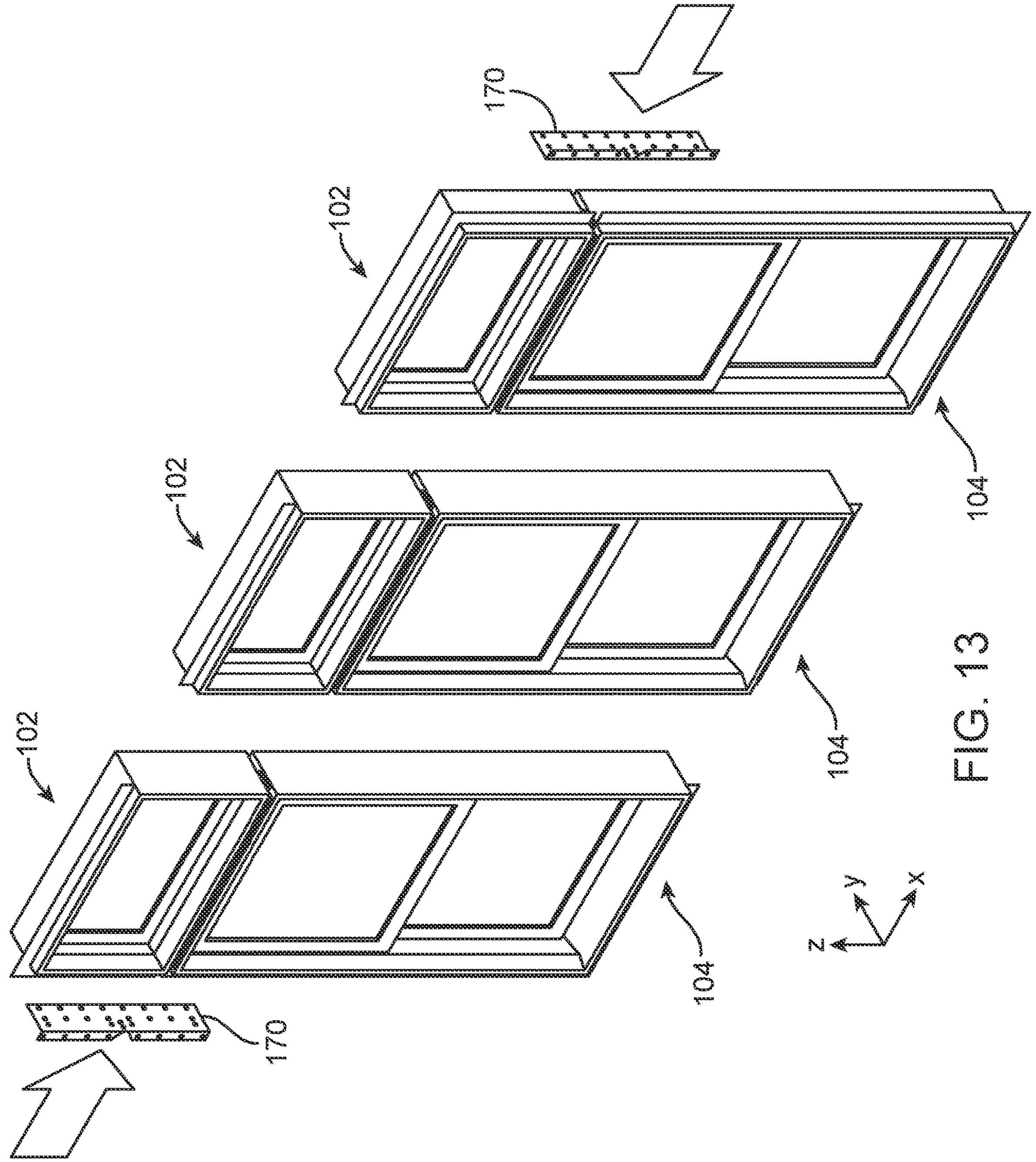
FIG. 13 is a perspective view of the compound fenestration assembly of FIGS. 7-10 depicting placement of one illustrative embodiment of a gusset plate over selected mull joint ends.

FIG. 13 is a perspective view of the compound fenestration assembly of FIG. 10 after insertion of end plugs 152 in the mull joints formed between fenestration units 102 and 104, depicting placement of one illustrative embodiment of a gusset plate 170 over selected mull joint ends of the depicted compound fenestration assembly. In one or more embodiments, each of the gusset plates 170 may be attached to the base 154 of the end plug 152 over which the gusset plates 170 are located. In one or more embodiments, the gusset plates 170 may be attached to the base 154 of the end plugs 152 using threaded fasteners or other fastening components inserted into the apertures 158 in the illustrative embodiment of end plug 152 as depicted in, e.g., FIG. 11. In one or more embodiments, the gusset plates 170 may be described as spanning the ends of the mull joints on which they are located such that the base 154 of an end plug 152 is located between the ends of the joining strips 120 and 130 of the mull joint and the gusset plate 170 (i.e., in the recess 153 located between frame members 110 and 112 as seen in, e.g., FIG. 12). Furthermore, in one or more embodiments the gusset plates 170 may be directly attached to the fenestration units 102 and 104 on opposite sides of the mull joints over which the gusset plates 170 are positioned. As used herein, directly attached means that the gusset plates 170 may be secured to the frame members of the fenestration units 102 and 104 using, e.g., one or more threaded fasteners, rivets, adhesives, etc. In particular, FIG. 14 is a perspective view of the compound fenestration assembly of FIG. 13 depicting attachment of the gusset plates 170 over the selected mull joints of the depicted compound fenestration assemblies using threaded fasteners 129.

Figure 14:
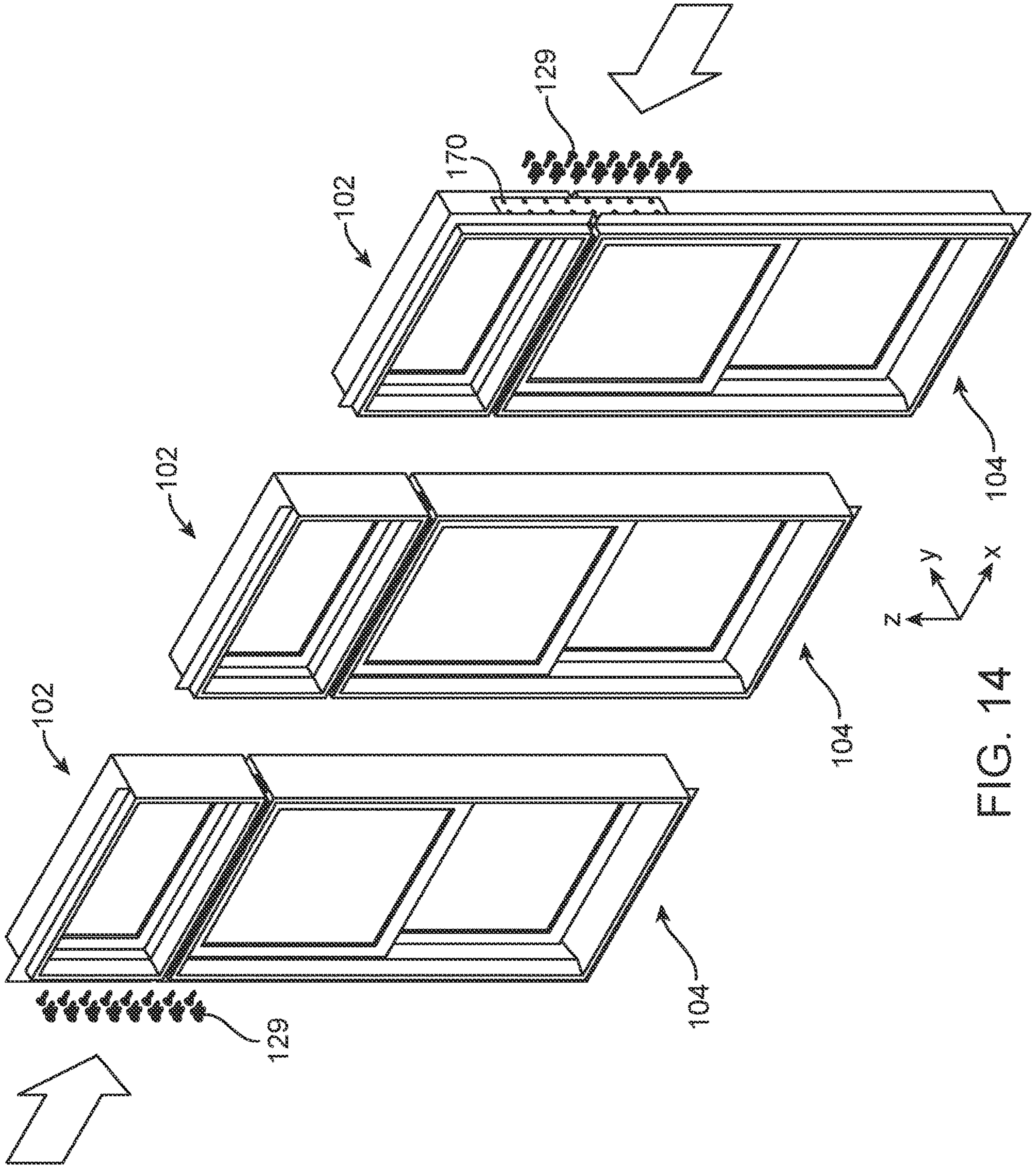
FIG. 14 is a perspective view of the compound fenestration assembly of FIG. 13 depicting attachment of the gusset plate over the selected mull joint ends.
Figure 15:
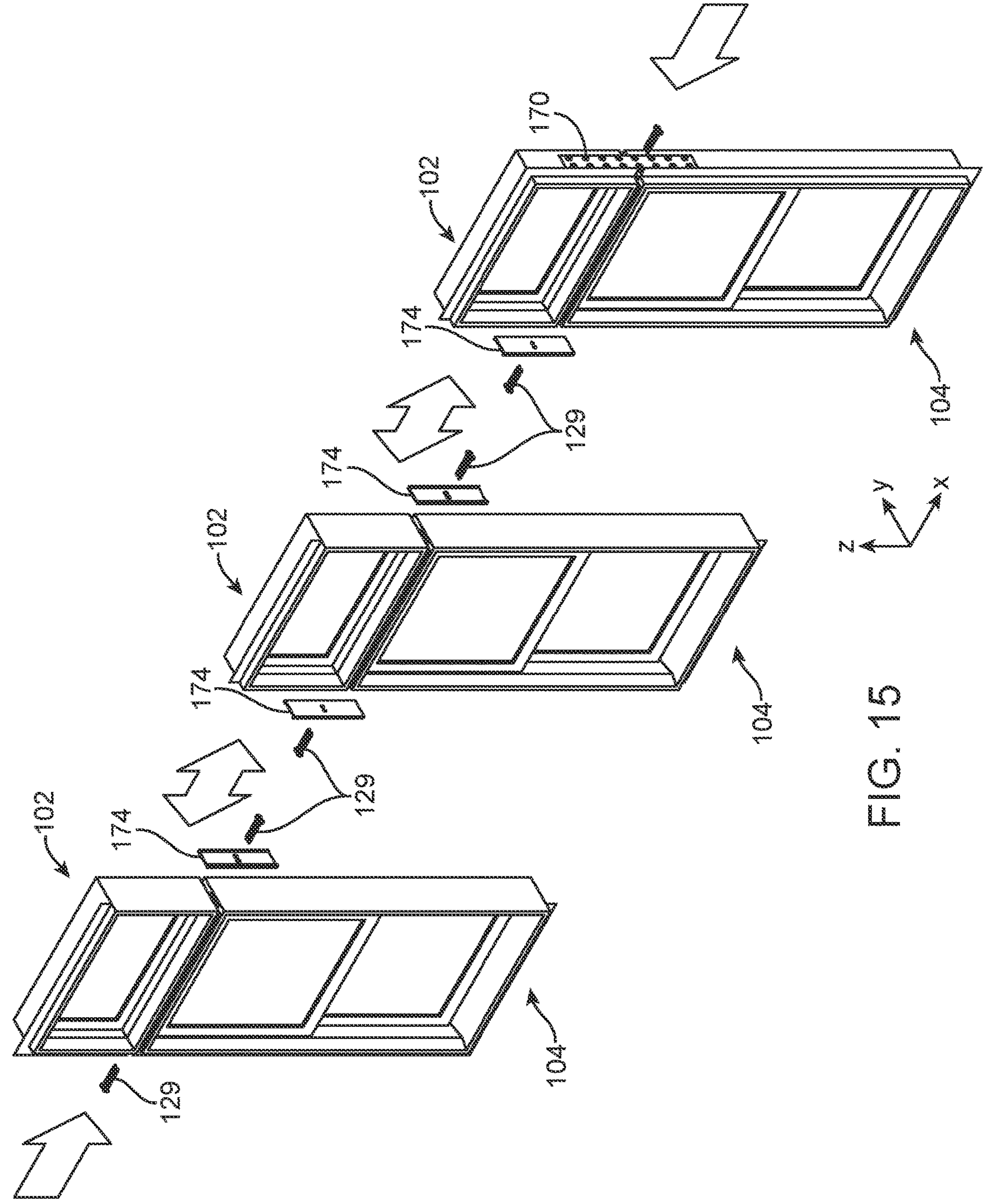
FIG. 15 is a perspective view of the compound fenestration assembly of FIG. 14 depicting placement of one illustrative embodiment of intersection plates on selected mull joint ends.

FIG. 15 is a perspective view of the compound fenestration assembly of FIG. 14 depicting placement of one illustrative embodiment of intersection plates 174 on selected mull joint ends of the depicted compound fenestration assemblies. In the set of three compound fenestration assemblies depicted in FIGS. 14 and 15, selection of the mull joint ends over which gusset plates 170 are located as opposed to the mull joint ends over which intersection plates 174 are located may, in one or more embodiments, be selected based on the location of those mull joint ends in the finished compound fenestration assembly.

In particular, the depicted set of three compound fenestration assemblies, each of which includes an upper fenestration unit 102 and a lower fenestration unit 104, are designed to be attached to each other to form a 3×2 array of fenestration units in the finished compound fenestration assembly. As a result, the outermost mull joint ends covered by gusset plates 170 will not be located adjacent another fenestration unit. As a result, the gusset plates 170 located on the outermost mull joint ends may be, in one or more embodiments, configured for attachment to a framing member of an opening in which the 3×2 unit compound fenestration assembly is located.

In contrast, the intersection plates 174 may be located over mull joint ends that would be located in an interior mull joint formed between fenestration units in the finished 3×2 unit compound fenestration assembly. As with gusset plates 170, the intersection plates 174 may also be attached to the base 154 of an end plug 152 having its cavity leg 156 located in an intermediate end plug cavity facing the mull joint and over which the intersection plate 174 is positioned.

Figure 16:
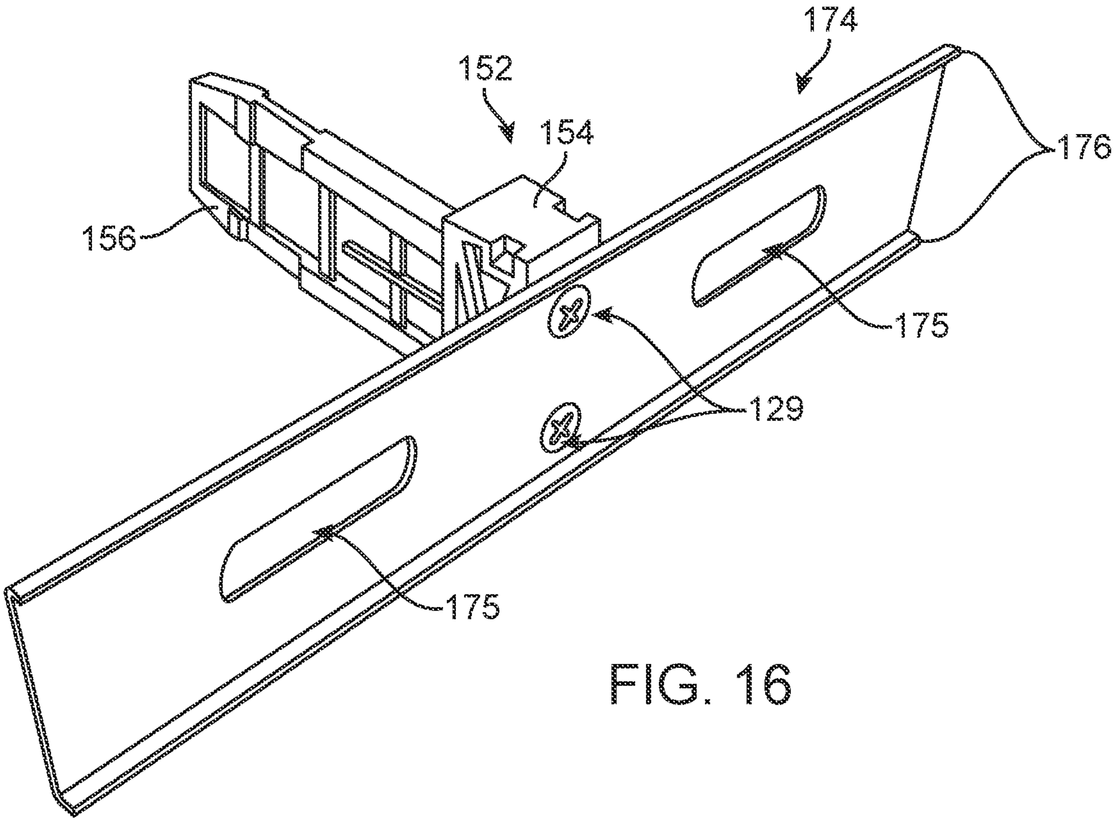
FIG. 16 is an enlarged perspective view of one illustrative embodiment of an intersection plate attached to one illustrative embodiment of an end plug, both of which may be used in one or more embodiments of mull joints in compound fenestration assemblies as described herein.

A subassembly including one illustrative embodiment of an intersection plate 174 attached to a base 154 of an end plug 152 is seen in an enlarged perspective view in FIG. 16. As with the gusset plates 170, the intersection plate 174 may also be attached to the base 154 using, e.g., threaded fasteners 129 (although other fastening techniques using, e.g., rivets, adhesives, etc. may be used in place of threaded fasteners).

In one or more embodiments, the intersection plates 174 used in interior mull joints such as those depicted in, e.g., FIG. 15, may include ribs 176 or other features that, in one or more embodiments, are designed to mate with recesses or other complementary features found in a joining strip to be located over the intersection plate 174. In particular, the ribs 176 may be sized and positioned to fit within slots formed in the backside of a joining strip such as, e.g., slots 25 in joining strip 20 or slots 35 in joining strip 30 as seen in, e.g., FIGS. 1-4.

In one or more embodiments, the complementary features found on the intersection plate 174 and a joining strip located over the intersection plate 174 as a part of constructing a mull joint as described herein may be used to assist in aligning the joining strip along the side of a compound fenestration assembly. In one or more embodiments, the complementary features found on the intersection plate 174 and the joining strip located over the intersection plate as a part of constructing a mull joint as described herein may be used to transfer mechanical loads (e.g., wind loads, etc.) between a set of vertical mull joints and a set of horizontal mull joints such as would be found in a 3×2 unit compound fenestration assembly manufactured using the set of three compound fenestration unit assemblies seen in, e.g., FIG. 15. In particular, intersection plates used in mull joints in compound fenestration unit assemblies as described herein, such as, e.g., intersection plates 174, may be useful in transferring loads between a pair of horizontal and vertical mull joints that meet at the intersection of a pair of mull joint assemblies that are connected together as depicted in, e.g., FIG. 17.

In one or more embodiments, the intersection plates 174 may include apertures 175 to provide for passage of fasteners driven through locator plates used to assist in locating a joining strip over the intersection plate 174 in a compound fenestration assembly as described herein.

Figure 17:
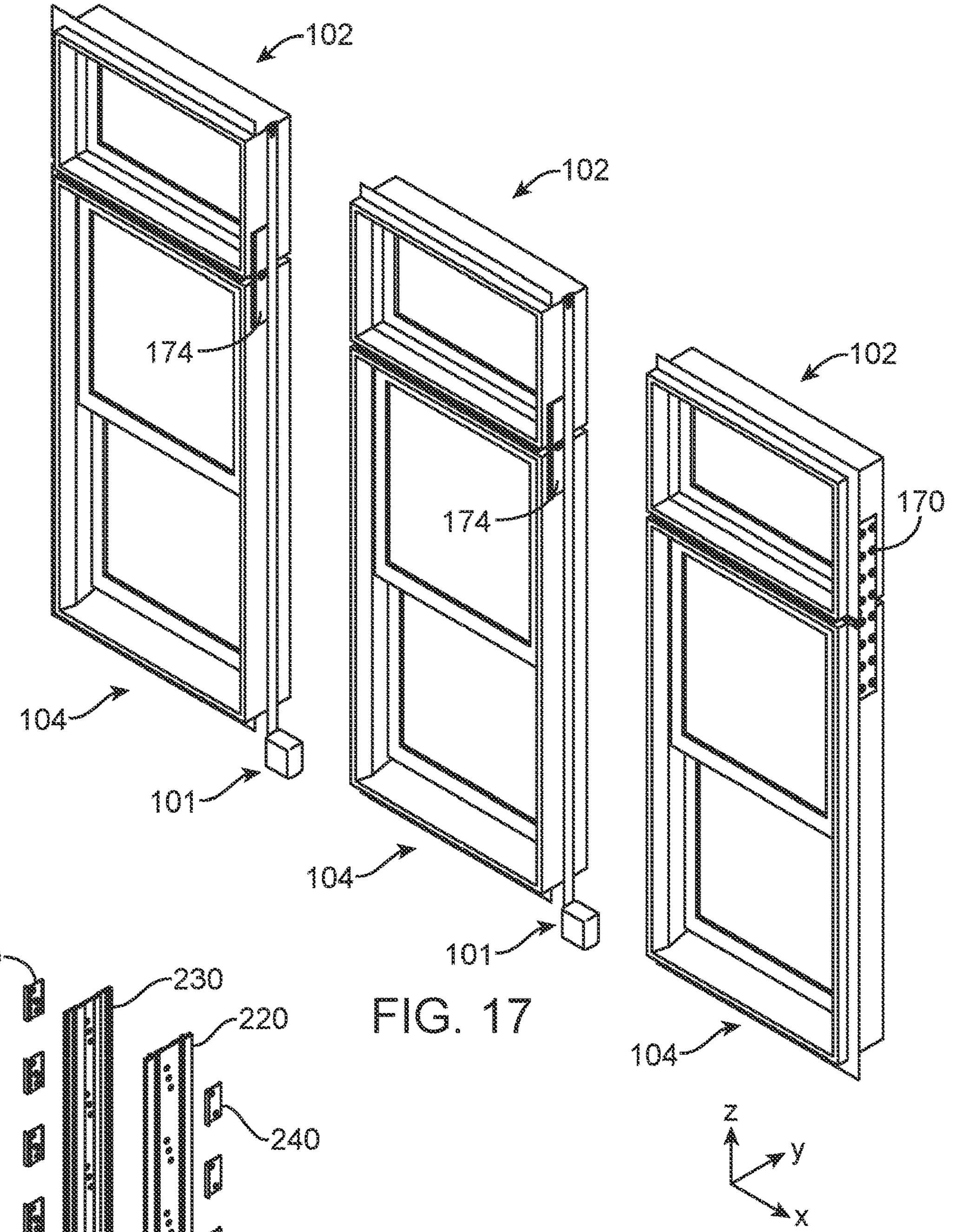
FIG. 17 is a perspective view of the compound fenestration assembly of FIG. 16 in the process of being measured for attachment of joining strips as described herein.
Figure 18:
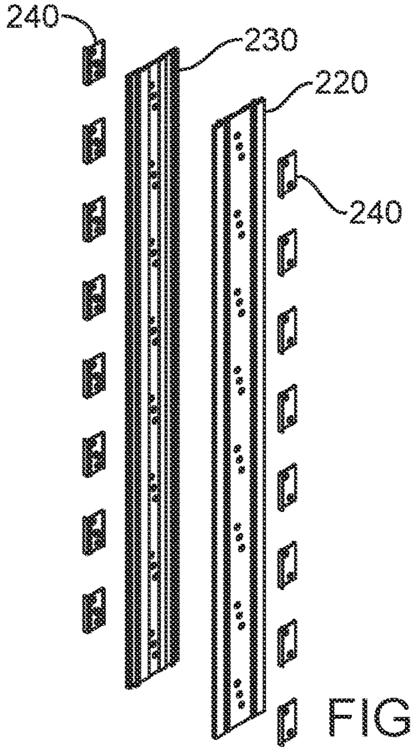
FIG. 18 is a perspective view of one illustrative embodiment of a pair of joining strips and associated locator plates to be attached to fenestration units in one illustrative embodiment of a compound fenestration assembly as described herein.

FIG. 17 is a perspective view of the compound fenestration assembly of FIG. 16 in which the interior mull joints along which intersection plates 174 are located are in the process of being measured for attachment of joining strips 220 and 230 as depicted in, e.g., FIG. 18. Measurement of the mull joints as depicted in FIG. 17 provides an installer/assembler with the information needed to properly size the joining strips such that recesses with the proper depth can be formed at each end of the mull joints to receive the base of an end plug (see, e.g., the view of FIG. 12 and its associated description). The joining strips 220 and 230 are depicted in FIG. 18 along with associated locator plates 240 that may be used to assist in locating the joining strips 220 and 230 properly along the interior mull joints of a compound fenestration assembly as described herein.

Figure 19:
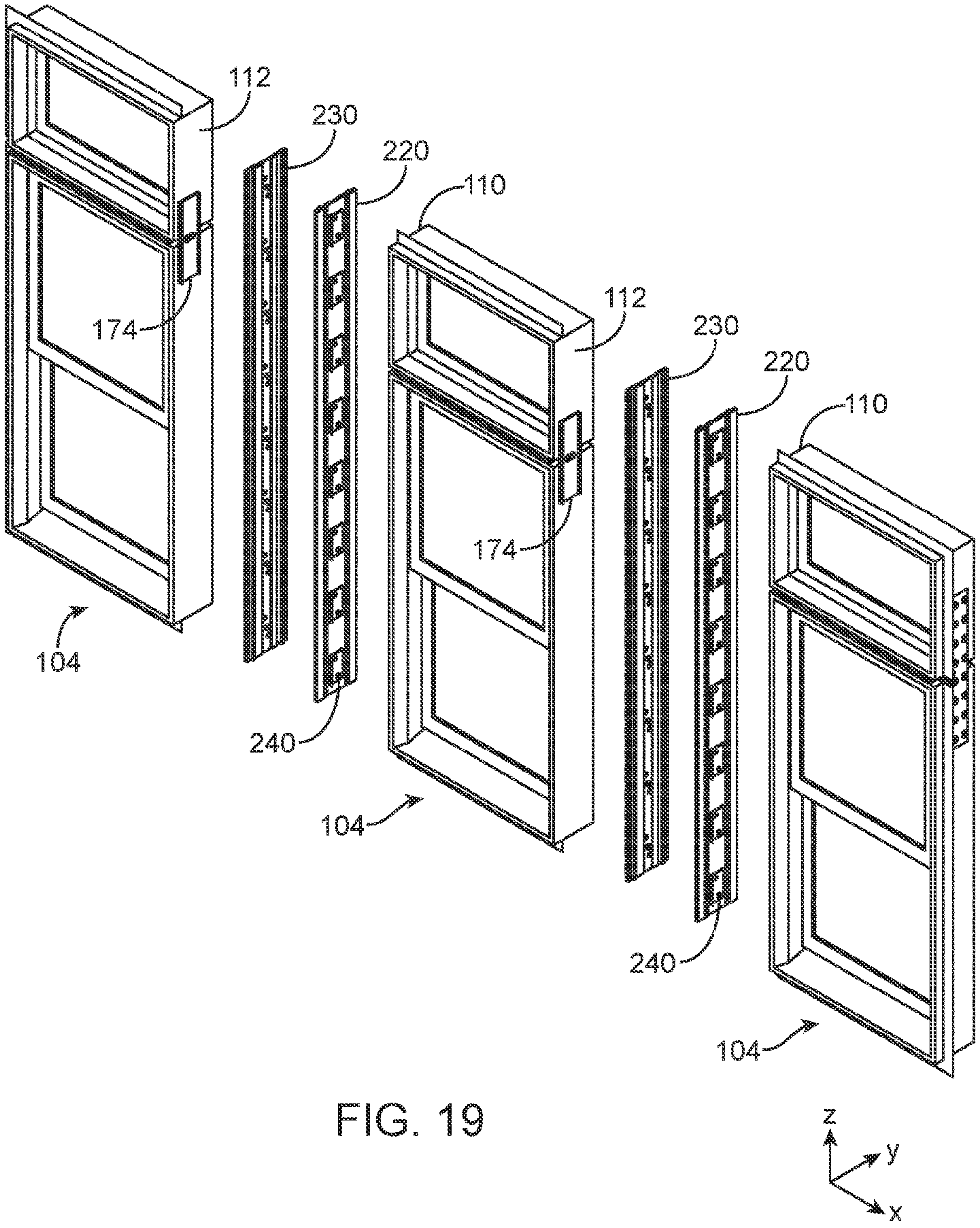
FIG. 19 is a perspective view of the joining strips and associated locator plates in position for attachment to the compound fenestration assemblies depicted in FIG. 18.
Figure 20:
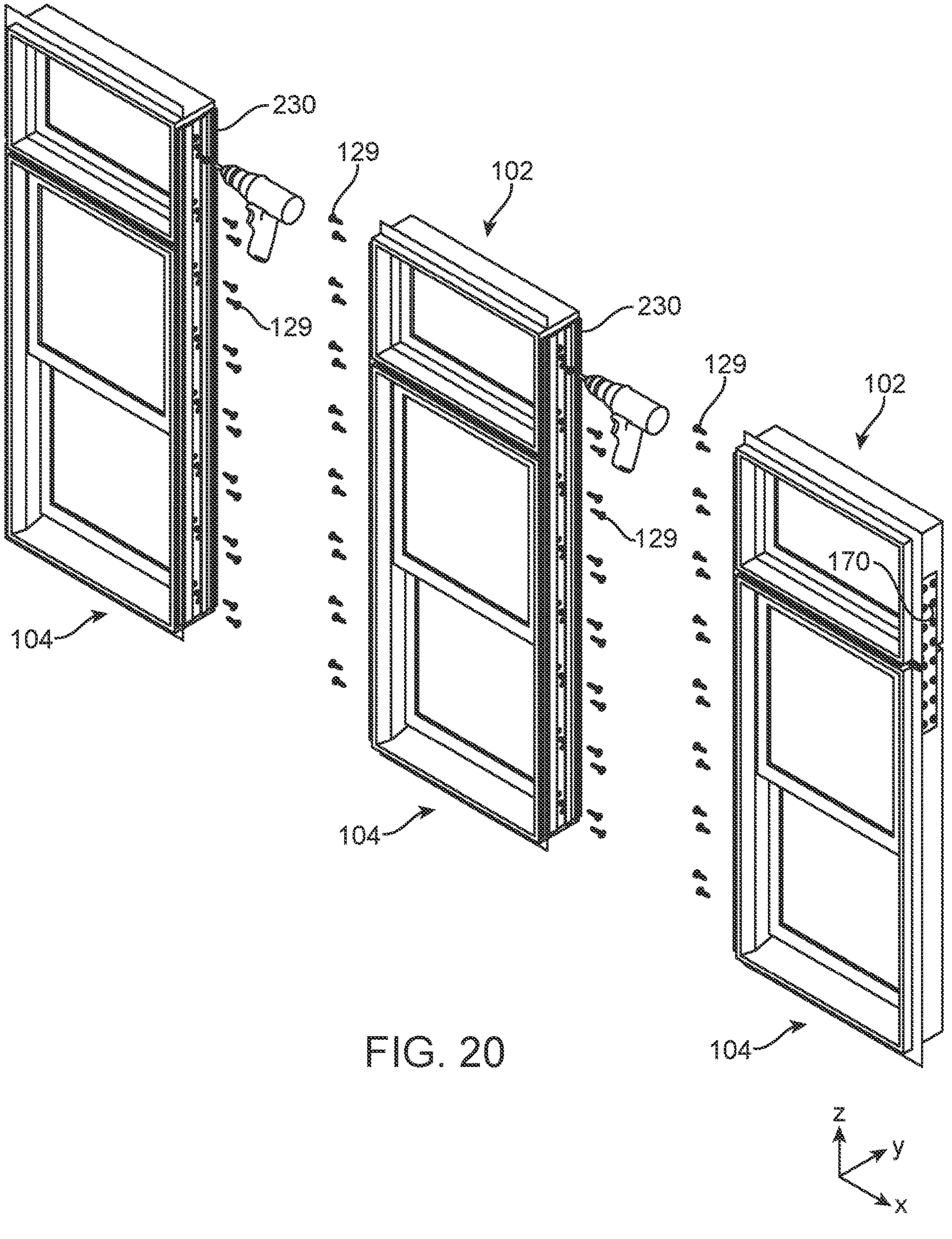
FIG. 20 is a perspective view of one illustrative embodiment of attaching the joining strips and associated locator plates of FIG. 19 to the compound fenestration assemblies depicted in FIGS. 18-19.

FIG. 19 is a perspective view of the joining strips 220 and 230 and associated locator plates 240 in position for attachment to the interior mull joints of the compound fenestration assemblies depicted in FIG. 18, while FIG. 20 is a perspective view depicting attachment of the joining strips 220 and 230 and associated locator plates 240 to the compound fenestration assemblies depicted in FIGS. 18-19 (over locator plates 174.

Figure 21:
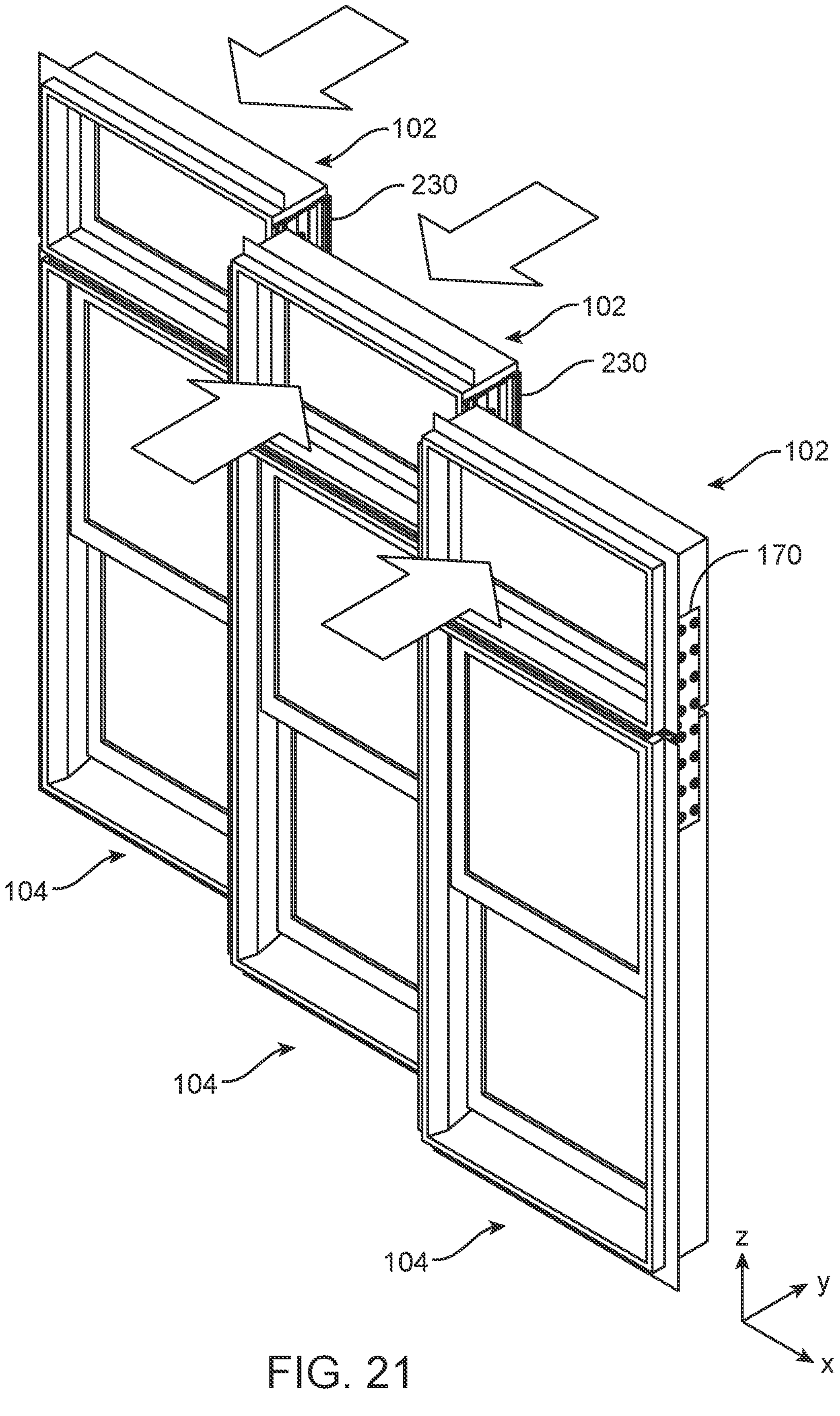
FIG. 21 is a perspective view of one illustrative embodiment of joining fenestration units in one illustrative embodiment of a compound fenestration assembly as described herein.

With the joining strips 220 and 230 attached to the 1×2 unit compound fenestration assemblies, FIG. 21 depicts joining of the 1×2 unit compound fenestration assemblies to form a 3×2 unit compound fenestration assembly as described herein. As discussed herein in connection with other mull joints, the joining strips 220 and 230 have corresponding channels facing in opposite directions which form a mechanically interlocking connection in the interior mull joints between the 1×2 unit compound fenestration assemblies of the larger 3×2 unit compound fenestration assembly.

Figure 22:
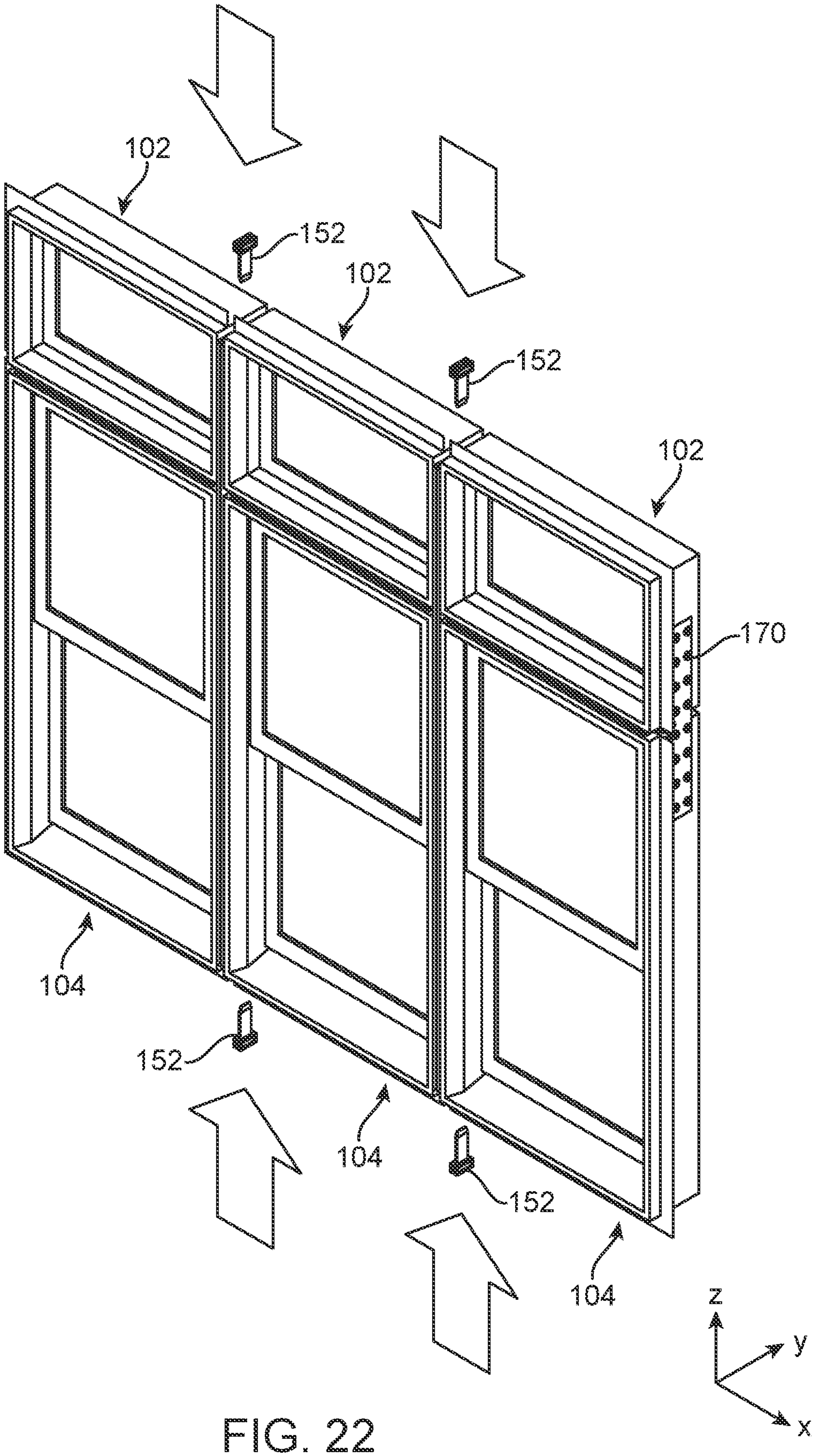
FIG. 22 is a perspective view depicting installation of one illustrative embodiment of end plugs in selected mull joints of the illustrative embodiment of a compound fenestration assembly as described herein.

With the larger 3×2 unit compound fenestration assembly arranged as seen in, e.g., FIG. 22, end plugs 152 may be positioned in the mull joint ends at the top and bottoms of the interior vertical mull joints formed between the adjacent 1×2 unit compound fenestration assemblies including an upper fenestration unit 102 and a lower fenestration unit 104.

Figure 23:
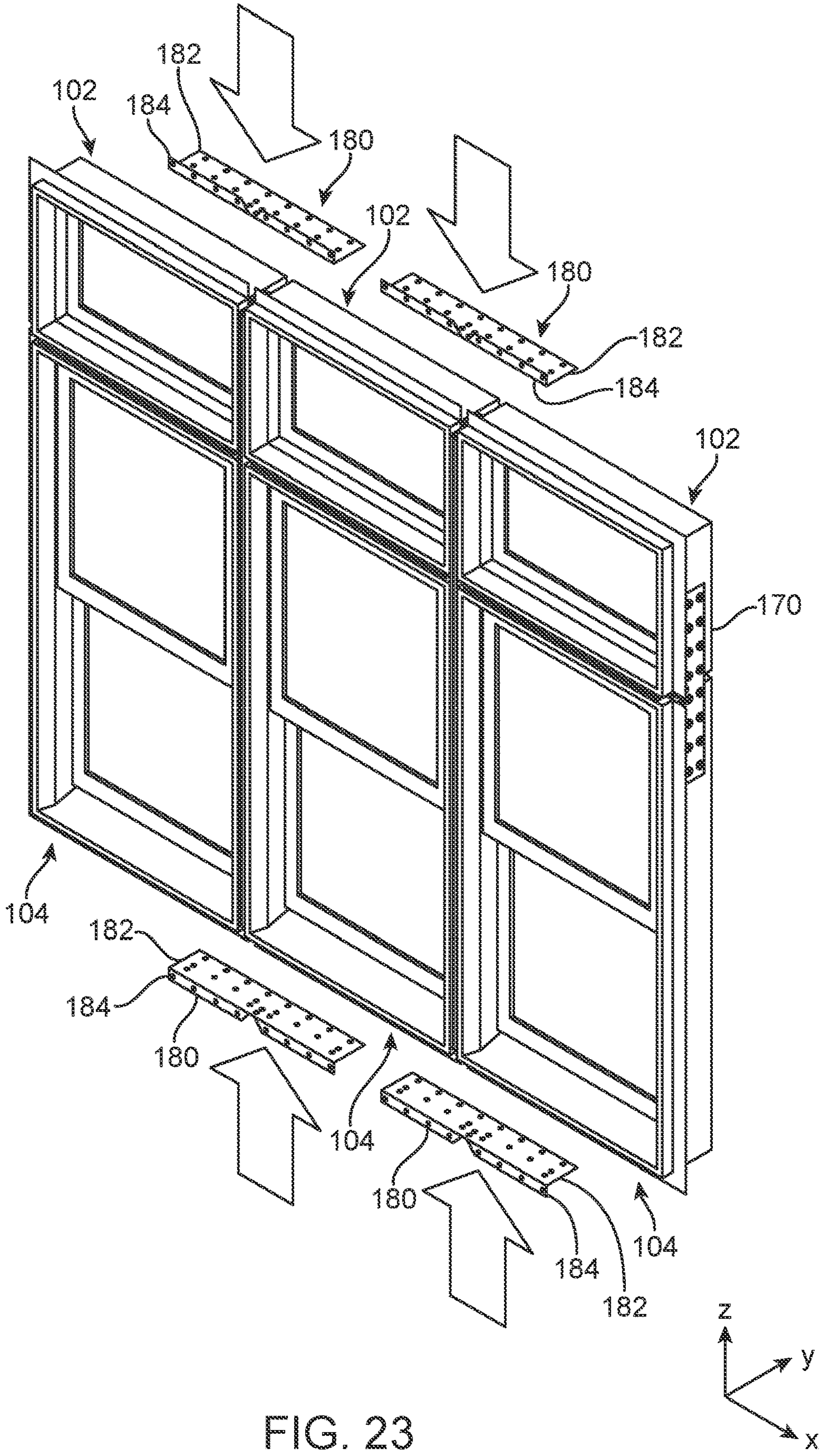
FIG. 23 is a perspective view of one illustrative embodiment of a compound fenestration assembly depicting placement and attachment of one illustrative embodiment of gusset plates on selected ends of mull joints as described herein.

FIG. 23 is a perspective view of one illustrative embodiment of a compound fenestration assembly depicting placement and attachment of one illustrative embodiment of gusset plates on selected ends of mull joints as described herein.

FIG. 23 is a perspective view of the compound fenestration assembly of FIG. 10 after insertion of end plugs 152 in the interior mull joints formed between the 1×2 unit compound fenestration assemblies depicting placement of one illustrative embodiment of a gusset plate 180 over the interior mull joint ends. In one or more embodiments, each of the gusset plates 180 may be attached to the base 154 of the end plug 152 over which the gusset plates 180 are located. In one or more embodiments, the gusset plates 180 may be attached to the bases 154 of the end plugs 152 using threaded fasteners or other fastening components inserted into the apertures 158 in the illustrative embodiment of end plug 152 as depicted in, e.g., FIG. 11. In one or more embodiments, the gusset plates 180 may be described as spanning the ends of the interior mull joints on which they are located such that the base 154 of an end plug 152 is located between the ends of the joining strips 220 and 230 of each interior mull joint and the gusset plate 180 (i.e., in the recess 153 located between frame members on each side of the mull joint as seen in, e.g., FIG. 12). Furthermore, in one or more embodiments the gusset plates 180 may be directly attached to the fenestration units 104 on opposite sides of the interior mull joints over which the gusset plates 180 are positioned. As used herein, directly attached means that the gusset plates 180 may be secured to the frame members of the fenestration units 104 using, e.g., one or more threaded fasteners, rivets, adhesives, etc.

The gusset plates 180 depicted as being positioned over interior mull joints in, e.g., FIG. 23, may include a base 182 and a flange 184. The base 182 may be configured for attachment to the frame members of the fenestration units 102 or 104 on opposite sides of the mull joints, while the flanges 184 may be configured for attachment to e.g., a framing member defining an opening in which the compound fenestration assembly is located.

Figure 24:
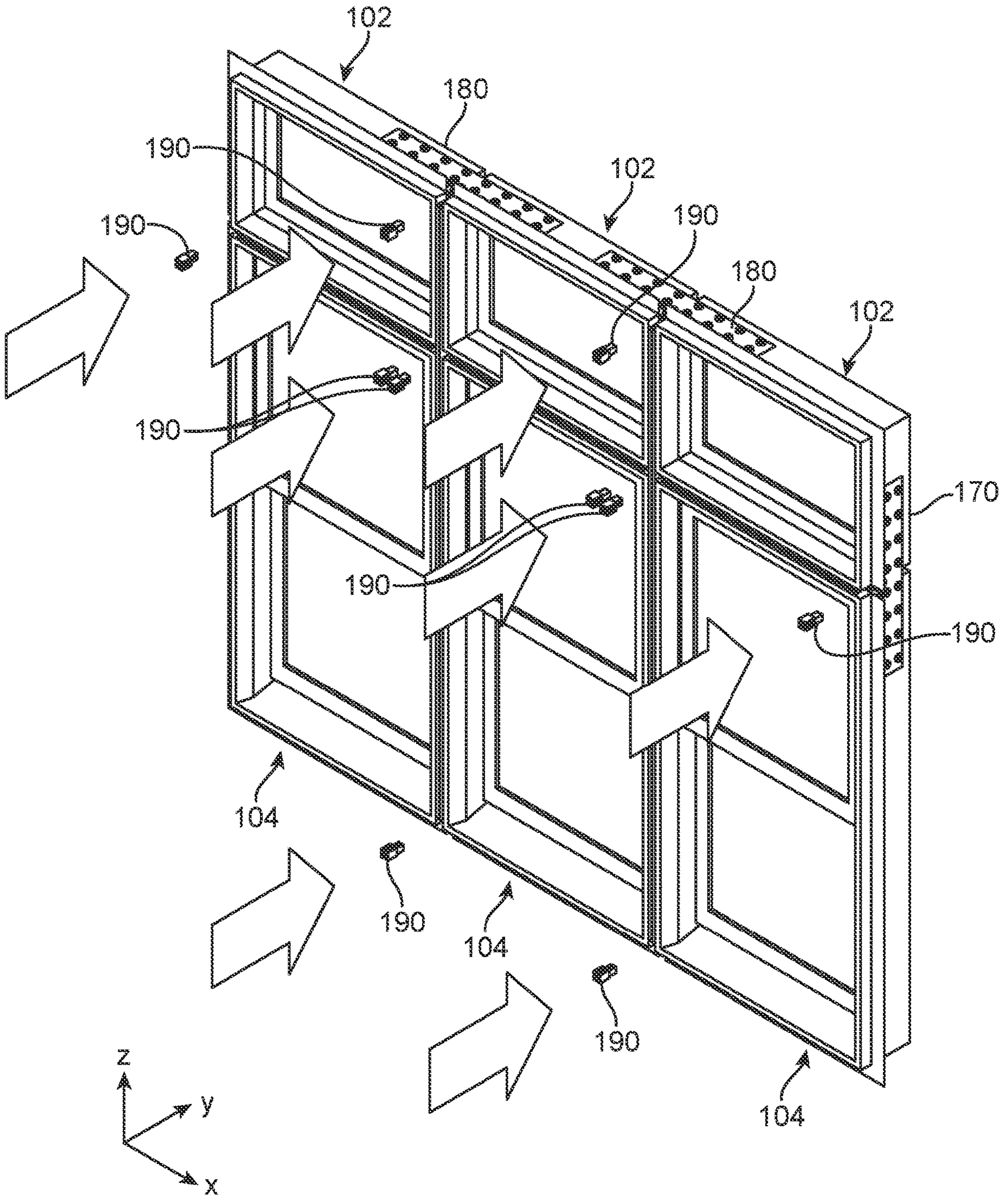
FIG. 24 is a perspective view depicting one illustrative embodiment of placement of end seal members in selected mull joint ends of the depicted illustrative embodiment of a compound fenestration assembly.

FIG. 24 is a perspective view of the compound fenestration assembly of FIG. 23 depicting one illustrative embodiment of placement of end seal members 190 in the recesses formed in the selected mull joint ends (see, e.g., FIG. 12 for a depiction of the recess 153 formed at the ends of mull joints in compound fenestration assemblies as described herein). The end seal members 190 may be used to assist in sealing the ends of the mull joints to limit the penetration of air and/or water into the mull joints at the ends thereof.

Figure 25A:
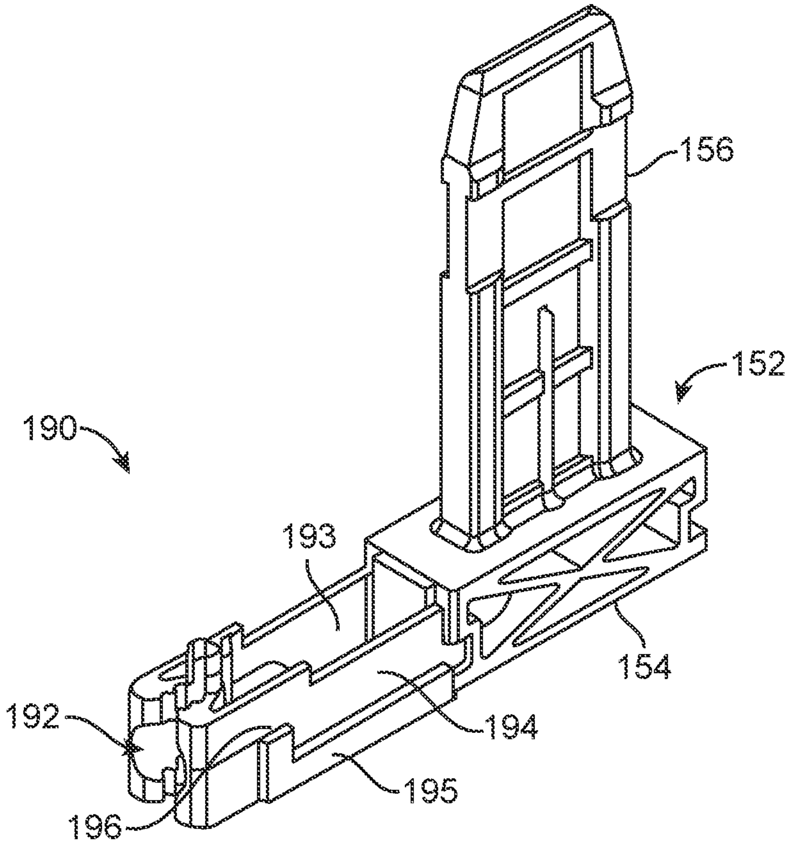
FIG. 25A is an enlarged perspective view of illustrative embodiments of an end plug and an end seal member that may be used in connection with mull joints in compound fenestration assemblies as described herein.

FIG. 25A is an enlarged perspective view of one illustrative embodiment of an end seal member 190 attached to a base 154 of an end plug 152 having a cavity leg 156. In one or more embodiments, the end seal member 190 may include features designed to attach the end seal member 190 to the base 154 although such an arrangement may not be required in all embodiments. Reference to the end seal member 190 as depicted in FIG. 12 in addition to FIG. 25A may assist the reader in understanding the features, functions, and arrangement of one or more embodiments of end seal members in mull joints as described herein.

In one or more embodiments, the end seal member 190 may include a sealant port 192 which opens away from the base 154 of the end plug 152. In one or more embodiments, the end seal member 190 may be located on an exterior side of the compound fenestration assembly such that the sealant port 192 opens in the same direction as the exterior side of the compound fenestration assembly. The sealant port 192 is, in one or more embodiments, in fluid communication with a sealant reservoir 193 positioned between the frame members 110 and 112 located on each side of the recess 153 in which the end seal member 190 is positioned. The sealant reservoir 193 is defined by walls 194 on each side of the sealant reservoir 193. A sealant dam 195 may, in one or more embodiments, be provided on the exterior of the reservoir wall 194 such that sealant escaping from the reservoir 193 flows over the exterior of the reservoir wall 194 (between a frame member and the reservoir wall 194) until it reaches the sealant dam 195, at which point the sealant flows along the exterior wall 194 towards the sealant port 192. As the sealant reservoir 193 and the channel formed between exterior wall 194 and sealant dam 195 fills with sealant, the sealant escapes through opening 196 alongside reservoir wall 194 in the direction of sealant port 192. As a result, the person delivering sealant through sealant port 192 can observe when the sealant has filled the reservoir 193 and formed a seal between end seal member 190, the opposing frame members between which the end seal member 190 is located, and the ends of the joining strips.

In one or more alternative embodiments, the end seal member may be optional where, for example, a gusset plate or other cover may be placed over the end of a mull joint to allow for the injection of sealant into the recess 153 formed between frame members 110 and 112 of a mull joint in a compound fenestration assembly as described herein. Although depicted as separate members connected to each other in FIG. 25A (and FIG. 12) one or more alternative embodiments of the end seal members and end plugs used in the mull joints described herein may include end seal members formed integrally (e.g., molded, machined, etc.) with end plugs.

Figure 25B:
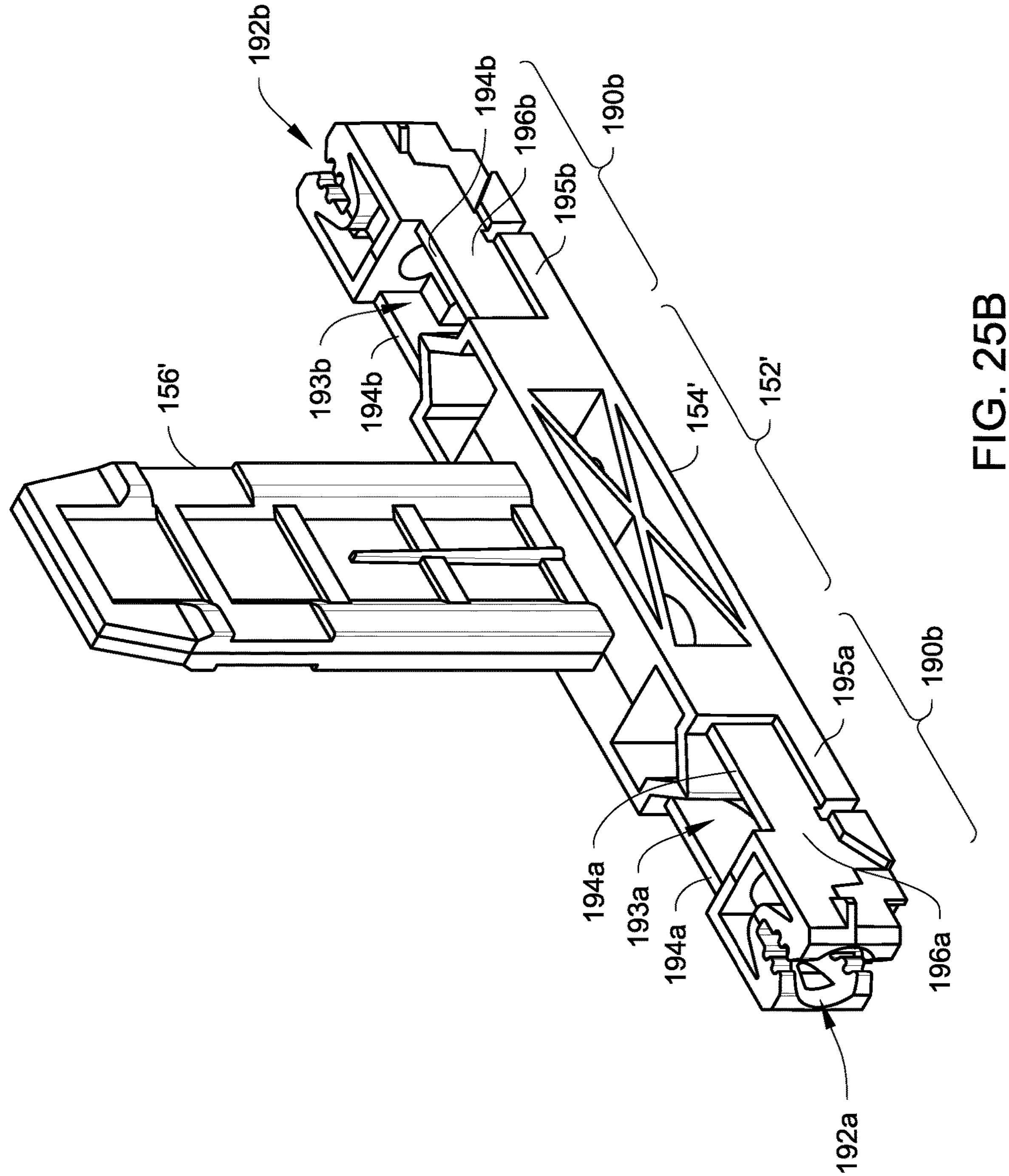
FIG. 25B is an enlarged perspective view of illustrative embodiments of an end plug and a pair of end seal members that may be used in connection with mull joints in compound fenestration assemblies as described herein.

FIG. 25B is an enlarged perspective view of another illustrative embodiment of an end plug 152' having a base 154' and a cavity leg 156', with a pair of an end seal members 190*a* and 190*b* attached to the end plug 152' at opposite ends of the base 154'. Providing end seal members 190*a* and 190*b* at opposite ends of the base 154' of the end plug 152' may, in one or more embodiments, provide the ability for more flexibility in placement of the end plug 152' and/or may provide the user with the ability to seal the end of a mull joint from both the interior and exterior sides of the fenestration units.

The end seal members 190*a* and 190*b* (collectively referred to as end seal members 190*a*/b with their various features being identified as reference nos. 19Xa and 19Xb-collectively referred to by reference nos. 19Xa/b in the following discussion). The end seal members 190*a*/b may include sealant ports 192*a*/b which open away from the base 154' of the end plug 152'. The sealant ports 192*a*/b are, in one or more embodiments, in fluid communication with sealant reservoirs 193*a*/b positioned between the fenestration unit frame members located on each side of a plug recess in which the end seal members 190*a*/b are positioned. The sealant reservoirs 193*a*/b are defined by walls 196*a*/b on each side of the sealant reservoirs 193*a*/b. Sealant dams 195*a*/b may, in one or more embodiments, be provided on the exteriors of the reservoir walls 196*a*/b such that sealant escaping from the reservoirs 193*a*/b flows over the edges 194*a*/b of the reservoir walls 196*a*/b (e.g., between a frame member and the reservoir wall 196*a*/b) until it reaches the sealant dam 195*a*/b, at which point the sealant flows along the exterior wall 196*a*/b towards the sealant port 192*a*/b of the seal member 190*a*/b. As the sealant reservoir 193*a*/b and the channel formed between exterior wall 196*a*/b and sealant dam 195*a*/b fills with sealant, the sealant may flow/escape over the edge 194*a*/b of reservoir wall 196*a*/b in the direction of sealant port 192*a*/b of the seal member 190*a*/b. As a result, the person delivering sealant through sealant port 192*a*/b can observe when the sealant has filled the reservoir 193*a*/b connected to that port and formed a seal between end seal member 190*a*/b, the opposing frame members between which the end seal member 190*a*/b is located, and the ends of the joining strips.

Figure 26:
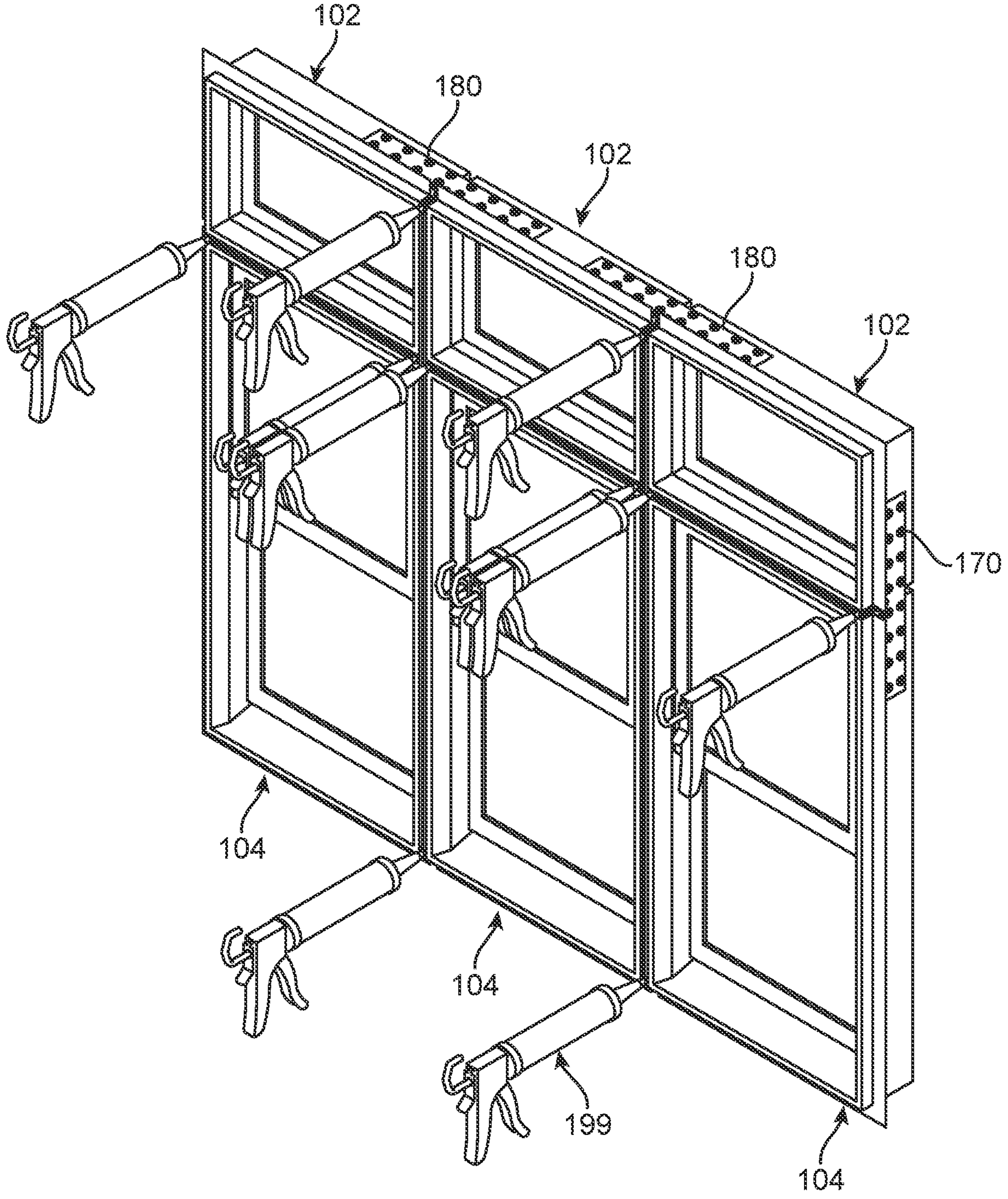
FIG. 26 is a perspective view of one illustrative embodiment of delivery of sealant into the end seal members in the compound fenestration assembly depicted in FIG. 25A.

FIG. 26 is a perspective view of one illustrative embodiment of delivery of sealant into the end seal members 190 after they have been inserted into the mull joint ends in the compound fenestration assembly depicted in FIG. 25A.

Figure 27:
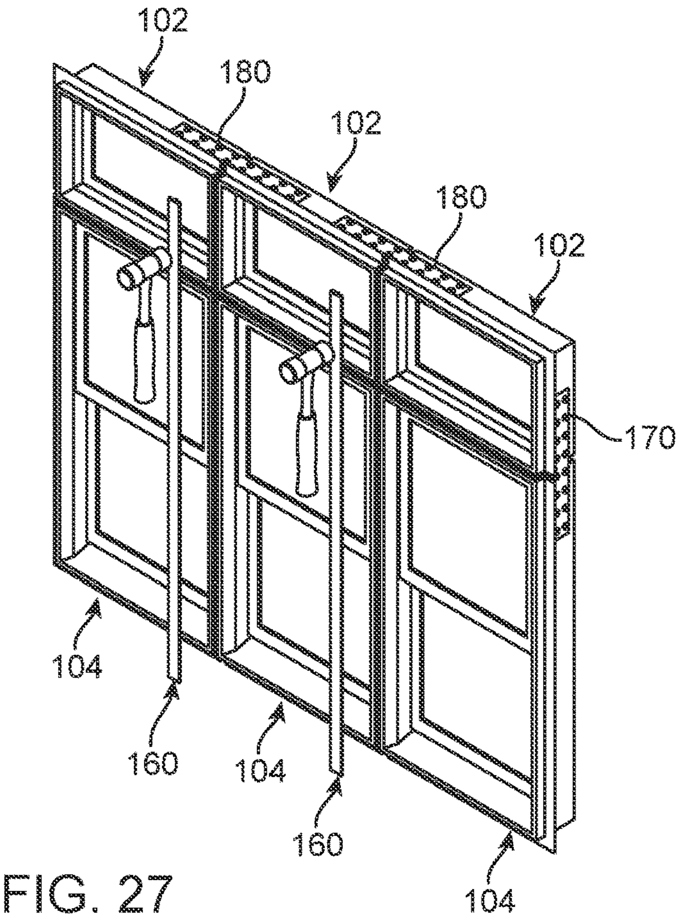
FIGS. 27 and 28 depict installation of one illustrative embodiment of trim members in mull joints in compound fenestration assemblies as described herein.
Figure 28:
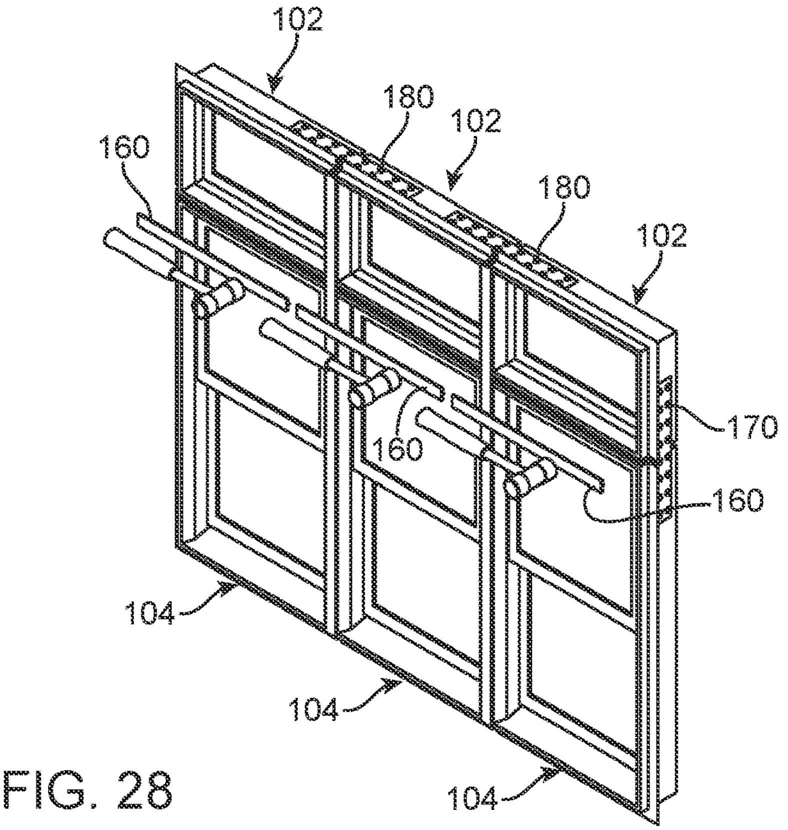

FIGS. 27 and 28 depict installation of one illustrative embodiment of trim strips 160 in mull joints of compound fenestration assemblies as described herein. Reference to, e.g., FIG. 2B may assist the reader in understanding assembly of the trim strips 60/160 into trim slots 31 and/or 21 located at opposite ends of the mull joints in compound fenestration assemblies as described herein. As described in connection with FIG. 2B, the trim slots in one or more embodiments of the mull joints may be sized and positioned to receive and retain a fin extending from a body of each trim strip 160 such that the trim strip 160 is retained in position on one side of the mull joint.

Although gusset plates having both a base and a flange (e.g., illustrative embodiments of gusset plates 170 and 180 as depicted in, e.g., FIGS. 13-15 and 23) can be used to secure a compound fenestration assembly as described herein within a rough opening in a manner that transfers mechanical loads (such as, e.g., wind loads, etc.) from the compound fenestration assembly to the framing members defining the rough opening, the base and flange construction of such gusset plates can be used primarily in new construction where access to the framing members is available.

FIGS. 29-35 depict illustrative embodiments of bracket plates and end plugs that can be used in connection with the joining strips of mull joints as described herein to secure a compound fenestration assembly in an existing opening in which access to vertical surfaces of the frame members defining a rough opening is not easily available.

One illustrative embodiment of a bracket plate 384 is depicted in FIGS. 29-32 along with an alternative embodiment of a bracket plug 352 configured for use with the bracket plate 384 to secure a compound fenestration assembly as described herein within an opening. The bracket plate 384 includes a base 385 that is configured for attachment to only an interior surface of an opening in which a compound fenestration assembly as described herein may be located using fastener openings 386. The bracket plug 352 includes a base 354 and a cavity leg 356 that is configured to be positioned in an intermediate end plug cavity formed between a pair of joining strips used to construct a mull joint in a compound fenestration assembly as described herein. In addition, the base 354 of the bracket plug 352 includes a base fastener bore aligned with an interior/exterior axis 301. A threaded fastener 389 is depicted in the base fastener bore in the base 354 in FIG. 29 (although a threaded fastener 389 is depicted, other structures such as, e.g., pins, rods, etc. could be used in place of a threaded fastener).

The bracket plate 384 includes a fastener block 387 attached to the base 385. In one or more embodiments, the fastener block 387 is sized and configured to be located between frame members at an end of a mull joint in a manner similar to the end plug bases and end seal members as described herein. The fastener block 387 includes a block fastener bore aligned with the base fastener bore formed in the base 354 such that threaded fastener 389 can be inserted through the base fastener bore in the base 354 and connect into the block fastener bore in the fastener block 387 to secure the bracket plug 352 to the fastener block 387 which, in turn, is attached to the base 385 of the bracket plate 384.

Figure 30:
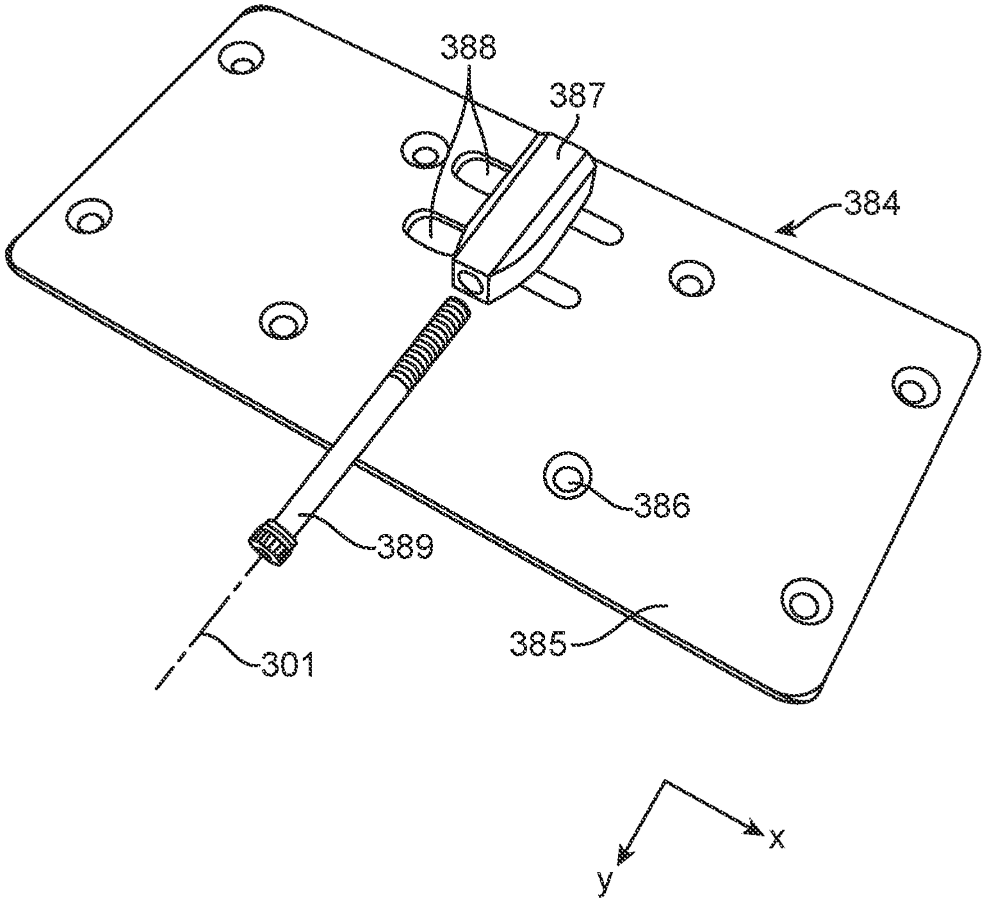
FIG. 30 is a perspective view of the bracket plate and fastener after removal of the end plug from the assembly depicted in FIG. 29.

The base 385 and attached fastener block 387 of bracket plate 384 are depicted without the bracket plug 352 in FIG. 30. As seen in that figure, the threaded fastener 389 is aligned along interior/exterior axis 301. Furthermore, another optional feature depicted in connection with this illustrative embodiment of bracket plate 384 are slots 388 used to attach fastener block 387 to the base 385. In one or more embodiments, the slots 388 and corresponding features on the fastener block 387 are configured to allow the fastener block 387 to move relative to the base 385 of the bracket plate 384. Movement of the fastener block 387 relative to the base 385 may assist in connection of the bracket plug 352 to the fastener block 387 and, therefore, to the bracket plate

384 in situations where some variation in spacing and placement of the mull joint relative to the base 385 of the bracket plate 384 occur.

Although movement of the fastener block 387 along the plane defined by the base 385 of the bracket plate 384 is allowed, the fastener block 387 is attached to base 385 in a manner that prevents lifting of the fastener block 387 away from the base 385 and, furthermore, substantially limits movement of the fastener block 387 along the interior/exterior axis 301. As a result, the bracket plate 384 can, along with bracket plug 352 and fastener 389, be used to transfer mechanical loads from a compound fenestration assembly to the bracket plate 384 and into the framing members to which the base 385 of the bracket plate 384 is attached.

Figure 29:
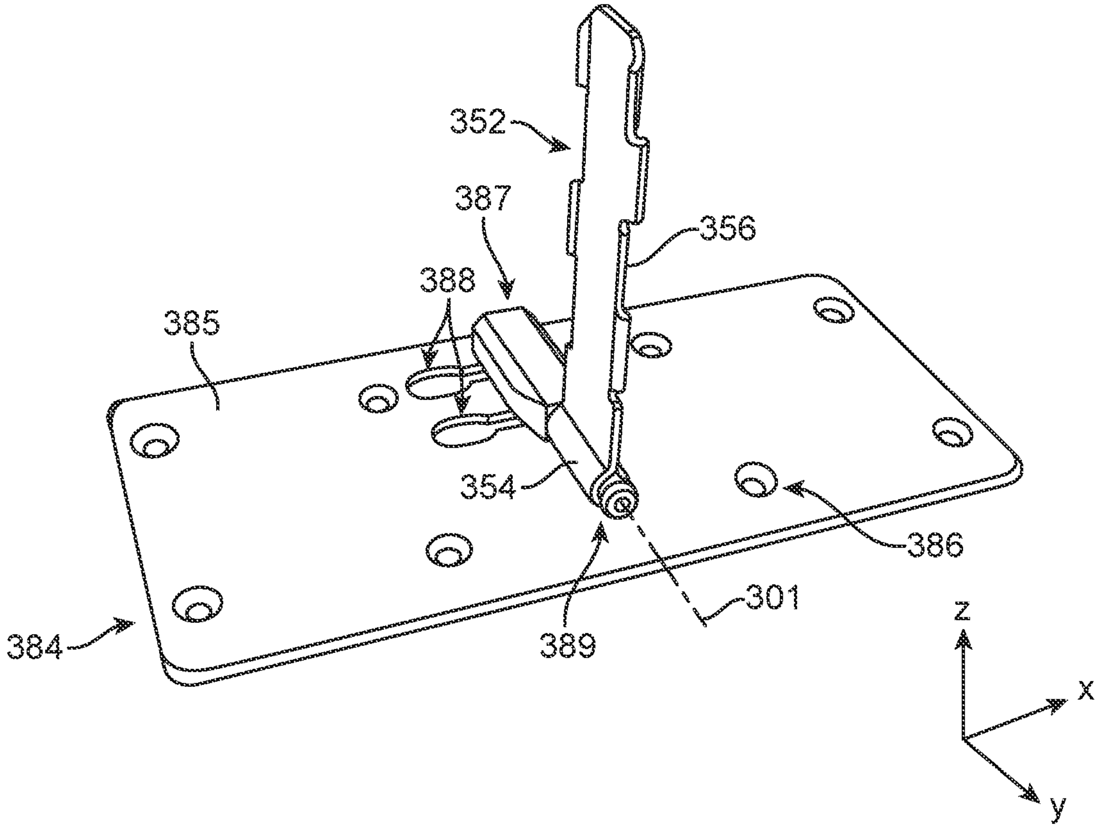
FIG. 29 is a perspective view of one illustrative embodiment of a bracket plate and one illustrative embodiment of an associated end plug that may be used to secure a compound fenestration unit assembly in an opening as described herein.
Figure 31:
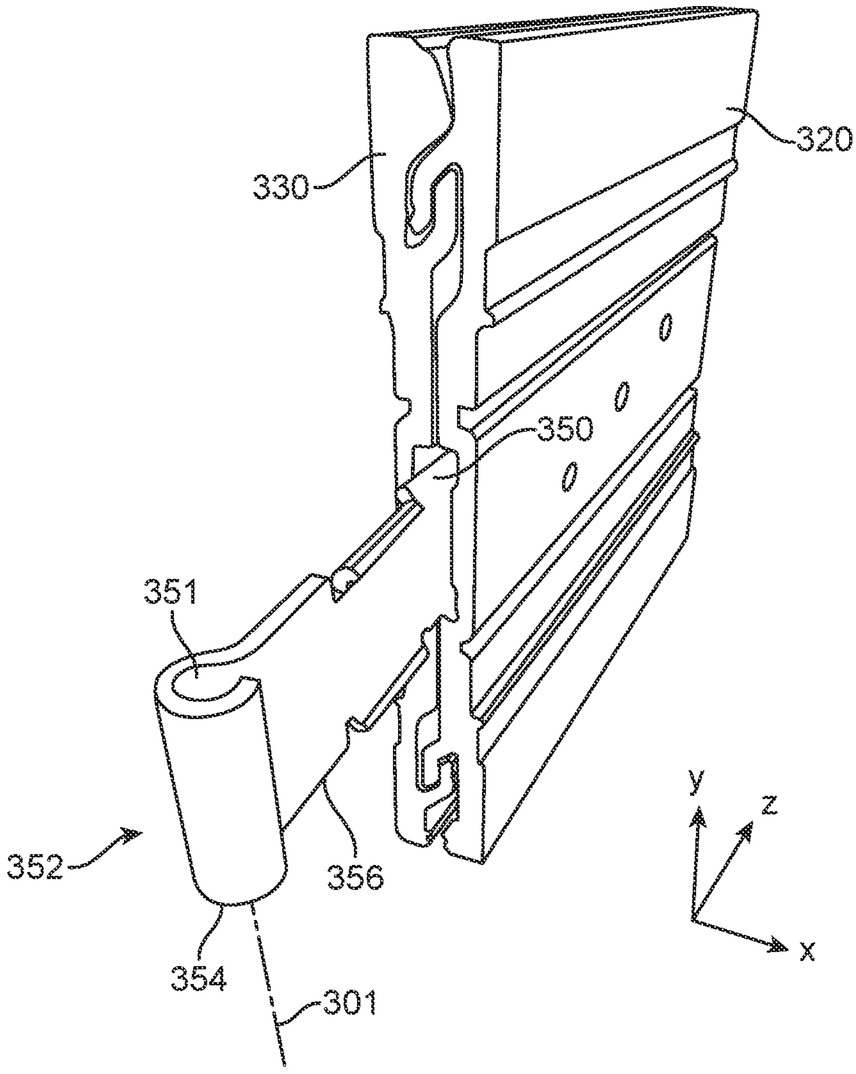
FIG. 31 is an enlarged perspective view of the end plug of FIG. 29 positioned in an intermediate end plug cavity formed between one illustrative embodiment of a pair of joining strips that may be used in a mull joint of a compound fenestration assembly as described herein.

FIG. 31 is an enlarged perspective view of the bracket plug 352 of FIG. 29 positioned in an intermediate end plug cavity 350 formed between one illustrative embodiment of a pair of joining strips 320 and 330 that may be used in a mull joint of a compound fenestration assembly as described herein. The bracket plug 352 includes, as described herein, a base 354 and cavity leg 356, with the cavity leg 356 being configured for insertion into the intermediate end plug cavity 350. The base fastener bore 351 in the base 354 of the bracket plug 352 is also seen in this view, with the base fastener bore 351 aligned with the interior/exterior axis 301 as described herein.

As described herein, the cavity leg 356 may, when inserted into the intermediate end plug cavity 350, prevent disengagement of the mechanically interlocking channels on the joining strips 320 and 330 at that end of the mull joint formed by the joining strips 320 and 330. In essence, insertion of the cavity leg 356 into the intermediate end plug cavity 350 locks the joining strips 320 and 330 relative to each other such that the channels cannot be backed out of engagement with each other.

Figure 32:
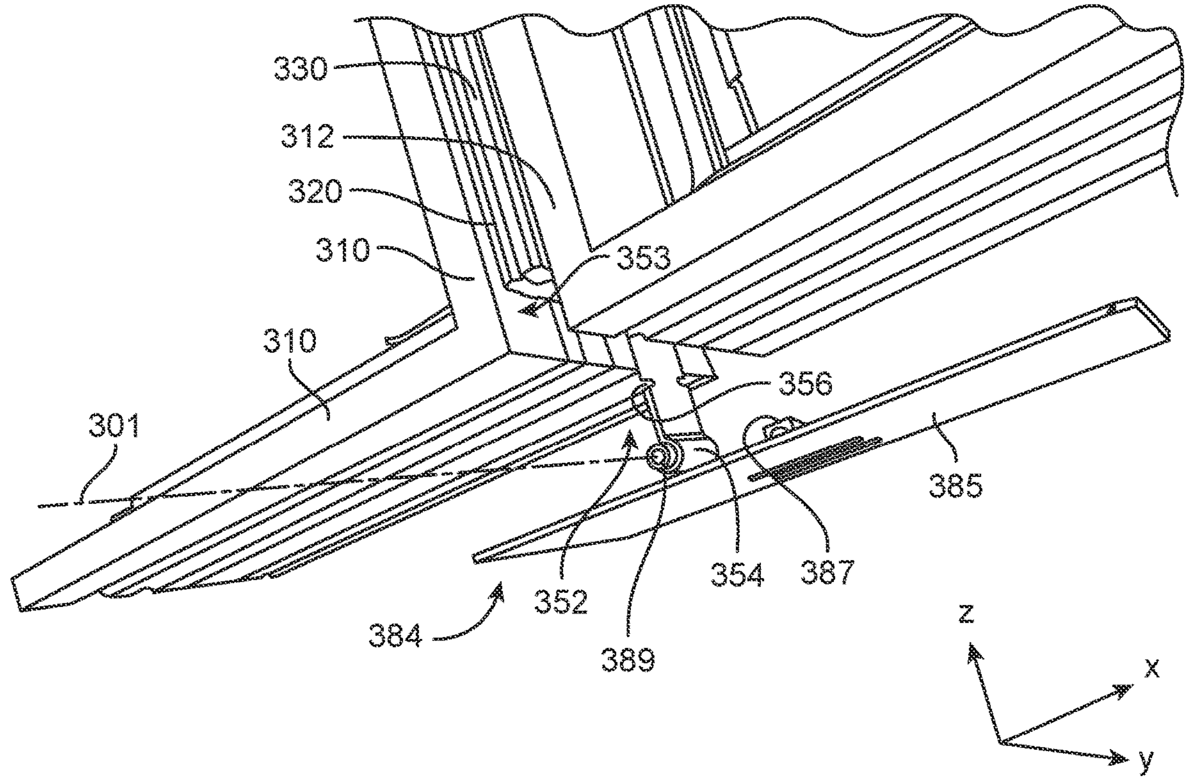
FIG. 32 is a perspective view of the bracket plate and end plug partially inserted into the end of a mull joint of one illustrative embodiment of a compound fenestration assembly as described herein.

FIG. 32 is a perspective view of the bracket plate 384 slightly removed from a mull joint end in one illustrative embodiment of a compound fenestration assembly as described herein. The compound fenestration assembly includes a mull joint formed by joining strips 320 and 330 located between frame members 310 and 312. As described herein, the joining strips 320 and 330 do not extend to the ends of the frame members 310 and 312. Rather, a recess 353 is formed in the end of the mull joint. As described herein in connection with other and the plugs, that recess 353 is used to contain the base 354 of bracket plug 352 along with the fastener block 387 attached to base 385 of the bracket plate 384. Although the bracket plate 384 and bracket plug 352 are shown as being slightly removed from the fenestration units forming the compound fenestration assembly, movement of the components towards the fenestration units can be easily envisioned in FIG. 32 as the cavity leg 356 is advanced into an intermediate end plug cavity formed between joining strips 320 and 330.

Furthermore, positioning of the cavity leg 356 in the intermediate end plug cavity formed between joining strips 320 and 330 can be adjusted (e.g., inwardly or outwardly) to compensate for variations in the distance between a rough opening and the fenestration units making up the compound fenestration assemblies described herein.

Figure 33:
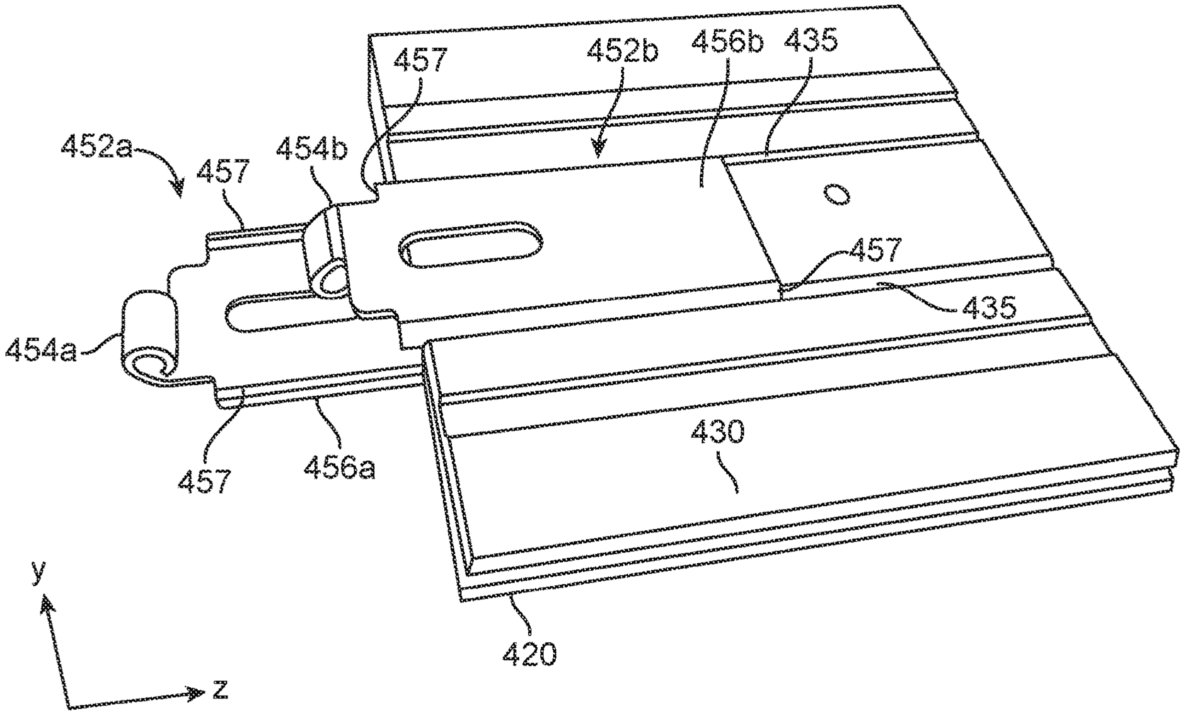
FIG. 33 is a perspective view of a compound end plug assembly that may be used in place of the end plug depicted in FIGS. 29 and 31-32 in a mull joint of a compound fenestration assembly as described herein.
Figure 34:
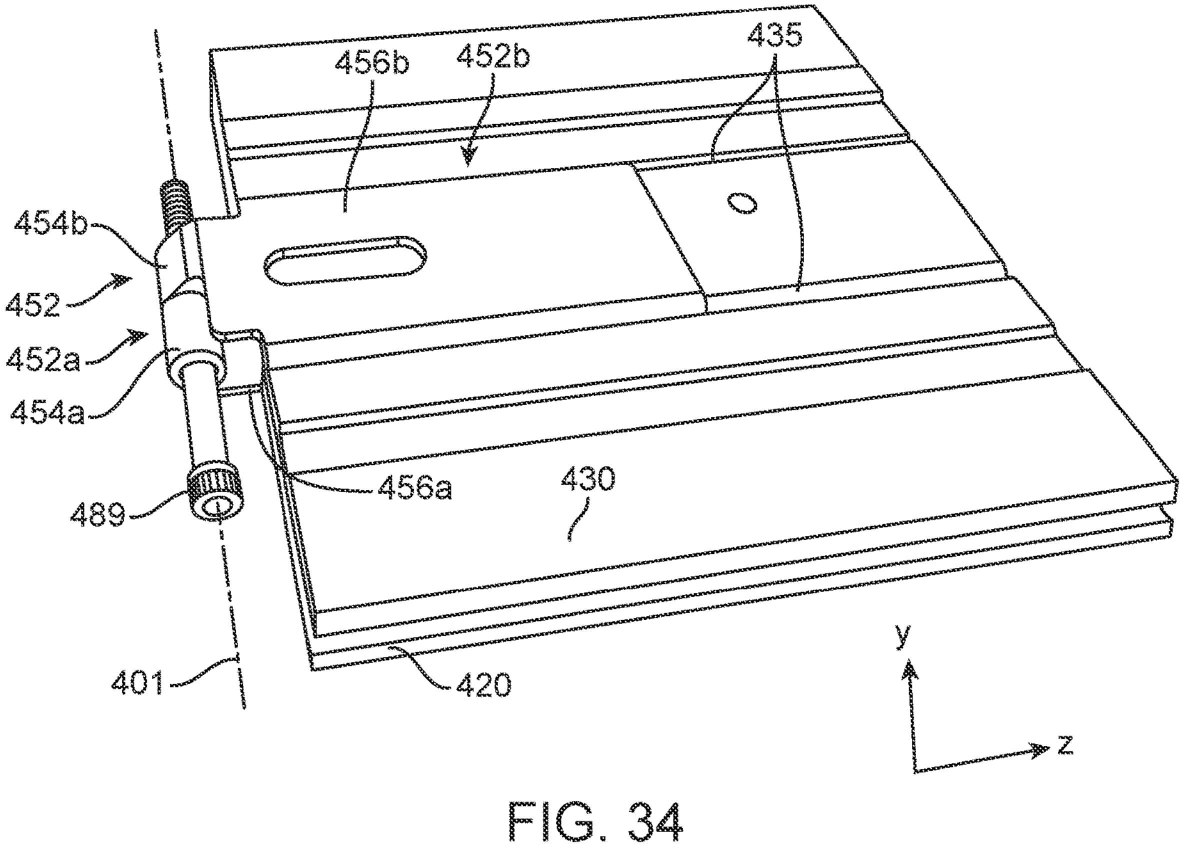
FIG. 34 is a perspective view of the compound end plug assembly of FIG. 33 with one illustrative embodiment of a threaded fastener positioned therein.
Figure 35:
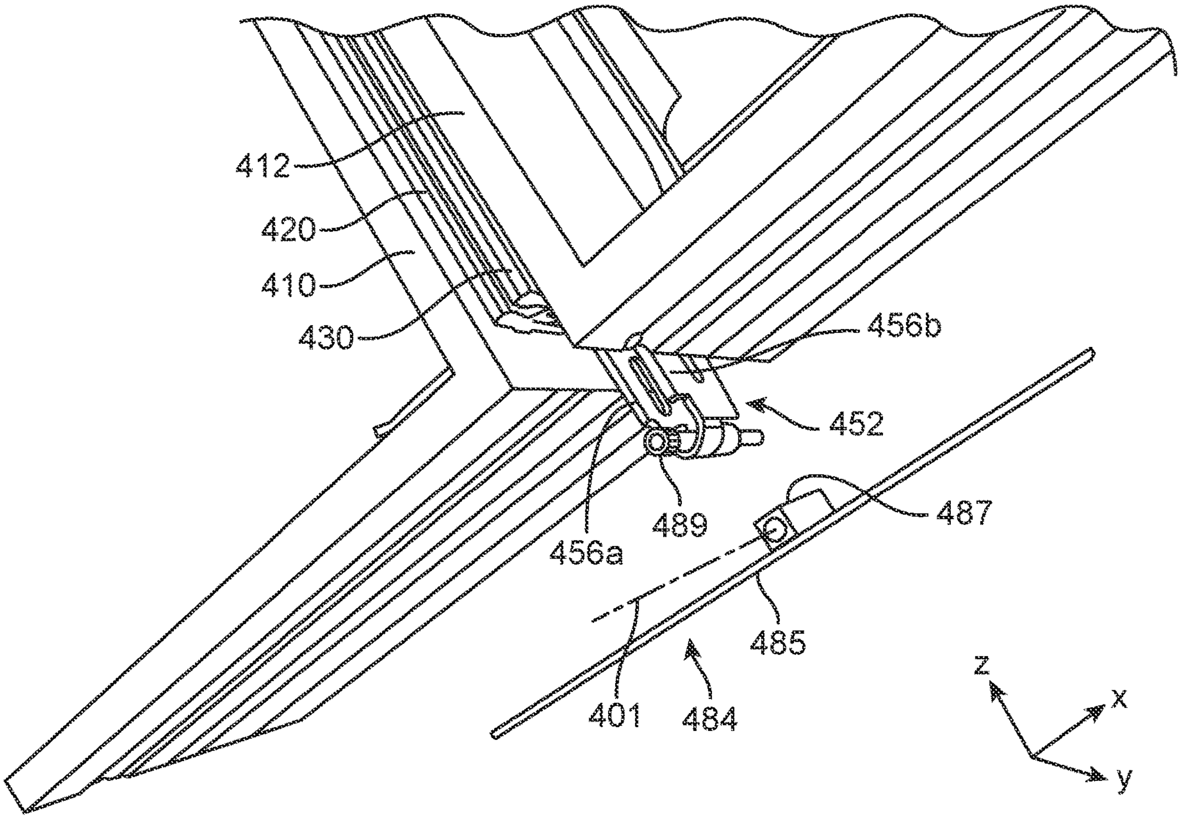
FIG. 35 is a perspective view of a bracket plate and the compound end plug assembly of FIGS. 33-34 partially inserted into the end of a mull joint of one illustrative embodiment of a compound fenestration assembly as described herein.

The bracket plug 352 depicted in connection with bracket plate 385 can be used to secure a compound fenestration assembly in an opening when the fenestration units being joined along a mull joint are already connected to each other before placement in the rough opening. FIGS. 33-35 depict one alternative embodiment of a composite bracket plug assembly that can be used to secure a mull joint in a compound fenestration assembly to a bracket plate in a rough opening when the mull joint is also being assembled in the rough opening, in other words, when the fenestration units connected by the mull joint are not connected to each other before placement in the rough opening.

In one or more embodiments, such a composite bracket plug assembly may include a pair of composite bracket plugs as seen in, e.g., FIG. 33. In particular, the composite bracket plug assembly includes a first composite bracket plug 452*a* and a second composite bracket plug 452*b*. Each of the composite bracket plugs 452*a* and 452*b* are, in one or more embodiments, configured to be located within cavities formed by the joining strips 420 and 430 with their respective frame members. With reference to, e.g., FIGS. 2A and 2B, each of the composite bracket plugs 452*a* and 452*b* is configured for insertion into the cavities 51 located between joining strip 20 and its frame member 10 and joining strip 30 and its frame member 12.

In particular, composite bracket plug 452*a* includes a cavity leg 456*a* that is configured to be inserted into a cavity formed between joining strip 420 and its attached frame member, while composite bracket plug 452*b* includes a cavity leg 456*b* configured to be inserted into a cavity formed between joining strip 430 and its attached frame member. In one or more embodiments in which the joining strips include slots such as, e.g., slots 435 as seen in, e.g., FIG. 33, the cavity leg 456*b* may include ribs 457 configured to fit within slots 435 to assist in accurate placement and retention of the composite bracket plug 452*b*. A similar arrangement may be used in connection with joining strip 420 and composite bracket plug 452*a* which includes a cavity leg 456*a* having ribs 457 configured to fit within a complementary set of slots in the joining strip 420 (see, e.g., slots 25 in joining strip 20 in FIG. 2A).

Each of the composite bracket plugs depicted in FIGS. 33-34 includes a base having a fastener bore. In one or more embodiments, the fastener bores in the bases can be aligned with an interior/exterior axis that, in a manner similar to interior/exterior axis 301 described above, extends between the interior and exterior sides of fenestration units and/or a composite fenestration assembly as described herein. The fastener bores in the bases 454*a* and 454*b* are shown in alignment in FIG. 34 such that threaded fastener 489 can be inserted through the fastener bores in the bases 454*a* and 454*b* along interior/exterior axis 401. In one or more embodiments, the composite bracket plugs 452*a* and 452*b* can be described as a single end plug 452 when their bases and fastener bores are aligned as seen in, e.g., FIG. 34.

FIG. 35 is a perspective view of a bracket plate and the compound end plug assembly of FIGS. 33-34 partially inserted into the end of a mull joint of one illustrative embodiment of a compound fenestration assembly as described herein. In particular, the compound fenestration assembly includes a mull joint formed by joining strips 420 and 430 located between frame members 410 and 412 of a pair of fenestration units. The legs 456*a* and 456*b* of the composite bracket plug 452 are shown partially inserted into cavities formed between each of the joining strips 420 and 430 and their respective frame members 410 and 412. A threaded fastener 489 is shown inserted through the base fastener bores of the composite bracket plug 452. Also seen in FIG. 35 is the base 485 of a bracket plate 484 with a fastener block 487 attached to the base 485. As discussed herein, the base 485 can be attached on a framing member of an opening in which the fenestration units are to be located and connected before the fenestration units are located in that opening. Positioning the fenestration units such that the joining strips 420 and 430 on opposing frame members 410 and 412 are connected as described herein also positions the two components of the composite bracket plug 452 such that their base fastener bores align to allow insertion of a threaded fastener 489 through those base fastener bores and into a bore formed in the fastener block 487. As a result, the compound fenestration assembly can be attached to a framing member in an opening even in situations in which the fenestration units must be attached to each other within that opening as well.

Although illustrative embodiments of compound fenestration assemblies having gusset plates that span mull joint ends formed between fenestration units are described herein, in one or more embodiments the compound fenestration assemblies described herein may include corner gussets that do not span mull joint ends. One illustrative embodiment of a set of corner gusset assemblies that may be used in connection with the mull joints in compound fenestration assemblies described herein are depicted in FIG. 36-41.

Figure 36:
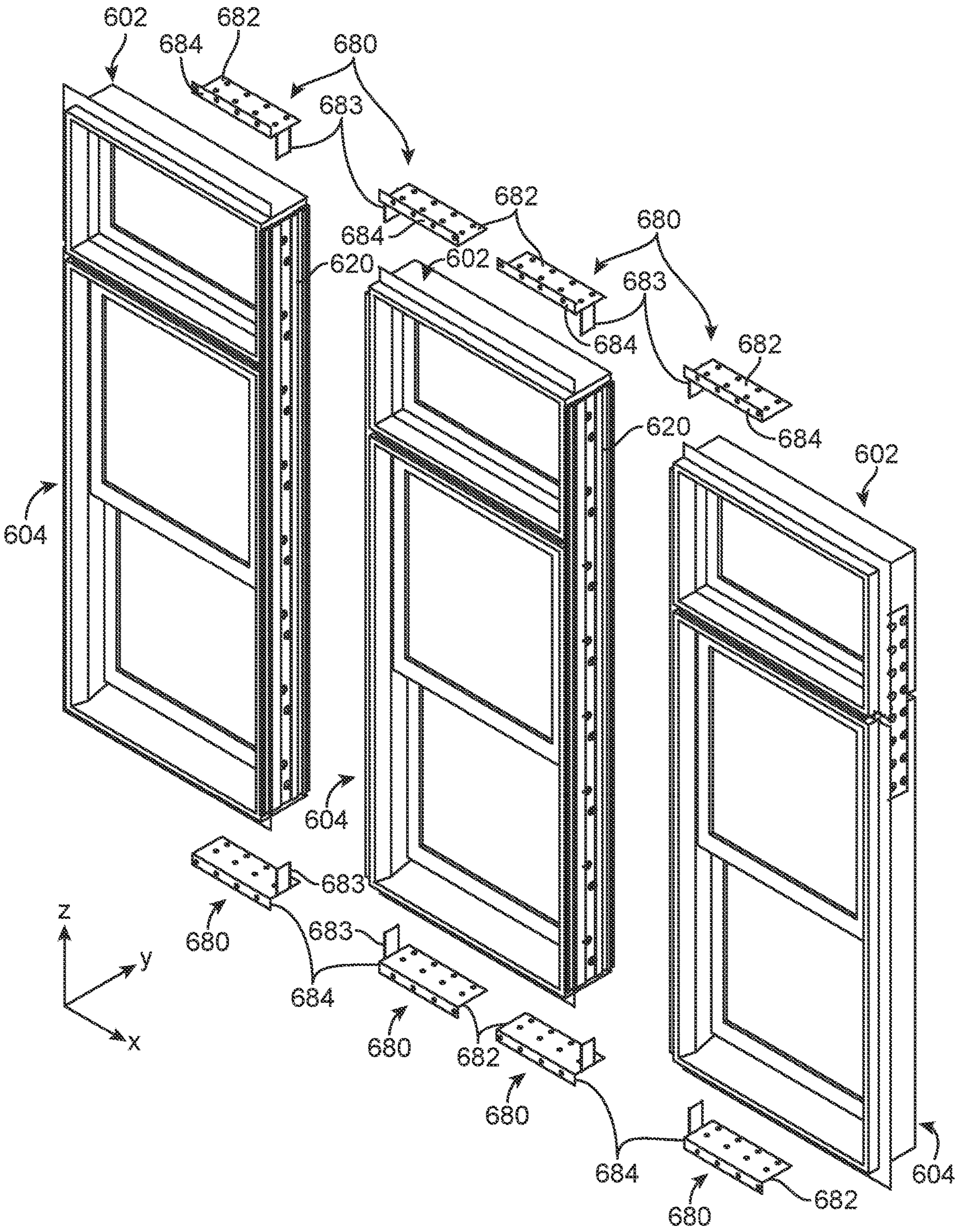
FIG. 36 is a perspective view of one illustrative embodiment of a compound fenestration assembly using flanged corner gusset as described herein.
Figure 37:
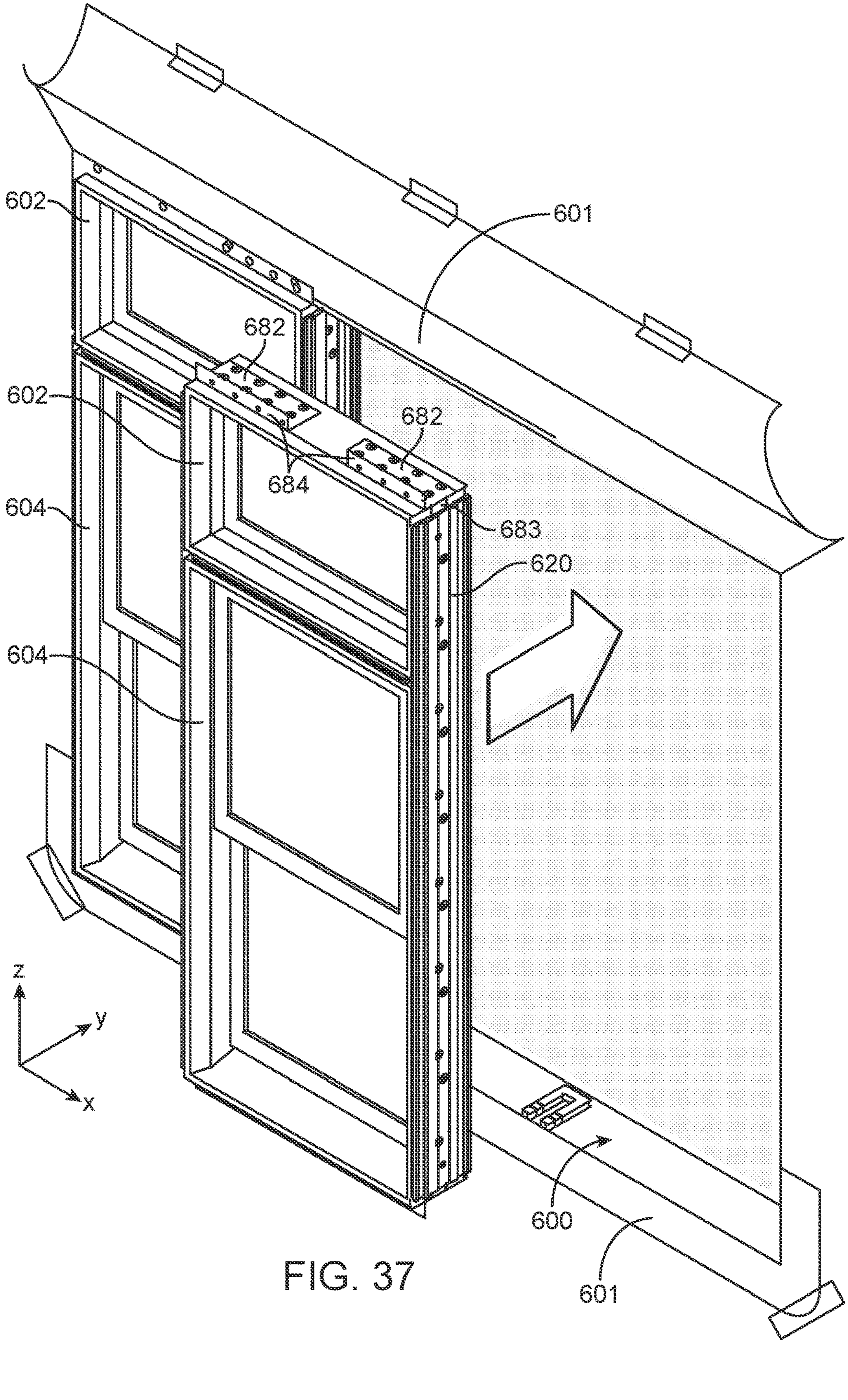
FIG. 37 is a perspective view of one illustrative embodiment of installation of a compound fenestration assembly using a flanged corner gusset.

In particular, FIGS. 36 and 37 are perspective views of one embodiment of a compound fenestration assembly depicting placement of illustrative embodiments of a flanged corner gusset assembly including flanged corner gussets that may be attached to the fenestration units of the depicted compound fenestration assembly. In the view of FIG. 36, flanged corner gussets 680 are depicted as being attached to fenestration units 602 and 604. Each of the flanged corner gussets 680 includes a base plate 682 and an attached gusset plate leg 683. The gusset plate leg 683 is positioned between a joining strip (see, e.g., joining strips 620) and a frame member of the fenestration unit to which the flanged corner gusset 680 is being attached.

In one or more embodiments, the gusset plate leg 683 fits within the cavity in which locator plates are positioned between the joining strips and frame members on fenestration units as described herein. The base plate 682 may be attached to a frame member of the fenestration unit meeting the frame member to which the joining strip is attached at the corner over which the flanged corner gusset 680 is positioned proximate an end of the mull joint. In one or more embodiments, that frame member to which base plate 682 is attached will typically, but not necessarily, be a frame member that faces the sill or header of an opening in which compound fenestration assembly is positioned for attachment.

The flanged corner gussets 680 also include a gusset flange 684 extending away from the base plate 682 and away from the fenestration unit 602 or 604 to which the flanged corner gusset 680 is attached. In one or more embodiments, the gusset flange 682 on each of the flanged corner gussets 680 is configured for attachment to an exterior surface of an opening 600 in which the fenestration unit is located. Referring to FIG. 37, the gusset flanges 684 of flanged corner gussets 680 are attached to the exterior surface of opening member 601 which defines the opening 600 in which the compound fenestration assemblies are being installed. The gusset flanges 684 may be attached to the members defining the opening 600 using any suitable fastening technique, e.g., threaded fasteners, nails, rivets, adhesives, etc.

Positioning the gusset plate legs of the corner gussets described herein between the joining strips and frame members on fenestration units as described herein may assist in transferring loads (e.g., wind loads, etc.) from the fenestration units to the corner gusset plate for transfer to the opening in which the fenestration units are located. In one or more embodiments, the gusset plate legs of corner gussets described herein may be located in the same space in between the joining strips and the frame members as the locator plates used to position the joining strips on frame members of fenestration units as described herein. In particular, the gusset plate legs of the corner gussets described herein may include raised features such as, e.g., ribs which are sized and positioned to mate with slots formed in the joining strips (see, e.g., slots 25 in joining strip 20 or slots 35 in joining strip 30 as described herein).

In some instances, access to an exterior surface of the opening in which a compound fenestration assembly as described herein is to be installed is difficult or impossible. Illustrative embodiments of a corner gusset assembly that does not include flanges are depicted in FIGS. 38-51. The depicted corner gusset assemblies may be described as stacked corner gusset assemblies because the base plates of each pair of corner gussets are stacked between one of the fenestration units and the opening in which the fenestration units are located as described herein.

Figure 38:
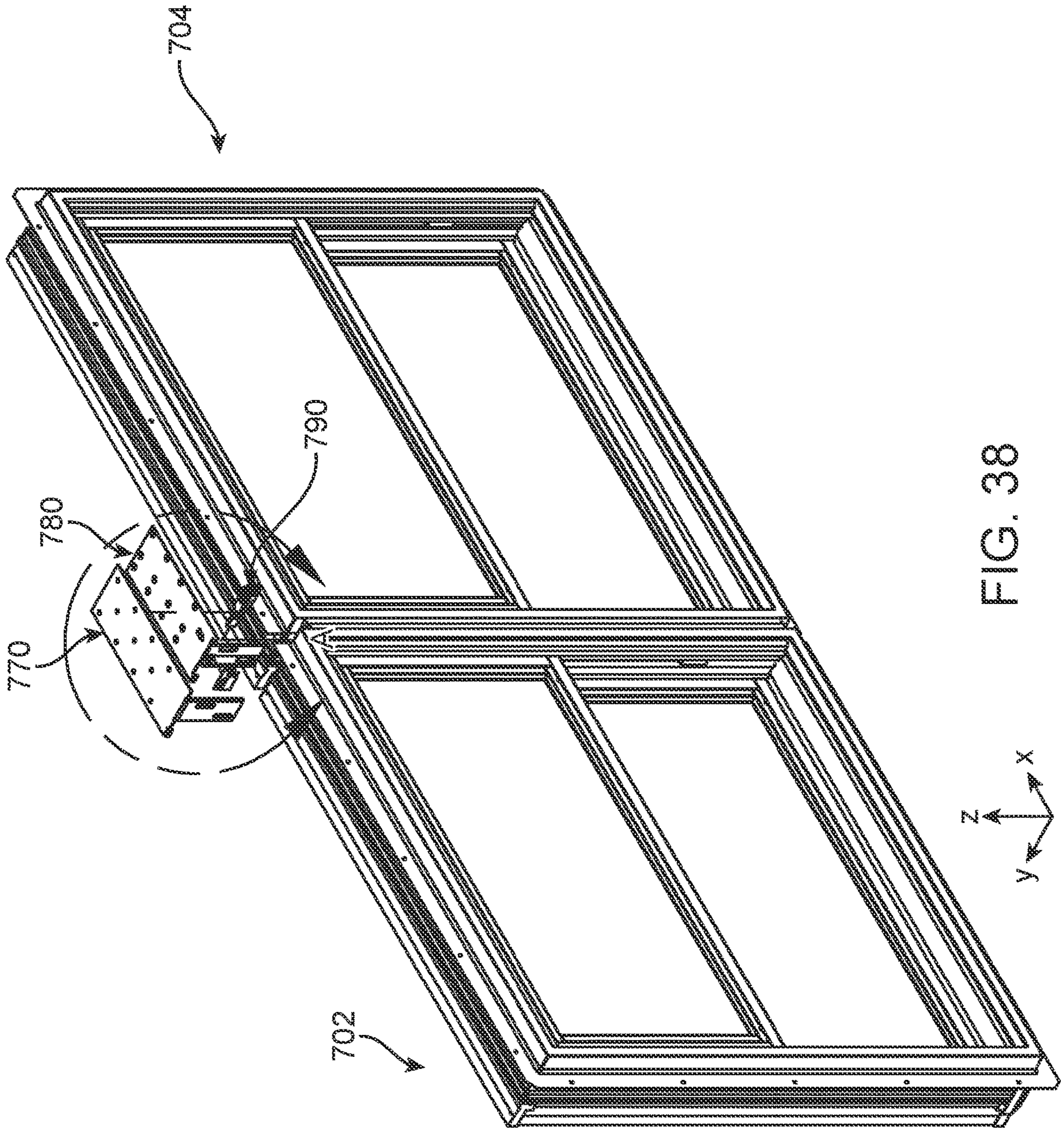
FIG. 38 is a perspective view of a compound fenestration assembly using one illustrative embodiment of a stacked corner gusset assembly as described herein.

FIG. 38 is a perspective view of a pair of fenestration units 702 and 704 positioned next to each other and an exploded assembly view of one illustrative embodiment of a stacked corner gusset assembly including corner gussets 770 and 780, along with a retainer plug 790. These components will be further described in more detail below.

Figure 39:
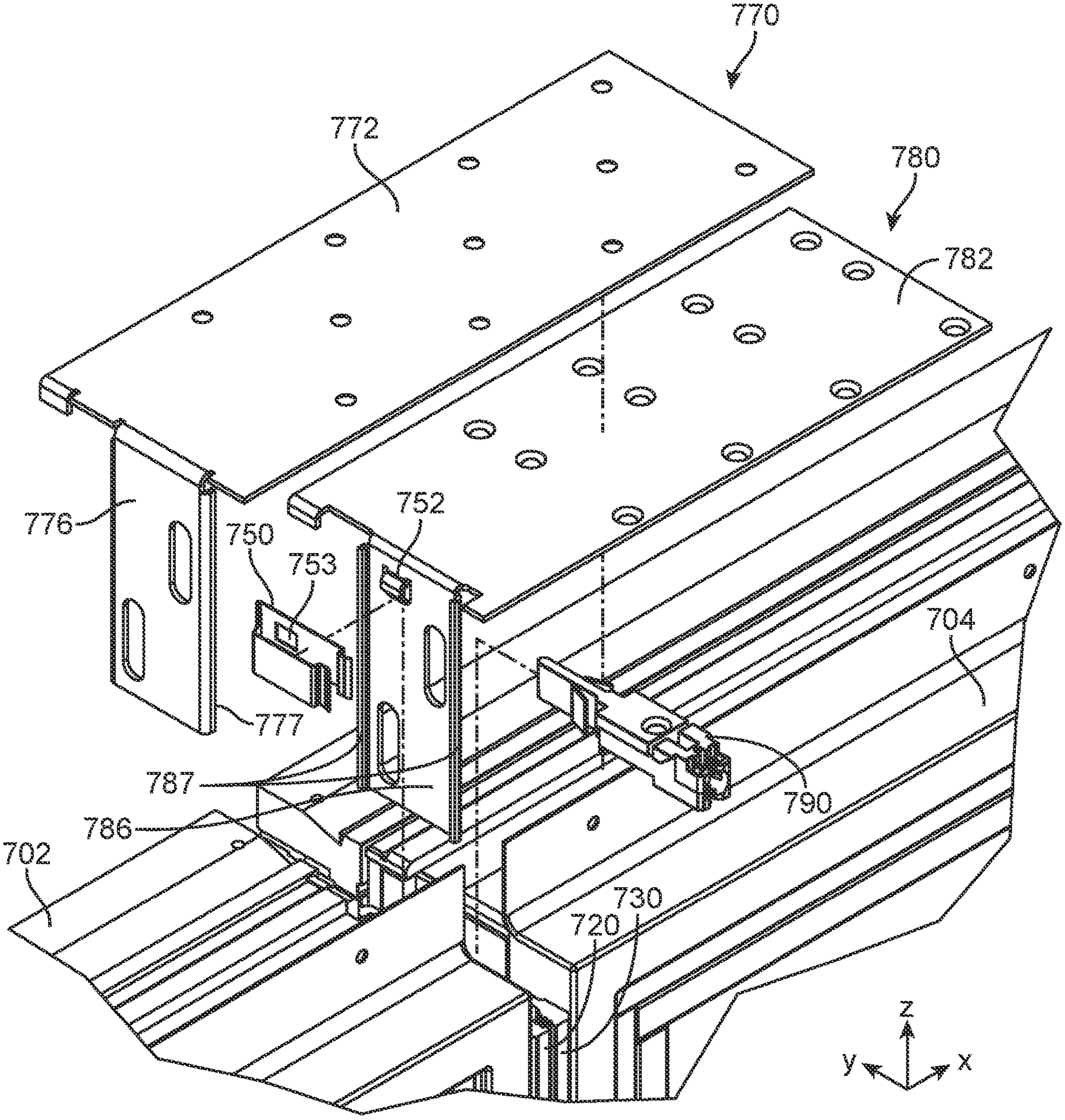
FIG. 39 is an enlarged perspective view of the stacked corner gusset assembly depicted in FIG. 38.

Referring to FIG. 39, the exploded assembly view of the stacked corner gusset assembly of FIG. 38 is enlarged to illustrate more details with respect to one embodiment of a stacked corner gusset assembly as described herein. The stacked corner gusset assembly includes a first corner gusset 770 which is attached to the first fenestration unit 702. In particular, the first corner gusset 770 includes a base plate 772 attached to a gusset plate leg 776. The gusset plate leg 776 is positioned between a first joining strip 720 and the frame member of fenestration unit 702 to which joining strip 720 is attached. The base plate 772 of the first corner gusset 770 extends away from the corner of the fenestration unit 702 proximate the end of the mull joint formed by joining strip 720 and 730. The base plate 772 extends away from the fenestration unit 702 in a direction aligned with the separation axis (i.e., the X axis). The base plate 772 is configured for attachment to an interior surface of an opening in which the fenestration unit 702 is located with this feature being further described herein below.

The stacked corner gusset assembly also includes a second corner gusset 780 which is attached to the second fenestration unit 704. The second corner gusset 780 includes a base plate 782 attached to a gusset plate leg 786. The gusset plate leg 786 is positioned between the joining strip 730 and the frame member to which that joining strip is attached at the end of the mull joint formed by joining strips 720 and 730. The second corner gusset 780 includes a base plate 782 that extends over and is attached to a frame member 713 of the fenestration unit 704 forming a corner with the frame member to which the joining strip 730 is attached. When the fenestration units 702 and 704 are assembled in an opening and form a mull joint as described herein using joining strips 720 and 730, the base plate 782 of corner gusset 780 is stacked with the base plate 772 of corner gusset 770 such that the base plate 782 is located between the base plate 772 and the fenestration unit 704 (e.g., between frame member 713 and base plate 772).

Gusset plate leg 786 of corner gusset 780 may, in one or more embodiments, include raised ribs 787 or other similar features which may mate with slots formed in joining strip 730 in the same manner as locator plates 40 mate with slots 25 in joining strips 20 as depicted in, e.g., FIGS. 3 and 5. Similarly, gusset plate leg 776 of corner gusset 770 may, in one or more embodiments, include raised ribs 777 (only one of which is seen in FIG. 39) or other features which may mate with slots formed in joining strip 720 in the same manner as locator plates 40 mate with slots 25 in joining strips 20 as depicted in, e.g., FIGS. 3 and 5.

Figure 40:
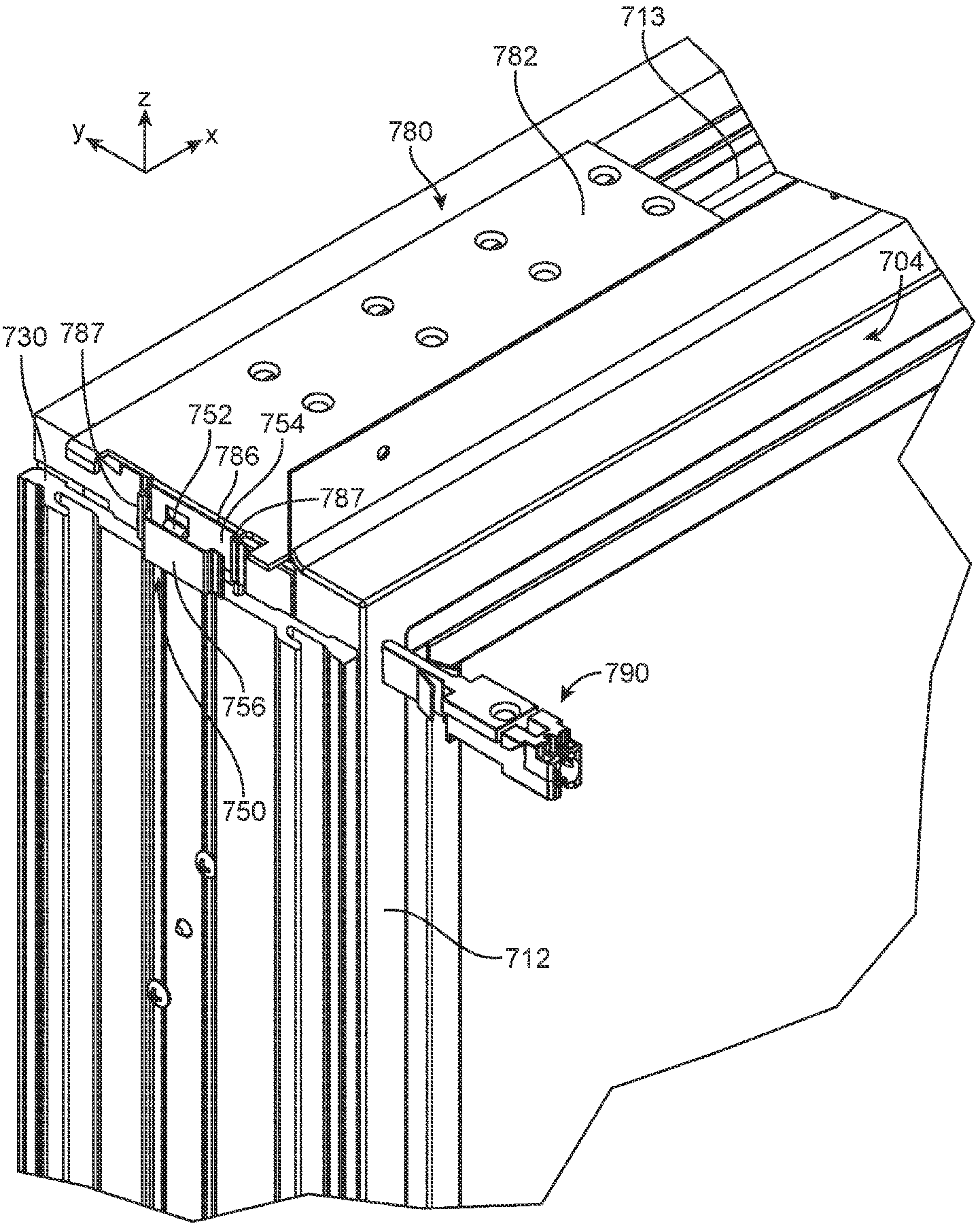
FIG. 40 is an alternative view of the stacked corner gusset assembly of FIG. 39 with one of the corner gussets removed to expose the locking clip attached to the depicted corner gusset.
Figure 41:
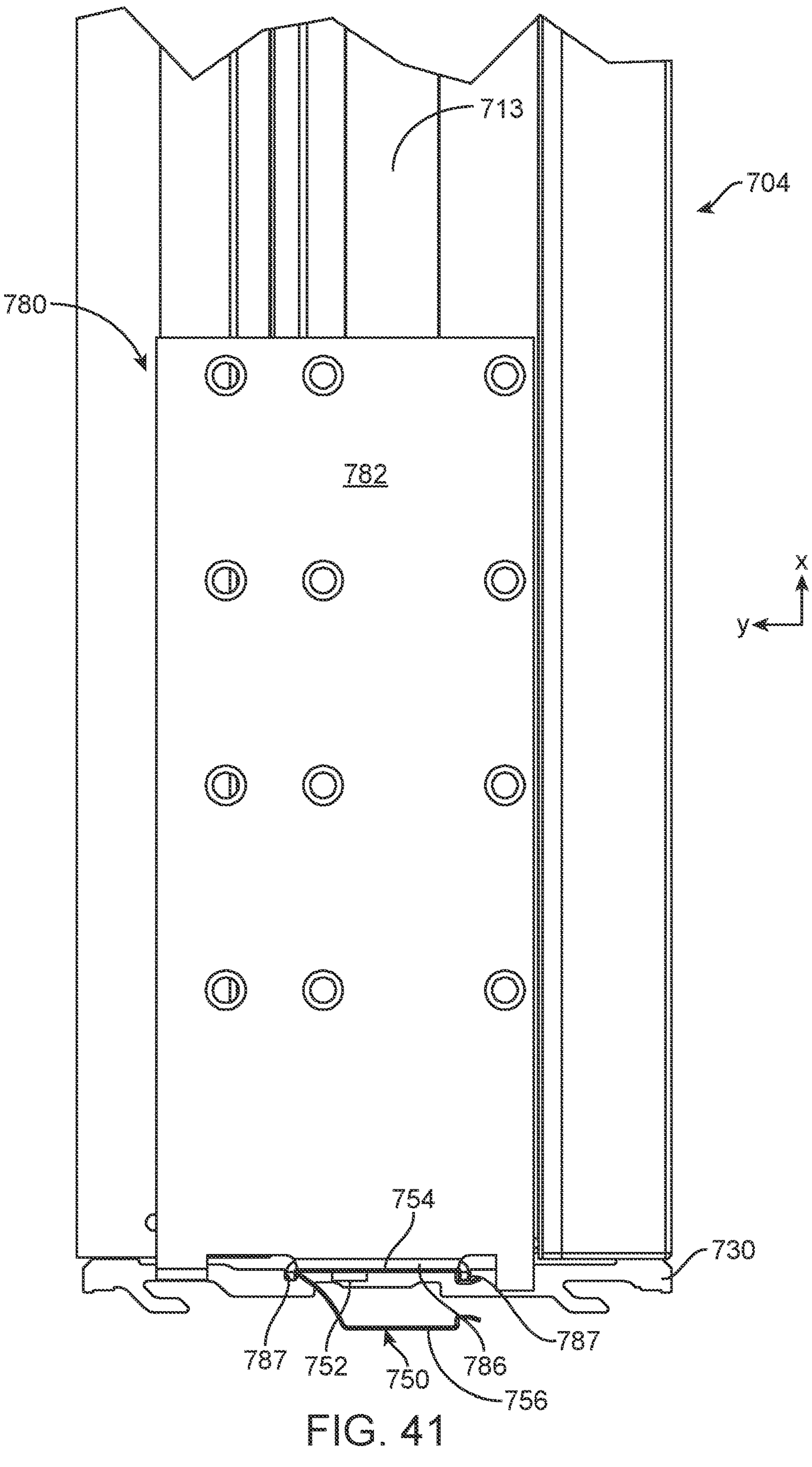
FIG. 41 is an end view of the stacked corner gusset assembly as seen in FIG. 40 taken along the mull joint axis (the Z axis).
Figure 44:
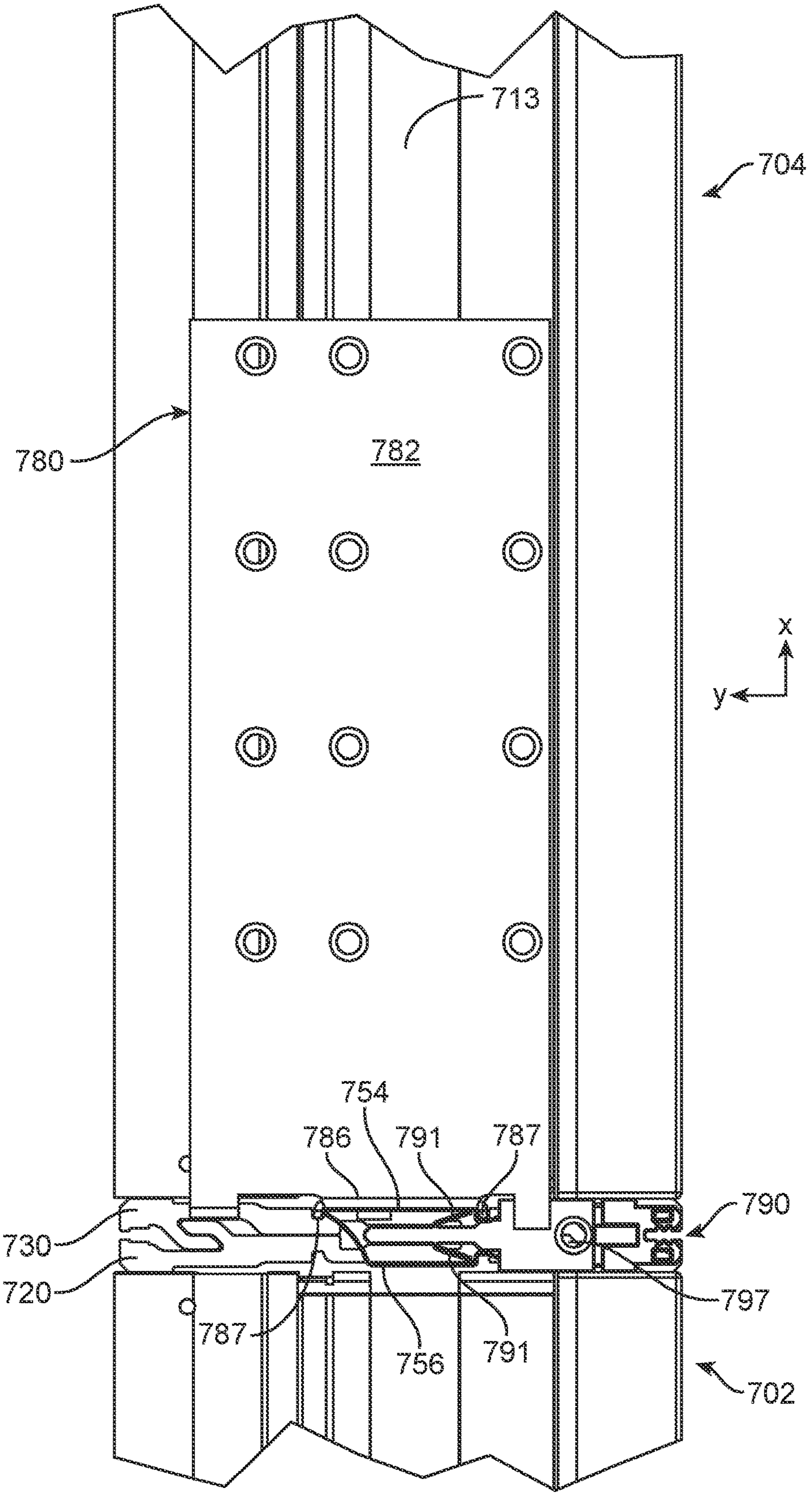
FIG. 44 is an end view of the stacked corner gusset assembly as seen in FIG. 41 with the opposing joining strip and fenestration unit depicted, along with a retainer plug positioned in the recess formed at the end of the mull joint.

With reference to, e.g., FIGS. 40, 41, and 44, another optional feature depicted in connection with this illustrative embodiment of the corner gusset assemblies described herein such as, e.g., a stacked corner gusset assembly, is locking clip 750 which may be attached to corner gusset 780, more particularly, attached to the gusset plate leg 786 of corner gusset 780. Locking clip includes arms 754 and 756. In the depicted embodiment, the locking clip 750 is attached to gusset plate leg 786 using mechanical interference with a flange 752 provided on gusset plate leg 786. Flange 752 cooperates with an opening 753 on locking clip 750 although any suitable technique for attaching locking clip 750 to gusset plate leg 786 may be used (e.g., threaded fasteners, adhesives, rivets, etc.). In one or more embodiments, the locking clip 750 may be located in a recess formed at one end of a mull joint as described herein due to the termination of joining strips 720 and 730 short of the ends of the fenestration unit frame members to which the joining strips are attached as described herein.

Locking clip 750 is provided to assist in retaining fenestration unit 702 in position relative to fenestration unit 704 when both fenestration units are assembled in an opening, but not yet secured therein. To accomplish that function, the arm 754 of locking clip 750 may, in one or more embodiments, mechanically interlock with raised ribs 787 on gusset plate leg 786 while arm 756 mechanically interlocks with one of the raised ribs 777 on gusset plate leg 776 of opposing corner gusset 770 (see, e.g., FIG. 44). In other words, movement of the fenestration units 702 and 704 relative to each other along the Y-axis such that the opposing channels on joining strips 720 and 730 can disengage from each other may be restricted by the mechanical interference of the arms 754/756 of locking clip 750 with the raised ribs 777/787 on gusset plate legs 776/786 of corner gussets 770/780 when assembled in an opening. Further, although depicted in connection with the stacked corner gusset assembly, it should be understood that a locking clip 750 may also be used in connection with unstacked corner gussets at the end of a mull joint, e.g., the corner gussets 680 of the corner gusset assemblies depicted in FIGS. 36 and 37. In either case, the fenestration unit carrying the locking clip on a gusset plate leg would be placed in an opening first, followed by placement of the opposite fenestration unit such that arm 756 would interlock with the gusset plate leg on that fenestration unit.

Another optional feature which may be used in connection with the stacked or unstacked corner gusset assemblies described herein, such as, e.g., the illustrative embodiment of a stacked corner gusset assembly, is a retainer plug 790 as seen in combination with the stacked corner gusset assembly in, e.g., FIGS. 39, 40, and 44. As discussed herein the joining strips used in mull joints as described herein may, in one or more embodiments, terminate at a recessed location between the frame members of the fenestration units to which the joining strips are attached. Because the joining strips terminate at a recessed location, they may form a recess at the end of the mull joint between the frame members to which the joining strips are attached. In one or more embodiments, a retainer plug such as, e.g., illustrative embodiment of a retainer plug 790, may be positioned in that recess between the frame members of the fenestration units joined together by the mull joint.

Figure 42:
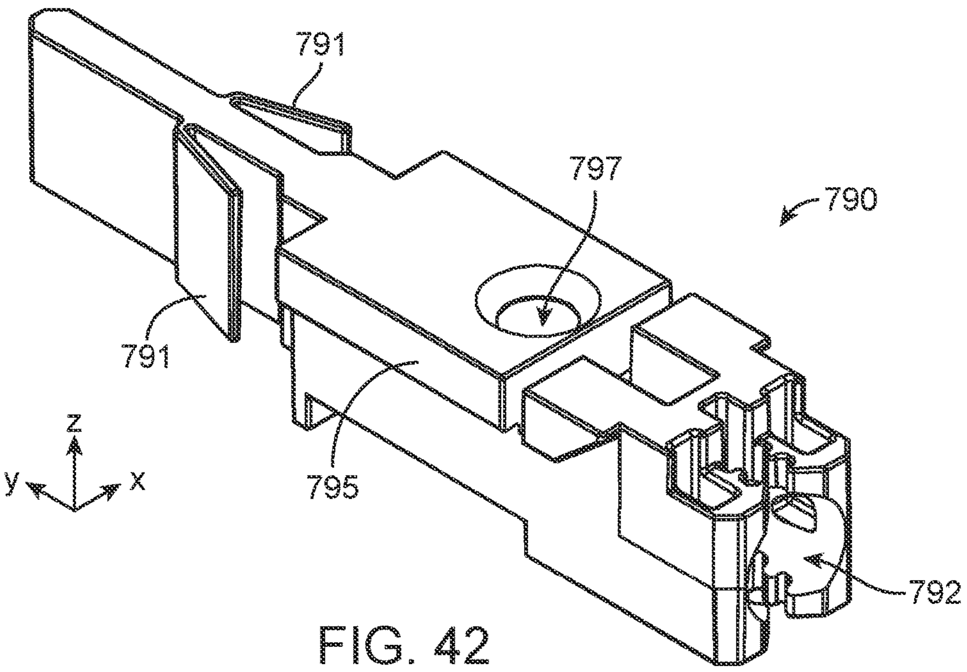
FIG. 42 is an enlarged perspective view of one illustrative embodiment of a retainer plug which may be used in connection with the corner gusset assemblies described herein.
Figure 43:
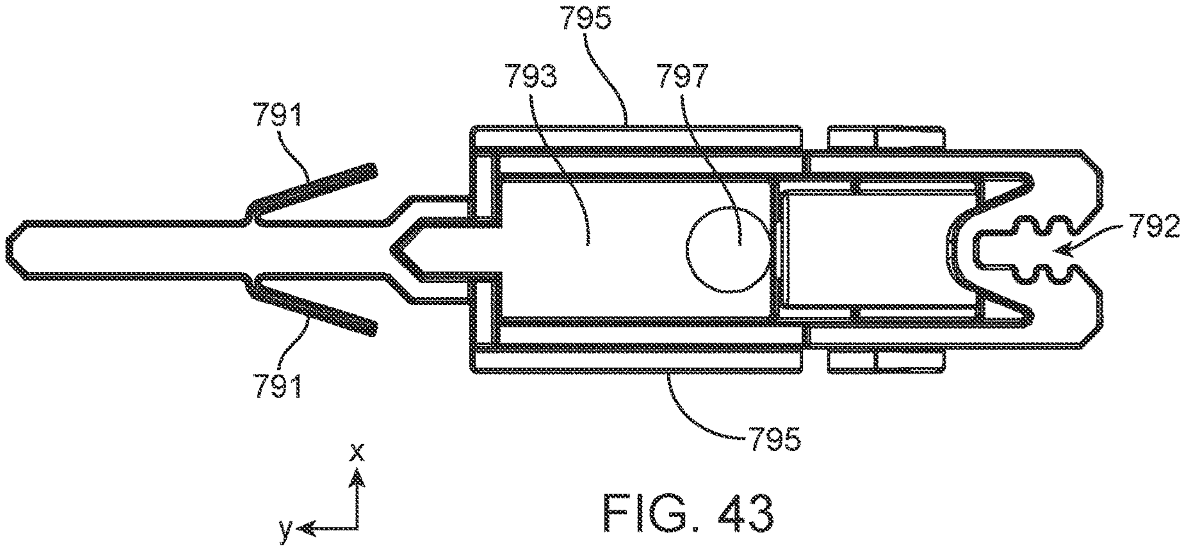
FIG. 43 is a plan view of the retainer plug of FIG. 42.

One illustrative embodiment of a retainer plug that may be used in one or more embodiments of the stacked or unstacked corner gusset assemblies described herein is depicted in more detail in FIGS. 42-43. The retainer plug depicted in those figures may, in one or more embodiments, mechanically interlock with the gusset plate legs of the stacked or unstacked corner gusset assembly to restrict disengagement of the channels on the joining strips forming the mull joint between the attached fenestration units. In the depicted illustrative embodiment, retainer plug 790 includes wings 791 biased outwardly from a center of the retainer plug 790. In one or more embodiments, those wings 791 may act outwardly against the arms 754 and 756 of the locking clip 750 and, therefore, the ribs 787 and 777 on the gusset plate legs 786 and 776 (see, e.g., FIG. 44). Although the illustrative embodiment of retainer plug 790 includes wings 791 biased outwardly away from each other, it will be understood that many other structures could be used in place of wings 791 to assist with the mechanical interlock of the arms 754/756 of locking clip 750 with the gusset plate legs of the corner gusset assemblies described herein.

In one or more embodiments, retainer plugs used in connection with stacked or unstacked corner gusset assemblies as described herein may also include one or more sealant ports in fluid communication with a sealant reservoir positioned between the frame members of the fenestration units attached by a mull joint as described herein. Because the retainer plugs fit within the recess formed between those frame members and the ends of the joining strips used to form the mull joint, the sealant reservoir is also positioned in that same recess.

In the depicted illustrative embodiment, retainer plug 790 includes a sealant reservoir 793 which faces the ends of the first and second joining strips 720 and 730 attached using the stacked or unstacked corner gusset assembly described herein. In particular, the depicted illustrative embodiment of retainer plug 790 includes a sealant port 792 opening towards an exterior side of the fenestration units 702 and 704 in a manner similar to the sealant ports described in connection with other plugs herein (see, e.g., FIGS. 25-26 and the corresponding description). The depicted illustrative embodiment of retainer plug 790 may also include sealant dams 795 on the exterior of the reservoir such that sealant escaping from the reservoir 793 flows over the exterior of the reservoir until it reaches a sealant dam 795 to control sealant flow as discussed above in connection with, e.g., sealant reservoir 193 on end seal member 190.

In addition to exterior sealant port 792, the depicted illustrative embodiment of retainer plug 790 includes an intermediate sealant port 797 positioned between an exterior end of the retainer plug 790 (where the exterior sealant port 792 is located) and the wings 791 inserted into an interior of the recess found at the end of the mull joint. In one or more embodiments, an intermediate sealant port 797 may be described as being aligned with the mull joint axis defined by the joining plates of the mull joint. In other words, the intermediate sealant port may face away from the ends of the joining strips forming the mull joint. In one or more embodiments, both sealant port 792 and 797 may be provided in a retainer plug 790 as depicted in, e.g., this illustrative embodiment of retainer plug. In one or more alternative embodiments, however, a retainer plug configured for use with a stacked or unstacked corner gusset assembly may include only one or the other of the exterior sealant port and an intermediate sealant port.

Figure 45:
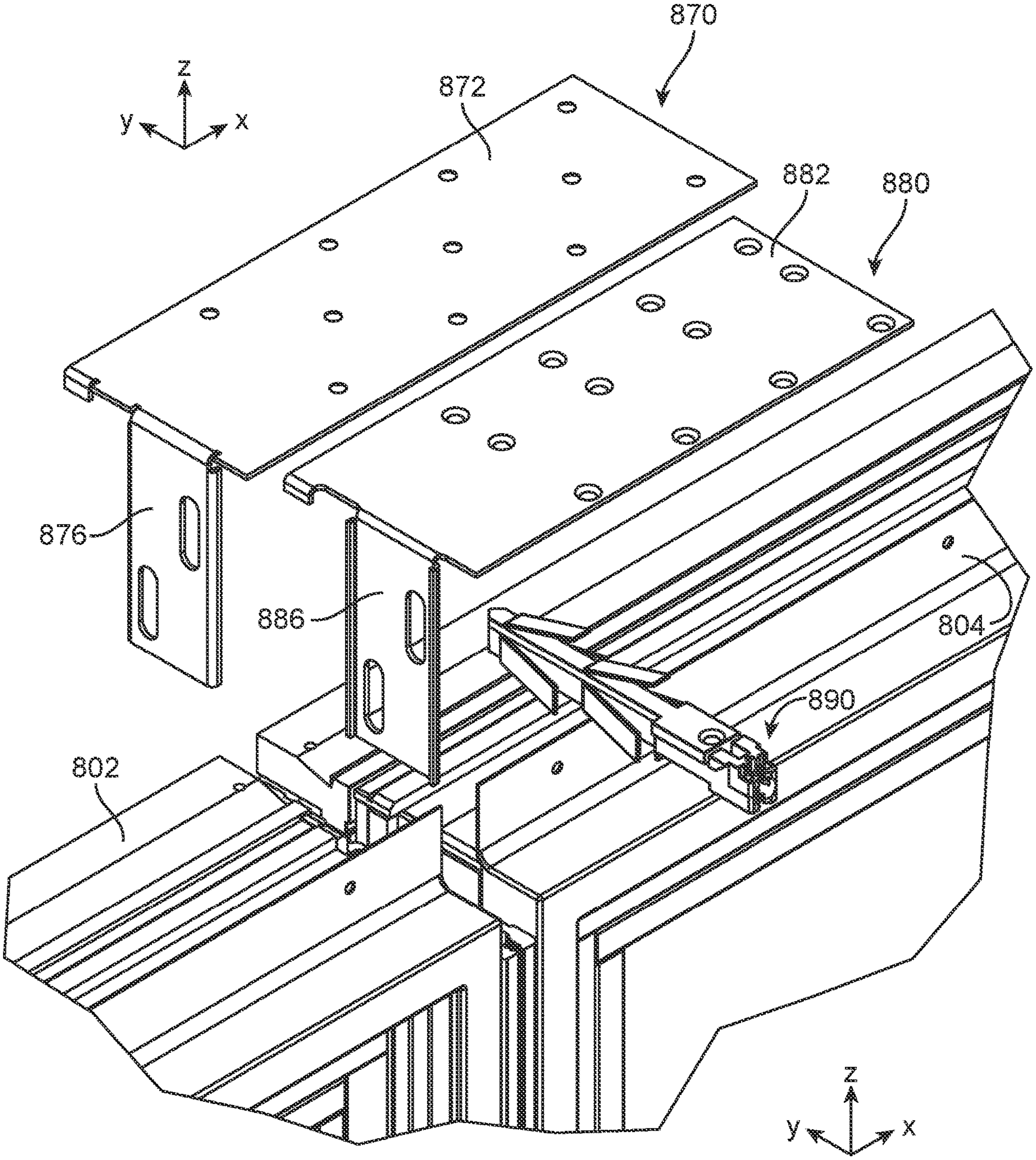
FIG. 45 is a perspective view of one alternative embodiment of a corner gusset assembly along with an alternative embodiment of a retainer plug that may be used in connection with the corner gusset assemblies described herein.

One alternative illustrative embodiment of a corner gusset assembly that may be used in mull joints as described herein is depicted in FIG. 45. The illustrative embodiment of the corner gusset assembly depicted there includes corner gussets 870 and 880 having both base plates 872 and 882 along with gusset plate legs 876 and 886 as described above in connection with the first illustrative embodiment of a stacked corner gusset assembly that may be used to connect fenestration units 802 and 804 in a similar manner. A retainer plug 890 is also used in connection with the stacked corner gusset assembly and, similar to the illustrative embodiment of retainer plug 790, retainer plug 890 includes a sealant reservoir 893 along with an exterior sealant port 892 and an intermediate sealant port 897. The depicted illustrative embodiment of retainer plug 890 may also include sealant dams 895 to control sealant flow as discussed above in connection with, e.g., sealant reservoir 193 on end seal member 190.

Although depicted in connection with the stacked corner gusset assembly, it should be understood that the depicted illustrative embodiment of retainer plug 890 may also be used in connection with unstacked corner gussets at the end of a mull joint, e.g., the corner gussets 680 of the corner gusset assemblies depicted in FIGS. 36 and 37.

One difference, however, is that the illustrative embodiment of the corner gusset assembly using corner gussets 870 and 880 does not include a locking clip (see, e.g., locking clip 750 in FIGS. 39-41 and 44) to restrict movement of the fenestration units along the Y-axis.

Another difference is that the retainer plug 890 used in connection with corner gussets 870 and 880 includes multiple sets of wings configured to act against features such as ribs found on the gusset plate legs of corner gussets 870 and 880. In particular, the retainer plug 890 includes a first set of wings 891 located closer to the sealant reservoir 893 and a second set of wings 899 located further away from the sealant port 893 of retainer plug 890. The wings 891 may, in one or more embodiments, be configured to act against the raised ribs on gusset plate legs 876 and 886 that are closer to the sealant reservoir 893 of the retainer plug 890, while the wings 899 may be configured to act against the raised ribs on the gusset plate legs 876 and 886 that are farther away from the sealant reservoir of the retainer plug 890.

Figure 48:
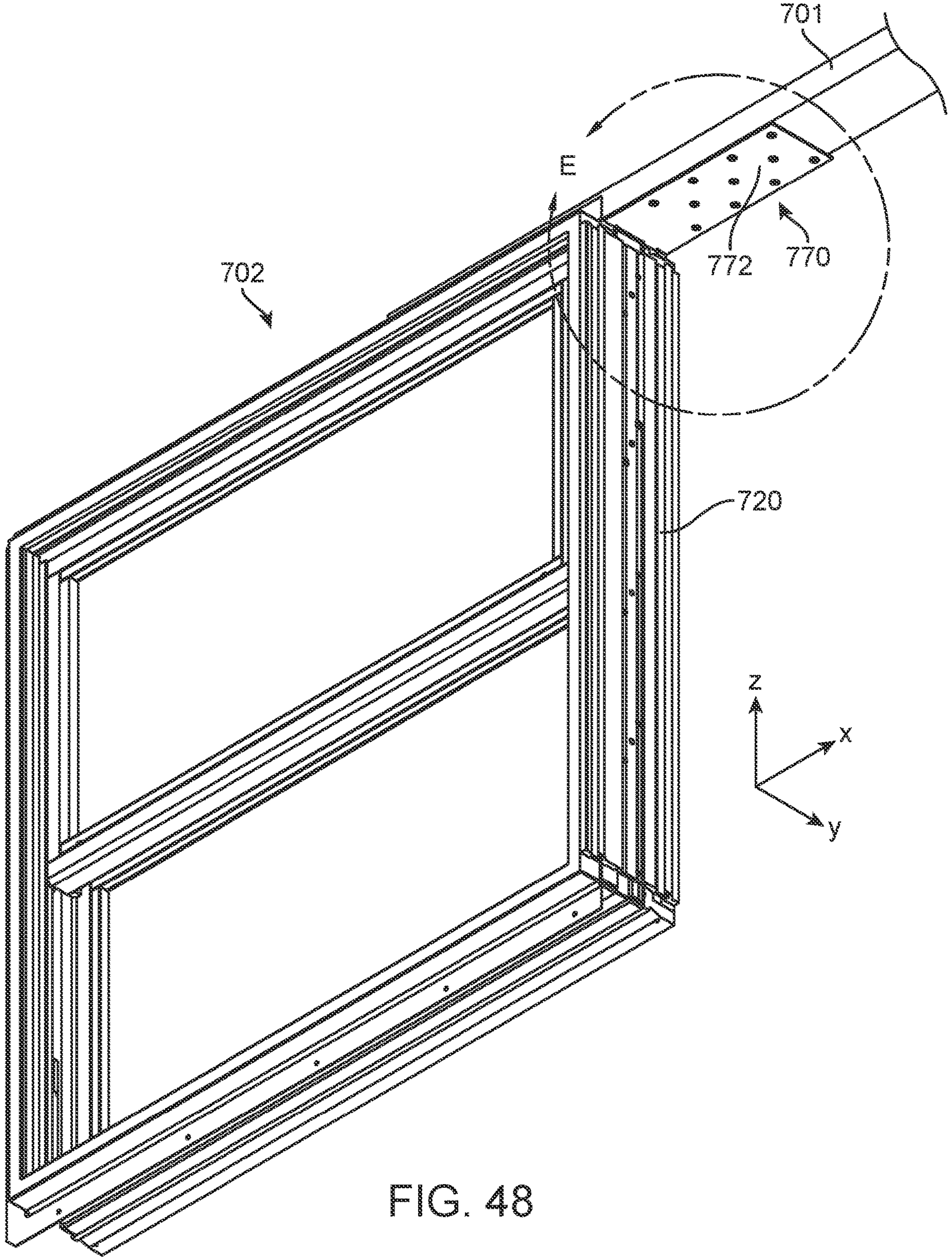
FIG. 48 is a perspective view of one illustrative embodiment of a method of installing a compound fenestration assembly using one illustrative embodiment of a stacked corner gusset assembly as described herein.
Figure 49:
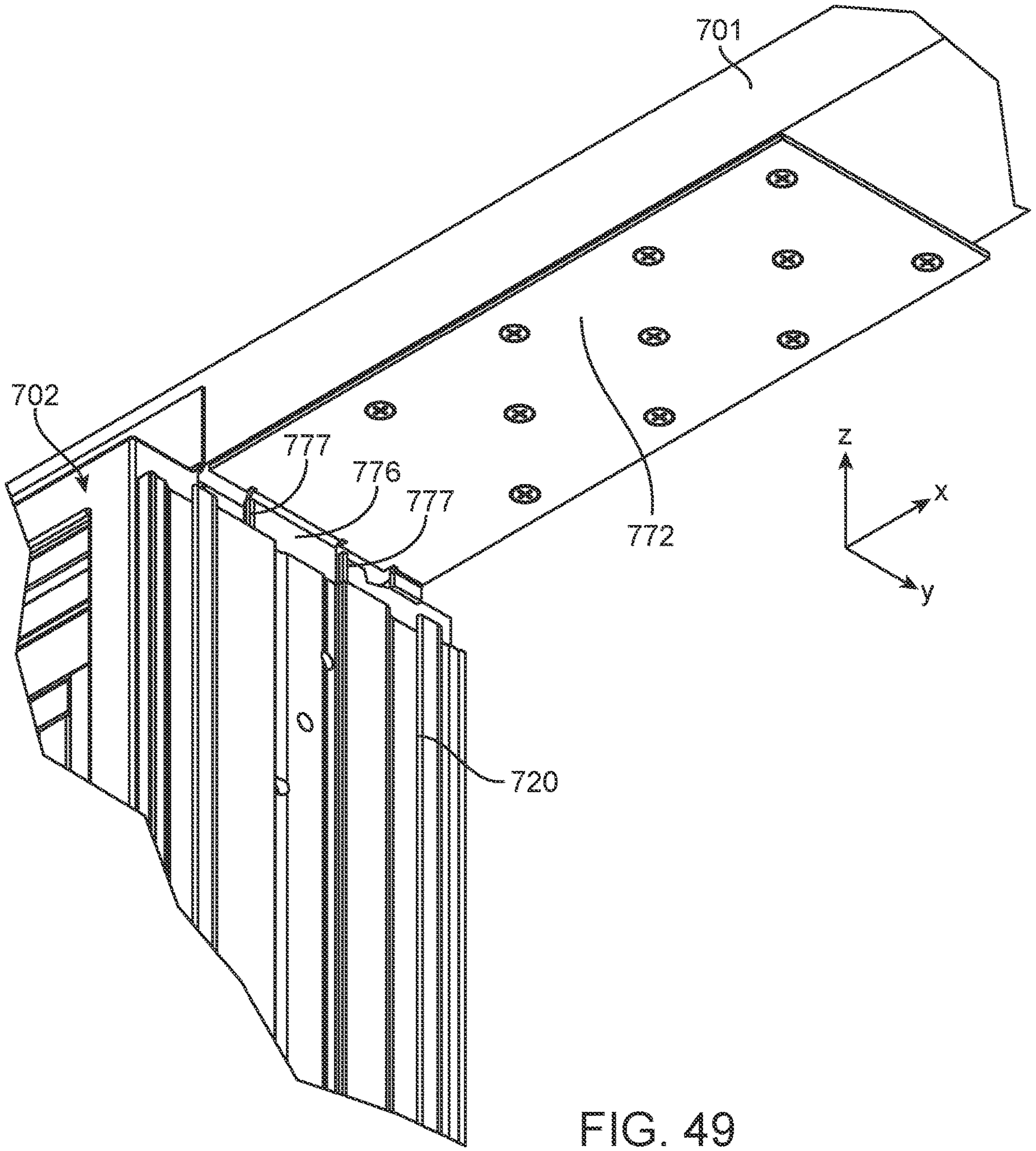
FIG. 49 is an enlarged perspective view of the corner gusset seen in FIG. 48.

One illustrative method of installing a pair of fenestration units and forming a mull joint between those fenestration units using a stacked corner gusset assembly as described herein is depicted in connection with FIGS. 48-51. One illustrative embodiment of a fenestration unit 702 having a corner gusset 770 attached thereto is depicted in FIGS. 48 and 49 with the base plate 772 of the corner gusset 770 attached to a framing member 701 forming an opening in which the fenestration unit 702 is attached. In this view, the framing member 701 may be a header running along a top of an opening, however, it should be understood that this method may be utilized on the opposite end of the fenestration unit 702 (i.e., the bottom or sill end).

The base plate 772 extends away from the corner of the fenestration unit 702 while the corner gusset 770 includes a gusset plate leg 776 having ribs 777 located between the fenestration unit 702 and the joining strip 720 attached thereto (see, e.g., FIG. 49). The base plate 772 of corner gusset 770 may be attached to framing member 701 by any suitable fastening technique, e.g., threaded fasteners, nails, rivets, adhesives, etc.

Figure 51:
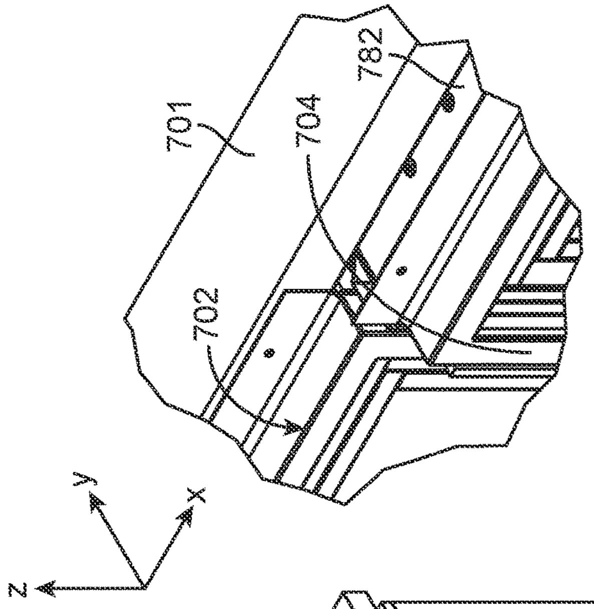
FIGS. 50-51 are perspective views of one illustrative method of installing a compound fenestration assembly using a stacked corner gusset assembly as described herein, with FIG. 51 being an enlarged view of portion C of FIG. 50.
Figure 50:
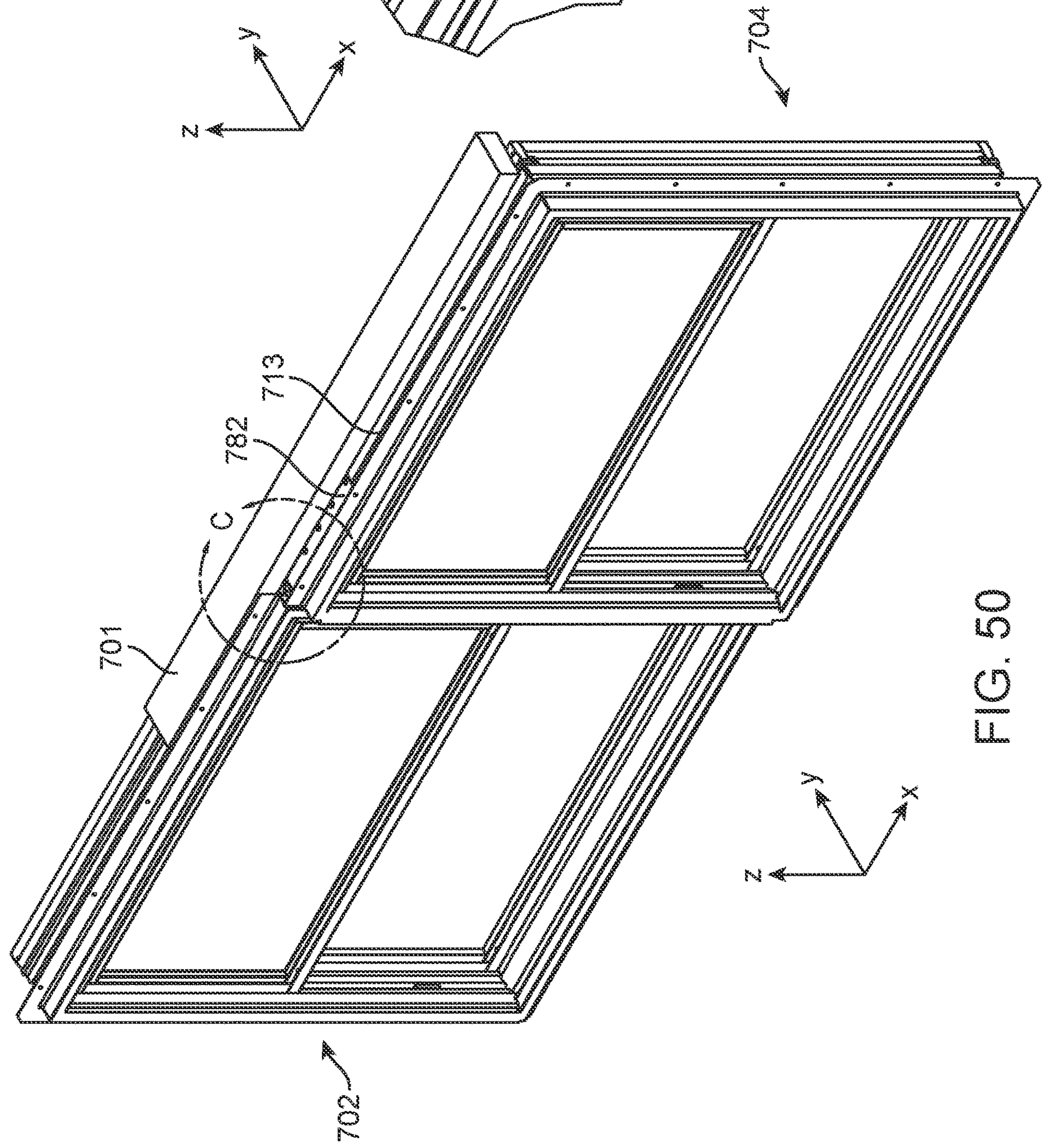

Turning to FIGS. 50 and 51, with fenestration unit 702 secured in the opening defined by framing member 701 the second fenestration unit 704 may be positioned to form a mull joint between the fenestration units 702 and 704 using joining strips as described herein. The second fenestration unit 704 includes a corner gusset having a gusset plate 782 attached to the upper frame member 713 of fenestration unit 704 as discussed in connection with the corner gusset assemblies described herein. As a result, positioning fenestration unit 704 in the opening next to the fenestration unit 702 to form a mull joint therebetween will position the base plate 782 between the base plate 772 of the corner gusset attached to the first fenestration unit 702 such that the base plates are in a stacked arrangement as described herein.

Figure 52:
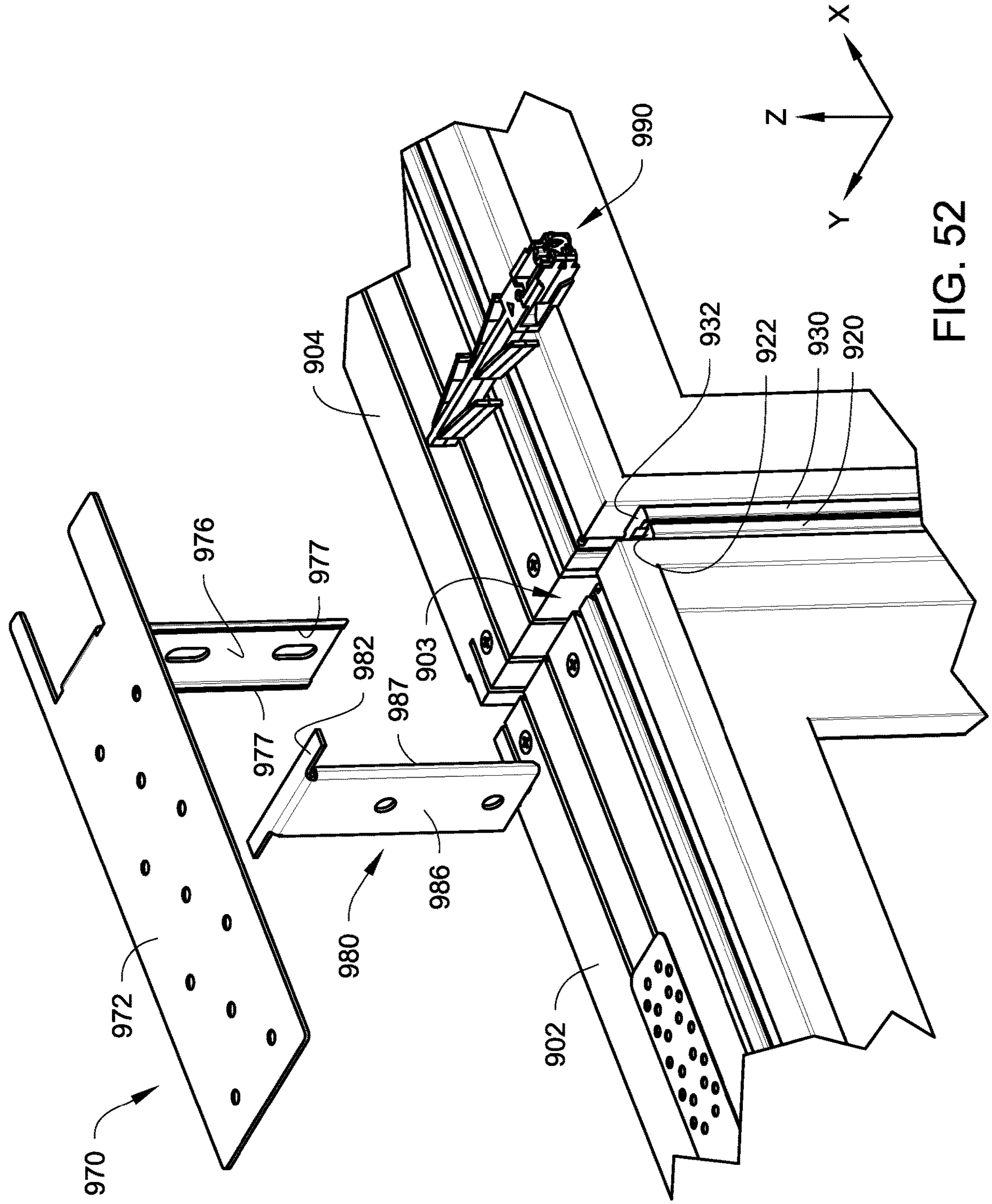
FIG. 52 is an exploded perspective view of another alternative embodiment of a corner gusset assembly along with another alternative embodiment of a retainer plug that may be used in connection with the corner gusset assemblies described herein.

FIG. 52 is a perspective view of a portion of a pair of fenestration units 902 and 904 positioned next to each other and an exploded assembly view of one illustrative embodiment of a corner gusset assembly including a corner gusset 970 and a retainer plug bracket 980, along with a retainer plug 990 used in connection with a mull joint formed between fenestration units 902 and 904 using joining strips 920 and 930 as described herein. In many respects, the corner gusset assembly depicted in FIG. 52 is similar to the corner gusset assembly depicted in FIGS. 38 and 45.

The corner gusset assembly depicted in FIG. 52 may be useful in situation where access to an exterior surface of the opening in which a compound fenestration assembly as described herein is to be installed is difficult or impossible. For example, fenestration unit 904 may be installed in the opening first, allowing the installer to attach the base plate 972 of corner gusset 970 to an inward-facing surface of a framing member defining the opening in which the fenestration unit is installed (with the corner gusset 970 being attached to the fenestration unit 904 before the fenestration unit 904 is placed in the opening).

With the fenestration unit 904 secured in the opening, the second fenestration unit 902 (with retainer plug bracket 980 preferably attached thereto) can be slid and/or rotated into position such that any channels on the joining strips 920 and 930 interlock in a manner similar to that discussed in connection with, e.g., the joining strips and fenestration units depicted in FIGS. 1-2A, 9, 21, etc. Following placement of fenestration unit 902 in position next to unit 904 such that the channels on joining strips interlock, the retainer plug 990 may (as discussed herein in connection with, e.g., retainer plugs 790 and 890 in FIGS. 39-45) be inserted into a retainer plug recess 903 at the ends of the joining strips 920 and 930 used to form the mull joint. The mechanical interlock formed between the retainer plug 990, the corner gusset 970 and the retainer plug bracket 980 may serve to at least temporarily prevent fenestration unit 902 from falling back out of the opening while more permanent attachment of the fenestration unit 902 is completed.

Following placement of fenestration unit 902 in position next to unit 904 (with or without plug 990), fenestration unit 902 can be permanently secured in the opening using, e.g., conventional techniques for securing fenestration units in rough openings.

The corner gusset assembly includes a corner gusset 970 which is attached to fenestration unit 904 and retainer plug bracket 980 attached to fenestration unit 902. Corner gusset 970 includes a base plate 972 attached to a corner gusset leg 976, while retainer plug bracket 980 includes bracket leg 986 and an optional retainer plug guide 982 attached to the bracket leg 986.

The corner gusset leg 976 is fixed in position along the interior/exterior axis (i.e., the y-axis) relative to the frame member of fenestration unit 904 to restrict movement of the corner gusset 970 along the interior/exterior axis. The corner gusset leg 976 may be fixed in position along the interior/ exterior axis relative to the frame member of fenestration unit 904 by any suitable technique or combination of techniques. In one or more embodiments, the corner gusset leg may be fixed in position using, e.g., mechanical fasteners, adhesives, mechanical interlocking structures, etc.

When assembled with the fenestration unit 904, the depicted illustrative embodiment of corner gusset leg 976 of corner bracket is fixed in position along the interior/exterior axis by positioning the corner gusset leg 976 between joining strip 930 and the frame member of fenestration unit 904 to which joining strip 930 is attached. In one or more embodiments, the corner gusset leg 976 may be attached to the joining strip 930 and/or the fenestration unit 904 itself by any suitable technique or combination of techniques, e.g., mechanical fasteners, adhesives, welding (thermal, chemical, etc.), interference/friction fits, etc. The base plate 972 of the corner gusset 970 extends away from the corner of the fenestration unit 904 proximate the end of the mull joint formed by joining strips 920 and 930. The base plate 972 extends away from the fenestration unit 904 in a direction aligned with the separation axis (i.e., the x-axis). The base plate 972 is configured for attachment to an interior surface of an opening in which the fenestration unit 904 is located with this feature being further described herein below.

The corner gusset assembly depicted in FIG. 52 (when assembled) also includes a retainer plug bracket 980 attached to fenestration unit 902. The bracket leg 986 is fixed in position along the interior/exterior axis (i.e., the y-axis) relative to the frame member of fenestration unit 902 to restrict movement of the retainer plug bracket 980 along the interior/exterior axis. The bracket leg 986 may be fixed in position along the interior/exterior axis relative to the frame member of fenestration unit 902 by any suitable technique or combination of techniques. In one or more embodiments, the bracket leg may be fixed in position using, e.g., mechanical fasteners, adhesives, mechanical interlocking structures, etc.

In the depicted illustrative embodiment, bracket leg 986 is fixed in position along the interior/exterior axis by positioning the bracket leg 986 between the joining strip 920 and the frame member of the fenestration unit 902 to which joining strip 920 is attached. In one or more embodiments, the bracket leg 986 may be attached to the joining strip 920 and/or the fenestration unit 902 itself by any suitable technique or combination of techniques, e.g., mechanical fasteners, adhesives, welding (thermal, chemical, etc.), interference/friction fits, etc.

The retainer plug bracket 980 includes an optional retainer plug guide 982 attached to the bracket leg 986. In one or more embodiments, the retainer plug guide 982 extends away from the fenestration unit 902 in a direction aligned with the separation axis (i.e., the x-axis) such that the retainer plug guide 982 is positioned over the retainer plug recess 903 formed between fenestration units 902 and 904 and above the first ends 922 and 932 of joining strips 920 and 930. In one or more embodiments, the retainer plug guide 982 may be described as being located between the base plate 972 of the corner gusset 970 and the retainer plug recess 903 formed between the fenestration units 902 and 904 and above the first ends 922 and 932 of joining strips 920 and 930.

In one or more embodiments, the retainer plug guide 982 may provide a surface against which the retainer plug 990 acts as it is being inserted into the retainer plug recess 903. The retainer plug guide 982 may also serve to aid in proper positioning of the retainer plug bracket 980 in retainer plug recess 903 relative to the fenestration unit 902.

Figure 53:
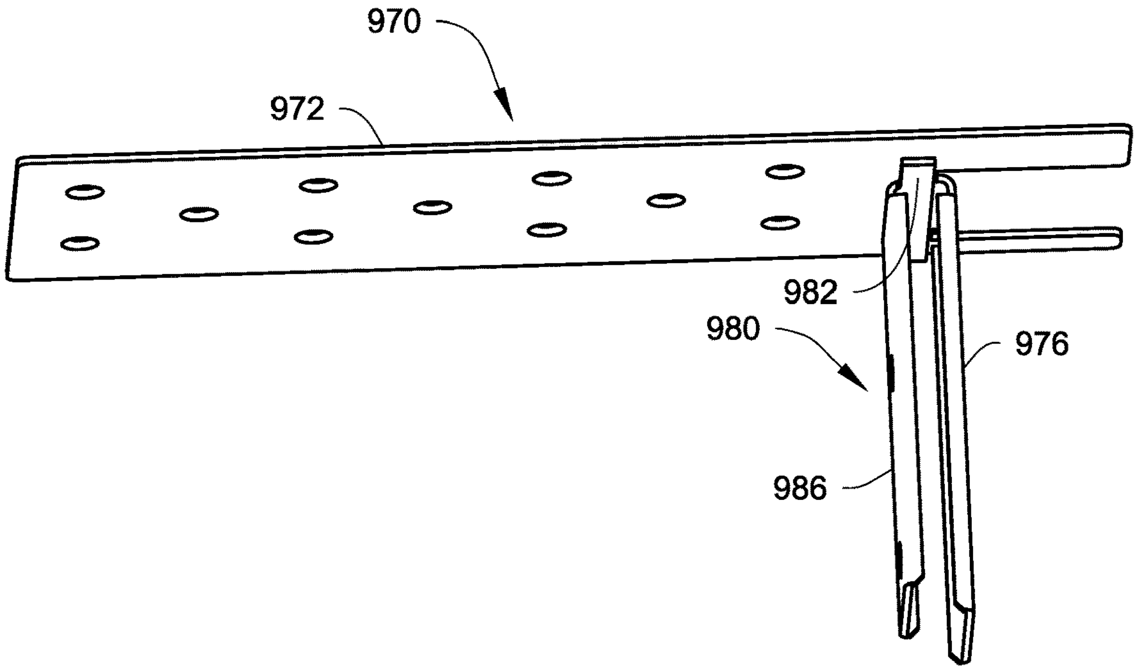
FIG. 53 is a perspective view of the corner gusset and retainer plug bracket of the corner gusset assembly of FIG. 52 shown in an isolated view in position relative to each other as they would be when assembled in a mull joint as described herein.

The corner gusset 970 and retainer plug bracket 980 are depicted separately from the fenestration units in FIG. 53 where it can be seen that the corner gusset leg 976 and bracket leg 986 are positioned such that the legs 976 and 986 are located on opposite sides of the retainer plug recess 903 such that they face each other, while the optional retainer plug guide 982 is positioned beneath base plate 972 of corner gusset 970.

Figure 54:
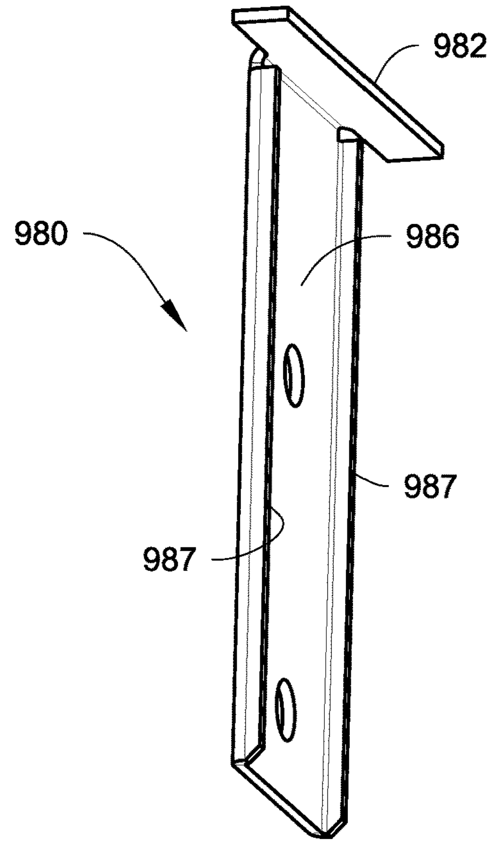
FIG. 54 is an enlarged perspective view of the retainer bracket plug of FIGS. 52-53.

The retainer plug bracket 980 is depicted alone in FIG. 54 so that certain features that may be found in one or more embodiments of a retainer plug bracket as used in one or more embodiments of a corner gusset assembly can be described. In particular, with reference to FIG. 52, corner gusset leg 976 of corner gusset 970 may, in one or more embodiments, include raised ribs 977 that may mate with slots formed in joining strip 930 in the same manner as locator plates 40 mate with slots 25 in joining strips 20 as depicted in, e.g., FIGS. 3 and 5. Similarly, with reference to FIG. 54, bracket leg 986 may, in one or more embodiments, include raised ribs 987 or other features which may mate with slots formed in joining strip 920 in the same manner as locator plates 40 mate with slots 25 in joining strips 20 as depicted in, e.g., FIGS. 3 and 5.

The raised ribs 977 on corner gusset leg 976 and corresponding mating features on joining strip 930 represent only one embodiment of features that may cooperate to fix the corner gusset leg 976 in position along the interior/exterior axis of the mull joint (i.e., along the y-axis) relative to the frame member of the fenestration unit 904 to restrict movement of the corner gusset 970 along that interior/exterior axis. Similarly, the raised ribs 987 on bracket leg 986 and corresponding mating features on joining strip 920 represent only one embodiment of features that may cooperate to fix the bracket leg 986 in position along the interior/exterior axis of the mull joint relative to the frame member of the fenestration unit 902 to restrict movement of the retainer plug bracket 980 along that interior/exterior axis.

In one or more embodiments, fixing the position of the corner gusset leg 977 along the interior/exterior axis relative to the frame member of the fenestration unit 904 as described herein may assist in transferring forces exerted on the fenestration unit 904 (e.g., wind loads, etc.) to the framing members defining the rough opening in which the fenestration unit 904 is located.

Although the ribs 977 and 987 and corresponding slots in joining strips 920 and 930 provide one example of complementary mating features configured to fix the position of the corner gusset 970 and retainer plug bracket 980 relative to the fenestration units 902 and 904, many other complementary mating structures could be used in place of those depicted in connection with the illustrative embodiment so long as they provided the function of fixing the corner gusset leg 976 and bracket leg 986 in position along the interior/exterior axis between the fenestration units 902 and 904. Other complementary mating structures could include, for example, slots or channels in the frame members of the fenestration units 902 and 904 (in which case, the ribs 977 and 987 may face in the opposite direction, i.e., away from the retainer plug recess and towards the frame members of the fenestration units 902 and 904 such that the ribs are positioned within the slots/channels in the fenestration unit frame members, etc. Still other examples of complementary mating features could include pins that cooperate with slots or apertures, etc.

Figure 46:
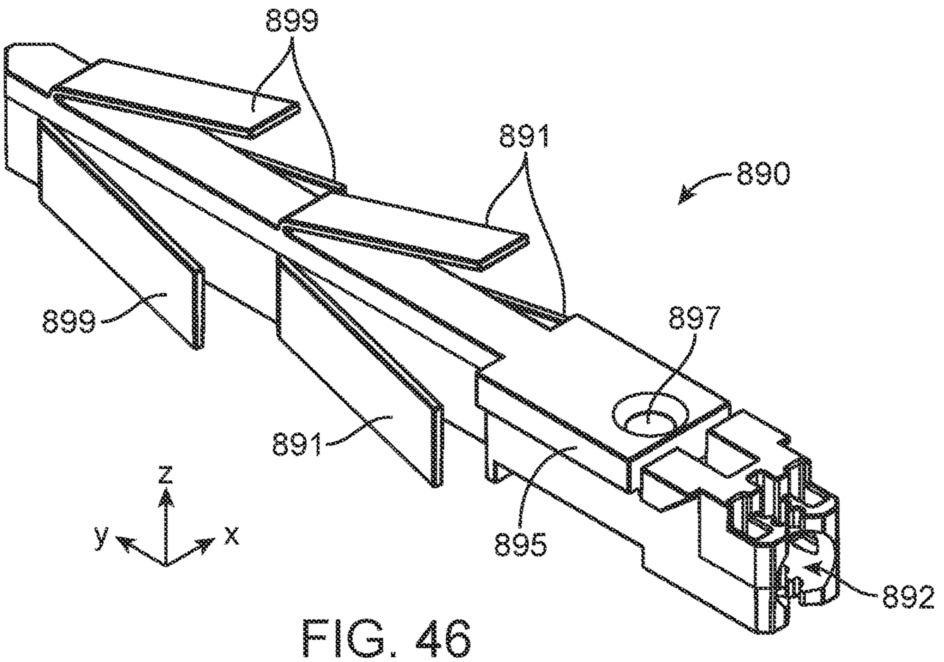
FIG. 46 is an enlarged perspective view of the alternative illustrative embodiment of the retainer plug depicted in FIG. 45.
Figure 47:
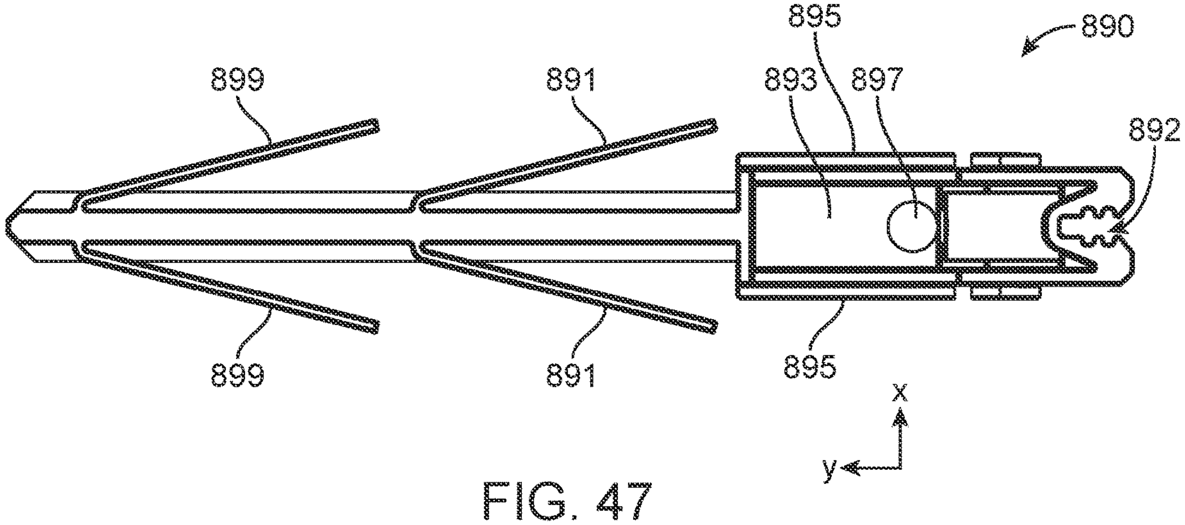
FIG. 47 is a plan view of the retainer plug of FIG. 46.
Figure 55:
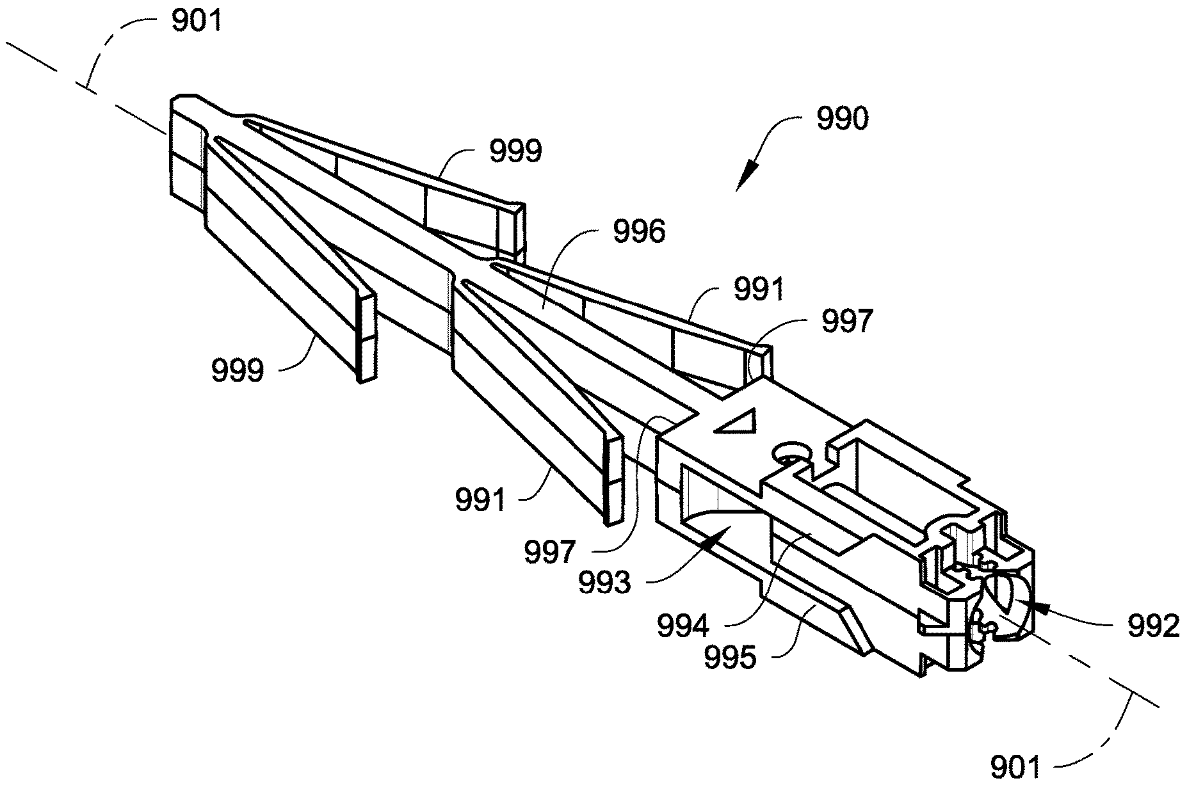
FIG. 55 is an enlarged perspective view of the retainer plug of FIG. 52.
Figure 56:
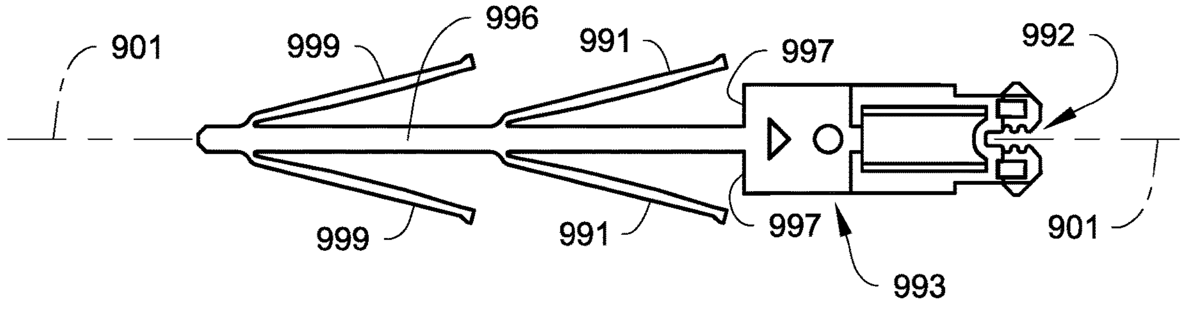
FIG. 56 is a plan view of the retainer plug of FIGS. 52 and 55.

The illustrative embodiment of a corner gusset assembly as depicted in FIG. 52 also includes a retainer plug 990 also depicted alone in, e.g., FIGS. 55-56 that may, in one or more embodiments, be similar to retainer plug 890 as depicted in FIGS. 45-47. As discussed herein, the joining strips 920 and 930 terminate at a recessed location between the frame members of the fenestration units 902 and 904 to define a retainer plug recess 903. In one or more embodiments, a retainer plug 990 may be positioned in the retainer plug recess 903 between the frame members of the fenestration units 902 and 904. Retainer plug 990 extends along axis 901 (see, e.g., FIGS. 55-56) which, when the retainer plug 990 is in the seated position in retainer plug recess 903, is aligned with the interior/exterior axis (i.e., the y-axis).

The retainer plug 990 used in connection with the illustrative embodiment of corner gusset assembly depicted in, e.g., FIG. 52, may, in one or more embodiments, mechanically interlock with the legs 976 and 986 of the corner gusset assembly to restrict disengagement of the channels on the joining strips 920 and 930 forming the mull joint between the attached fenestration units 902 and 904.

In the illustrative embodiment depicted in FIGS. 52 and 55-58, retainer plug 990 includes wings 991 and 999 biased outwardly from a stem 996 of the retainer plug 990. In one or more embodiments, those wings 991 and/or 999 may act outwardly against the corner gusset leg 976 and bracket leg 977.

In one or more embodiments, each of the wings 991/999 may be described as extending from a first end attached to the stem 996 to a second end distal from that first and, with the wing biased away from the stem 996 such that the second end of the wing moves away from the stem 996 in the absence of a force acting on the wing in a direction towards the stem 996. The second ends of the wings 991/999 may, as discussed herein, be the ends that mechanically interlock with a corner gusset leg or a bracket leg when the retainer plug 990 is in a seated position in a retainer plug recess 903.

Figure 57:
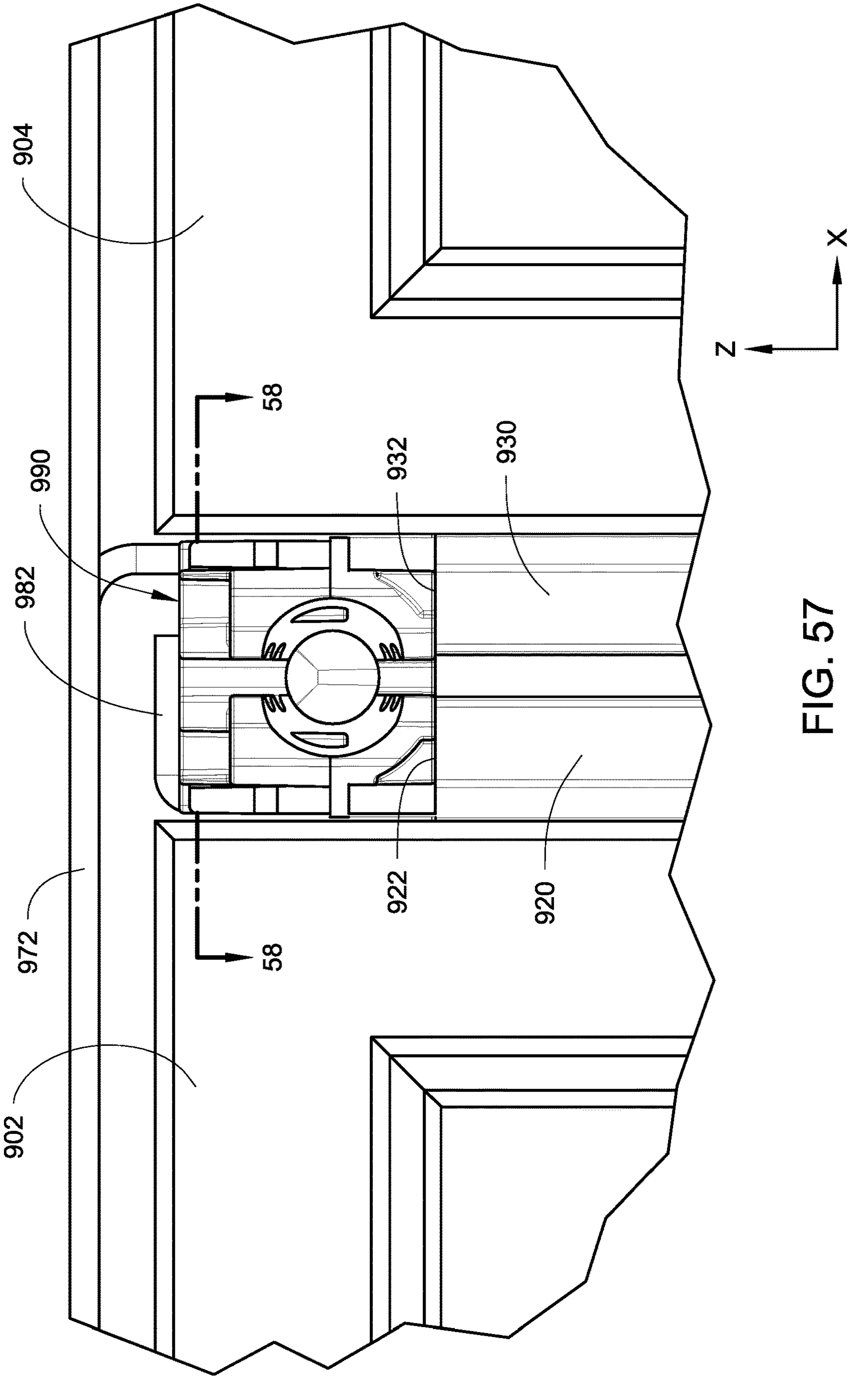
FIG. 57 is an end view of the corner gusset assembly of FIG. 52 after the retainer plug, corner gusset and retainer plug bracket are assembled at the end of the mull joint.
Figure 58:
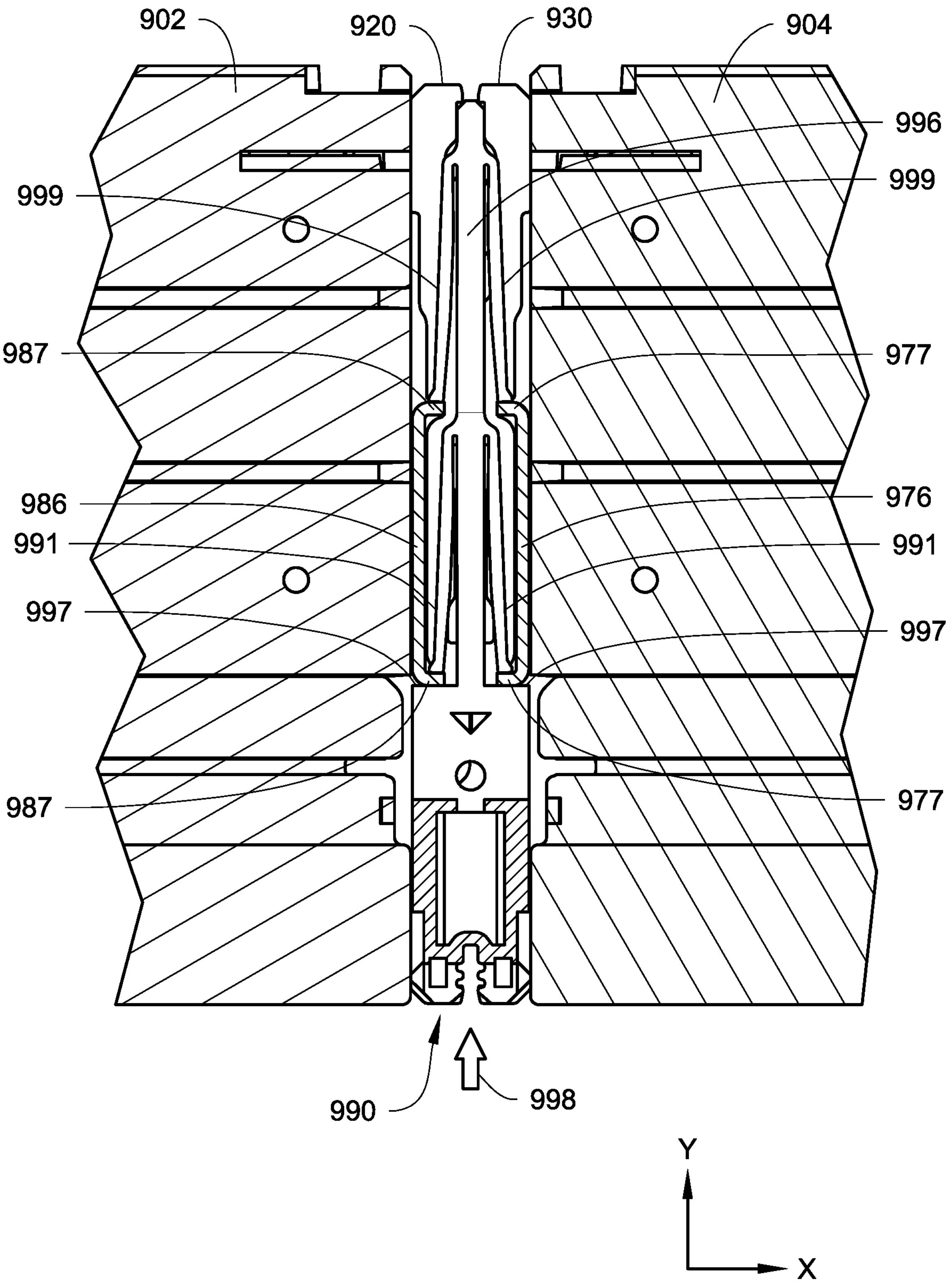
FIG. 58 is a partial cross-section view of FIG. 57 taken along line 58-58 in FIG. 57.

The interaction of wings 991/999 with the corner gusset leg 976 and the bracket leg 986 can be seen in connection with, e.g., FIG. 58 which is a cross-sectional view taken along line 58-58 in FIG. 57 which depicts the end of the mull joint of FIG. 52 between fenestration units 902 and 904 when the components depicted in FIG. 52 are assembled. The retainer plug 990 is, as depicted in FIGS. 57 and 58, in a seated position between the corner gusset leg 976 and the bracket leg 986 (which are positioned relative to each other as they would be in a mull joint as described herein).

In the seated position as seen in, e.g., FIG. 57, the retainer plug 990 is located between the retainer plug guide 982 and both ends 922 and 932 of joining strips 920 and 930. In that seated position, the retainer plug 990 preferably mechanically interlocks with both the corner gusset leg 976 and the bracket leg 986 as the retainer plug 990 moves into the seated position along the interior/exterior axis (i.e., the y-axis) in the direction of arrow 998 in FIG. 58. In the depicted embodiment, the wings 991 and a portion of the stem 996 are positioned between the corner gusset leg 976 and the bracket leg 986, while the shoulders 997 of retainer plug 990 are positioned outside of the corner gusset leg 976 and the bracket leg 986 when the retainer plug 990 is in the seated position. Further, wings 999 are positioned between the fenestration units 902 and 904 on the opposite side of corner gusset leg 976 and bracket leg 986 from the shoulders 997 of the retainer plug 990.

Because, as described herein, the corner gusset leg 976 and the bracket leg 986 are fixed in position relative to fenestration units 902 and 904 on opposite sides of the mull joint located between fenestration units 902 and 904, mechanically interlocking the corner gusset leg 976 with the bracket leg 986 using retainer plug 990 results in restricting movement of the fenestration units 902 and 904 relative to each other along the interior/exterior axis that would result in disengagement of the channels on the joining strips 920 and 930 from each other.

In particular, as noted in connection with, e.g., joining strips 20 and 30 in FIGS. 1, 2A and 2B, the channels in joining strips used in the mull joints of a compound fenestration assembly as described herein prevent movement of the attached fenestration units along the interior/exterior axis after the channels in the opposing joining strips have engaged each other. That movement is, however, prevented only in one direction such that further advancement of the fenestration units along the direction used to engage the channels is prevented by the channels themselves.

Using a corner gusset assembly including a retainer plug 990 that mechanically interlocks with both a corner gusset leg 976 and a bracket leg 986 as described in connection with this illustrative embodiment, restricts movement of the fenestration units 902 and 904 and their respective joining strips 920 and 930 in a direction that could result in disengagement of the channels on the joining strips 920 and 930 from each other. In other words, the mechanical interlock between the wings 991/999 on retainer plug 990 with both the corner gusset leg 976 and the bracket leg 986 prevents movement of the fenestration units 902 and 904 (and their respective joining strips 920 and 930) relative to each other along the interior/exterior axis in, e.g., a direction that is opposite from the direction in which the joining strips 920 and 930 are moved to engage their respective channels with each other.

Referring to FIGS. 55-56, the depicted illustrative embodiment of retainer plug 990 includes a locking section that includes stem 996 located between wings 999 and 991, the stem 996 extending away from the reservoir 993 and sealant port 992 between shoulders 997. At least a portion of that locking section is, as seen in, e.g., FIG. 57, positioned between the corner gusset leg 976 and the bracket leg 986 when the retainer plug 990 is in a seated position in a retainer plug recess as described herein. In one or more embodiments, that locking section may be described as having a compressed configuration and an expanded configuration wherein a width of the locking section as measured between the first and second fenestration units along the separation axis (i.e., the X axis) is larger in the expanded configuration than in the compressed configuration.

The difference between the compressed configuration and the expanded configuration can be seen by comparing, e.g., FIGS. 56 and 58, where wings 991/999 are in an expanded configuration relative to the stem 996 of the locking section of the retainer plug 990 in FIG. 56 and in a compressed configuration relative to the stem 996 in FIG. 58.

It will be understood that, as the locking section defined by stem 996 of retainer plug 990 moves in the direction of arrow 998 during advancement of the retainer plug 990 into a retainer plug recess 903 towards the seated position, the wings 991 and 999 are moved from their expanded configurations to a compressed configuration as the wings 991 and 999 are advanced through the gap formed between corner gusset leg 976 and bracket leg 986.

That movement of wings 991/999 from their expanded configurations to their compressed configurations as the wings 991/999 are advanced through the gap formed between the corner gusset leg 976 and the bracket leg 986 may be described in terms of the ends of the wings. As discussed herein, the wings may be described as having a first end attached to the stem 996 and a second end distal from the first end. In one or more embodiments, the second end of the wing may be configured to move towards the stem 996 as the retainer plug 990 is advanced into the retainer plug recess 903 in a first direction (i.e., the direction of arrow 998) along the interior/exterior axis towards the seated position in the retainer plug recess 903 as seen in, e.g., FIG. 58. That same second end of the wing may also be configured to move at least partially away from the stem 996 when the retainer plug 990 reaches the seated position after the second end of the wing moves towards the stem 996 as the retainer plug 990 is advanced towards the seated position.

Again, with reference to FIG. 58, wings 991 located between corner gusset leg 976 and bracket leg 986 may be described as being in a compressed configuration when the retainer plug 990 is in a seated position as seen in FIG. 58 even though the second ends of the wings 991 move at least partially away from the stem 996 when in the seated position. In the depicted illustrative embodiment, the wings 991 do not, however, reach their fully expanded configuration because they are prevented from reaching the fully expanded configuration by the corner gusset leg 976 and the bracket leg 986 when the retainer plug 990 is in its seated position.

Because wings 991 of retainer plug 990 move outwardly to their interlocking configuration as seen in FIG. 58, the ends of the wings 991 are positioned relative to ribs 977 and 987 on one side of the corner gusset leg 976 and bracket leg 986 such that movement of the retainer plug 990 in a direction opposite from arrow 998 is prevented by the ends of wings 991 acting against the ribs 977 and 987. Further, movement of bracket leg 986 in that same direction, i.e., opposite the direction of arrow 998, is prevented because wing 991 acting against rib 977 on corner gusset leg 976 prevents movement of retainer plug 990 in a direction opposite that of arrow 998, with shoulder 997 on retainer plug 990 preventing movement of bracket leg 986 in a direction opposite the direction of arrow 998.

Wings 999 of the illustrative embodiment of retainer plug 990 also move outwardly to their interlocking configuration as seen in FIG. 58. As depicted in that figure, the ends of wings 999 are positioned relative to ribs 977 and 987 on the opposite side of the corner gusset leg 976 and bracket leg 986 such that movement of the retainer plug 990 in a direction opposite from arrow 998 is prevented by the ends of wings 999 acting against those ribs 977 and 987.

In a compound fenestration assembly such as that depicted in, e.g., FIGS. 52 and 58, the relationships between wings 991 and 999 with ribs 977 and 987 of corner gusset leg 976 and bracket leg 986, as well as shoulders 997 of retainer plug 990 cooperate to restrict movement of the fenestration units 902 and 904 relative to each other along the interior/exterior axis (i.e., the y-axis).

Although the illustrative embodiment of retainer plug 990 includes wings biased outwardly away from each other, it will be understood that many other structures could be used in place of wings to provide a retainer plug that mechanically interlocks with a corner gusset leg and a bracket leg as described herein. For example, potentially suitable alternatives to wings may include, e.g., a retainer plug that includes a rotating section (e.g., a cam) that mechanically interlocks with the corner gusset and bracket legs, an inflatable retainer plug (e.g., inflatable using a fluid such as a sealant, etc.) that expands to mechanically interlock with the corner gusset and bracket legs, etc.

The illustrative embodiment of retainer plug 990 includes optional features configured to control the delivery of sealant into the end of a mull joint as described herein in connection with other alternative embodiments. In particular, the retainer plug 990 as seen in, e.g., FIGS. 55-56, includes a sealant reservoir 993 which is generally similar to the sealant reservoirs provided in connection with other retainer plugs as described herein. The depicted illustrative embodiment of retainer plug 990 includes a sealant port 992 similar to the sealant ports described in connection with other retainer plugs described herein (see, e.g., FIGS. 25A, 25B, and 26 and their corresponding descriptions). The depicted illustrative embodiment of retainer plug 990 may also include sealant dams 994 and 995 on the exterior of the plug 990 between the reservoir 993 and sealant port 992 such that sealant escaping from the reservoir 993 flows between the sealant dams 994 and 995 towards the sealant port 992 over the sides of retainer plug 990 in a manner generally similar to that discussed above in connection with, e.g., sealant reservoir 193 on end seal member 190.

Figure 59:
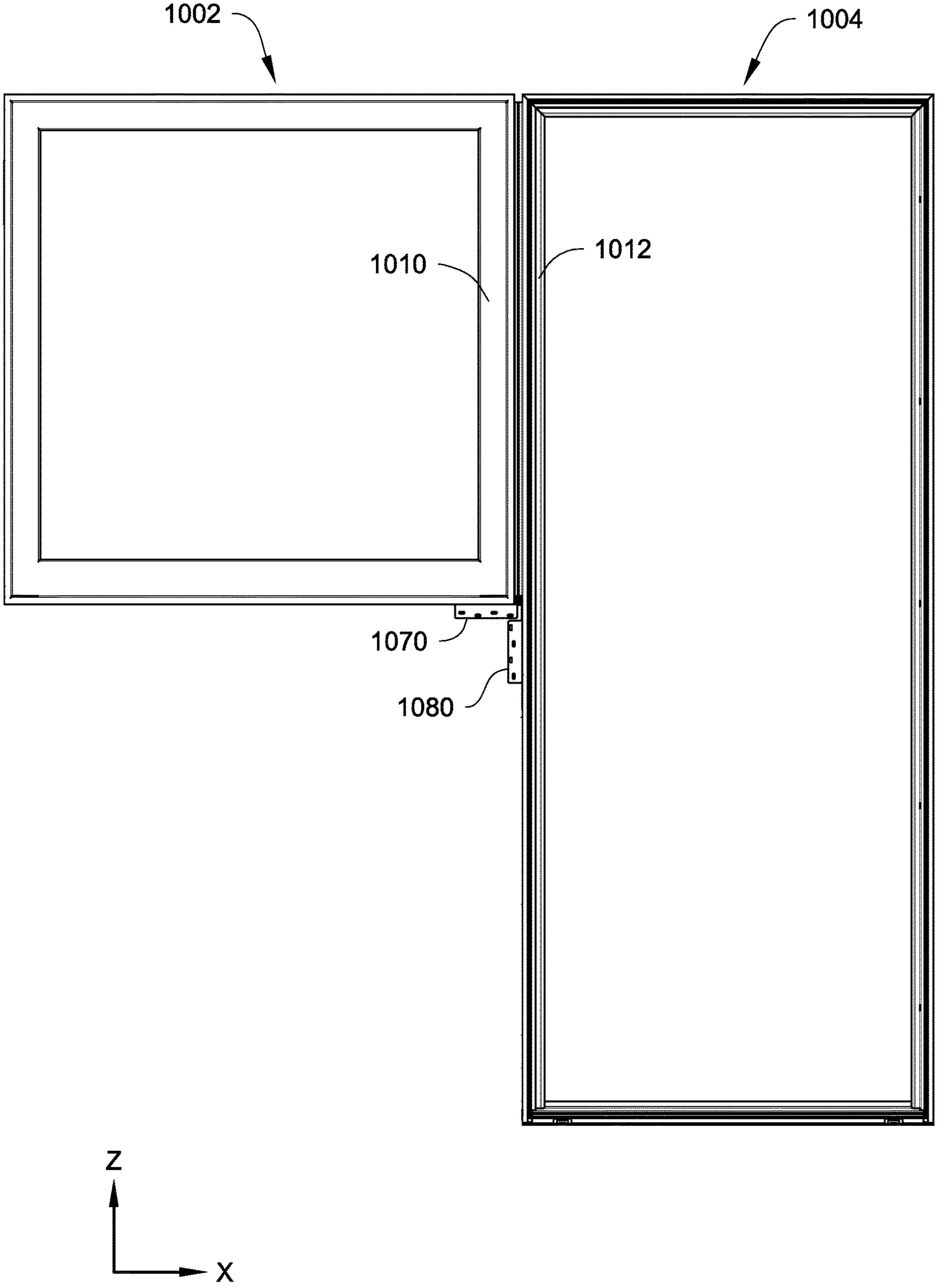
FIG. 59 depicts another illustrative embodiment of a compound fenestration assembly as described herein.
Figure 60:
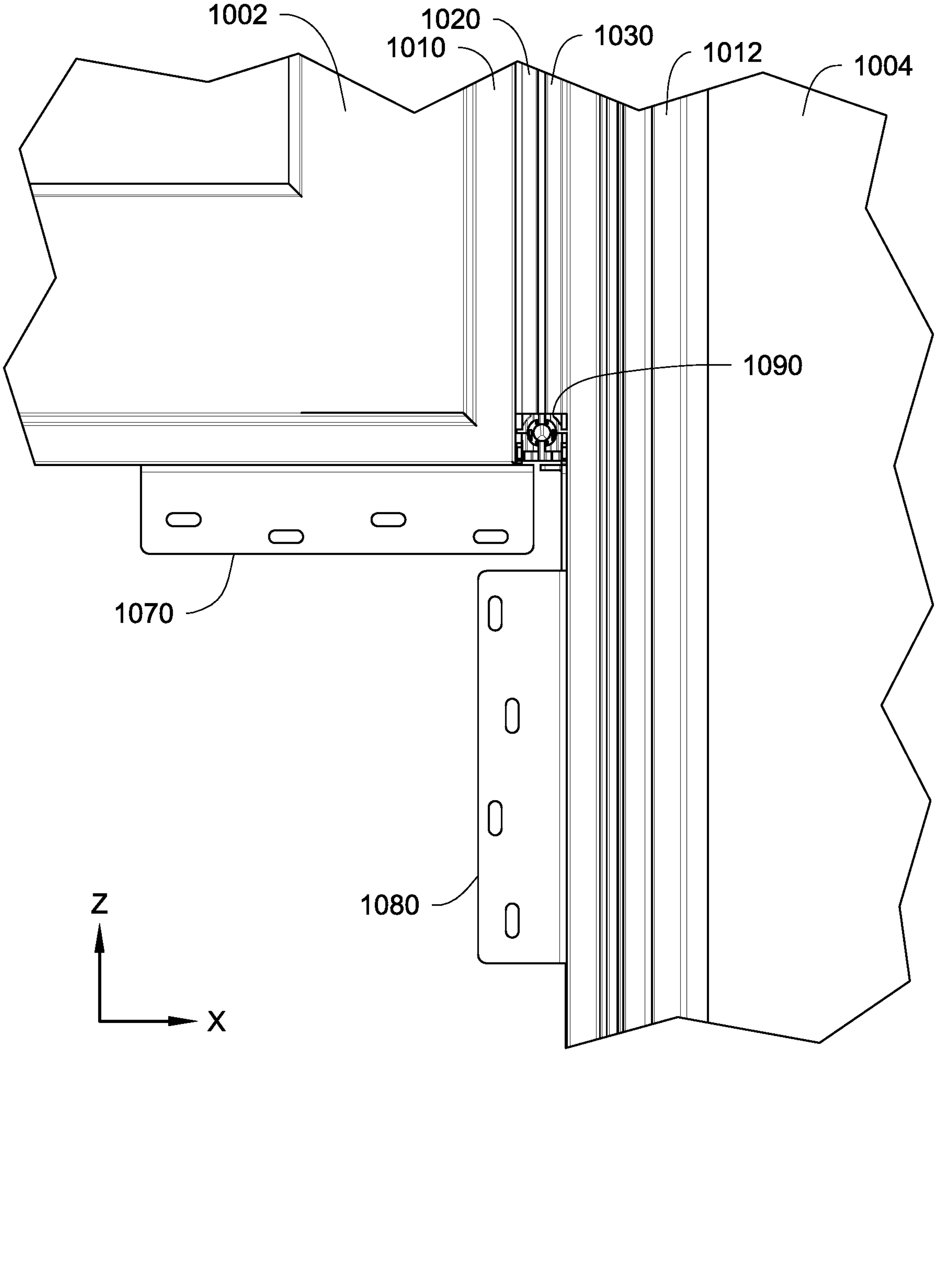
FIG. 60 is an enlarged view of the lower end of the mull joint of the compound fenestration assembly of FIG. 59.
Figure 61:
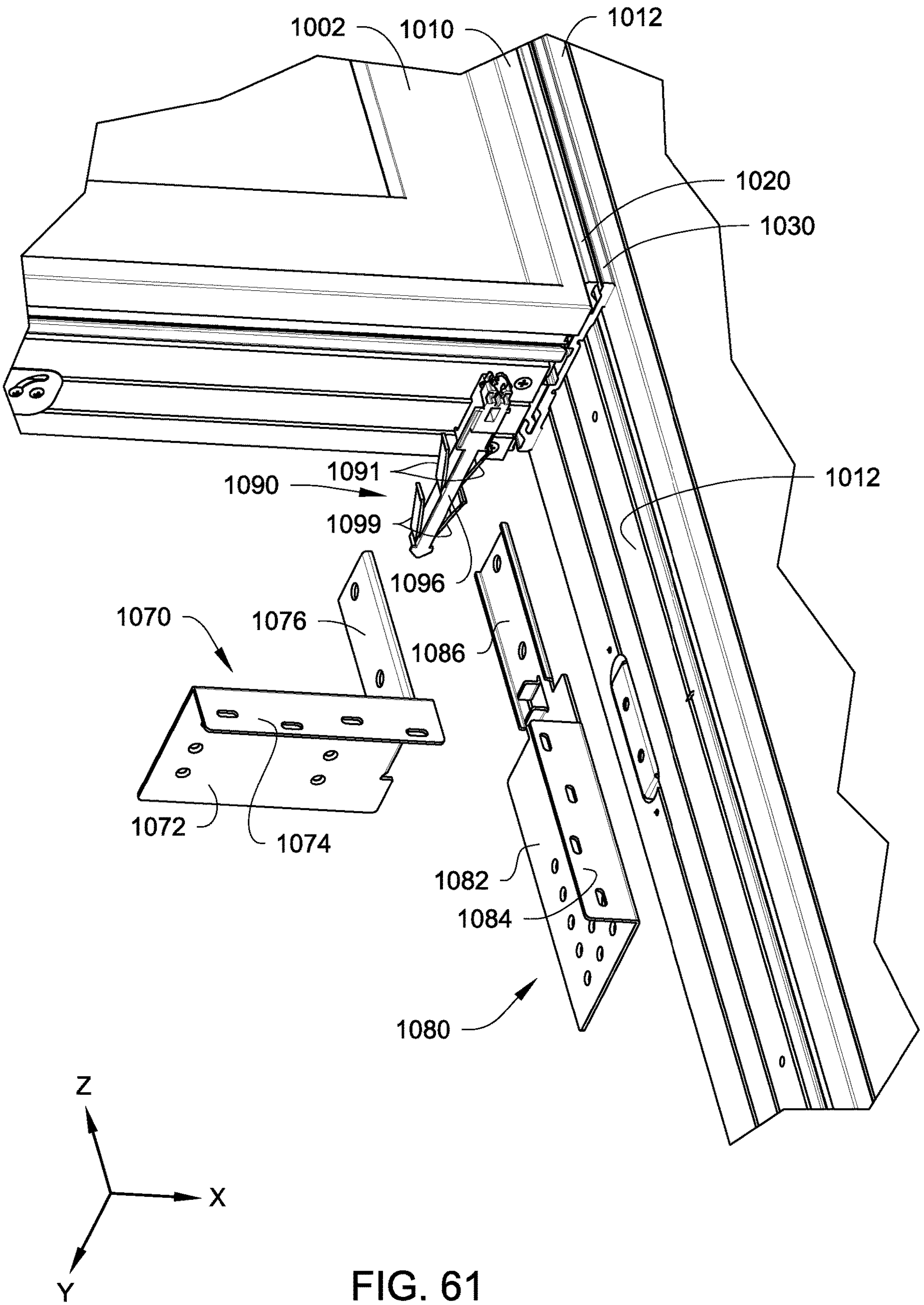
FIG. 61 is an exploded perspective view of the components in the mull joint depicted in FIG. 60.

Another illustrative embodiment of a compound fenestration assembly including to fenestration units attached to each other along a mull joint is depicted in FIGS. 59-61. With reference to FIG. 59, the illustrative embodiment of the compound fenestration assembly includes fenestration units 1002 and 1004, with a frame member 1010 of fenestration unit 1002 being attached to a portion of frame member 1012 of fenestration unit 1004. In one or more embodiments, the compound fenestration assembly including fenestration units 1002 and 1004 may be a combination of a window unit (e.g., fenestration unit 1002) and a door unit (e.g., fenestration unit 1004).

One feature depicted in the compound fenestration assembly as seen in FIG. 59 is that a mull joint as described herein may be provided between fenestration units having frame members that are not the same length. In particular, frame member 1010 of fenestration unit 1002 is shorter than frame member 1012 of fenestration unit 1004. Also depicted in FIG. 59 are corner gussets 1070 and 1080 that may be used to secure the compound fenestration assembly to a building structure such as, e.g., a knee wall (not shown).

In one or more embodiments of a compound fenestration assembly including fenestration units of different lengths/sizes connected by a mull joint as described herein, a retainer plug may be used in connection with the corner gussets 1070 and 1080 to assist with interlocking and/or ceiling the ends of the mull joint. With reference to, e.g., FIG. 60, fenestration unit 1002 and its frame member 1010 are connected to fenestration unit 1004 and its frame member 1012 using joining strips 1020 and 1030 in a manner similar to that described herein with other illustrative embodiments. As with other embodiments of mull joints as described herein, the retainer plug 1090 is located between the ends of the joining strips 1020 and 1030 and the end of the mull joint formed between frame members 1010 and 1012 of fenestration units 1002 and 1004.

The exploded assembly diagram of FIG. 61 depicts components that may be used in one illustrative embodiment of a corner gusset assembly that may be useful in attaching a compound fenestration assembly in a rough opening having an outside corner, e.g., a rough opening that may be formed at least in part by a knee wall.

The illustrative embodiment of the corner gusset assembly depicted in FIG. 61 includes a corner gusset 1070 including a gusset leg 1076 configured to interlock with joining strip 1020 attached to a frame member 1010 of fenestration unit 1002. The corner gusset 1070 also includes a base plate 1072 and flange 1074, with the base plate 1072 being configured for attachment to the fenestration unit 1002 and flange 1074 being configured for attachment to a framing member of a rough opening in which the compound fenestration assembly is installed.

The illustrative embodiment of the corner gusset assembly depicted in FIG. 61 is, in many respects, similar to the corner gusset assemblies depicted in FIGS. 38, 45, and 52. For example, the corner gusset assembly depicted in FIG. 61 includes a corner gusset 1080 including a gusset leg 1086 configured to interlock with joining strip 1030 attached to a frame member 1012 of fenestration unit 1004. The corner gusset 1080 also includes a base plate 1082 and a flange 1084, with the base plate 1072 being configured for attachment to the fenestration unit 1004 and flange 1084 being configured for attachment to a framing member of a rough opening in which the compound fenestration assembly is installed.

One difference between the mull joint components depicted in FIG. 61 and those described elsewhere herein, is that gusset leg 1086 is located in the same plane or aligned with the base plate 1082 of corner gusset 1080. The gusset leg 1086 and base plate 1082 are aligned with each other in this illustrative embodiment because the mull joint formed by joining strips 1020 and 1030 between frame members 1010 and 1012 is not extend over the entire length of frame member 1012. Furthermore, providing a gusset leg 1086 and base plate 1082 in alignment with each other positions flange 1084 for attachment to an outside corner of a framing member defining a rough opening in which the compound fenestration assembly of fenestration units 1002 and 1004 is positioned.

In addition to corner gussets 1070 and 1080 the depicted illustrative embodiment of the compound fenestration assembly as seen in FIG. 61 also includes a retainer plug 1090 including a stem 1096 and wings 1091/1099 that interlock with gusset legs 1076 and 1086 in a manner similar to that described above in connection with, e.g., corner gusset 970 and retainer plug bracket 980 as depicted in FIGS. 52-58.

Although the illustrative embodiments of joining strips used in mull joints as described herein are depicted with two channels, it should be understood that the joining strips used to form mull joints in compound fenestration assemblies as described herein may include as few as one channel and three or more channels.

Further, although the illustrative embodiments of joining strips used in mull joints as described herein are depicted as extending over a majority of a length of the frame members of the fenestration units to which they are attached, it will be understood that the joining units may extend over only a portion of the mull joint. Still further, a mull joint between two fenestration units may, in one or more embodiments, be formed by multiple pairs of joining strips on the opposing fenestration unit frame members, with each pair of joining strips occupying only a portion of the mull joint between the frame members.

The mull joints formed between fenestration units in compound fenestration assemblies as described herein be described as having a first end and a second end at opposite ends of the mull joints. In those embodiments in which the joining strips used to form the mull joint extend to positions proximate the first and second ends of the mull joint, the gusset assemblies described herein may facilitate the transfer of loads to framing members defining the rough openings in which the compound fenestration assemblies are positioned at opposite ends of the mull joints described herein. For example, the first end of a mull joint may be described as being attached to a first side of an opening in which the compound fenestration assembly is positioned, while a second end of a mull joint may be described as being attached to a second side of the opening in which the compound fenestration assembly is positioned, with the first and second sides of the opening being located opposite from each other such that the fenestration units on each side of the mull joint span the opening along the mull joint between the first and second sides.

Further, many of the components found along the mull joints at junctions between fenestration units attached to each other within the compound fenestration assemblies described herein assist in transferring loads (e.g., wind loads, etc.) to the framing components defining the rough openings in which those compound fenestration assemblies are positioned. For example, the intersection plates 174 described in connection with the illustrative compound fenestration assemblies of FIGS. 15-19 serve, along with joining strips 220 and 232 transfer loads from an interior of the compound fenestration assembly seen in, e.g., FIG. 23 to the exterior of the compound fenestration assembly, where those loads can be transferred to framing members defining the rough opening in which the compound fenestration assembly is positioned.

As another example in which components found along the mull joints at junctions between fenestration units attached to each other within the compound fenestration assemblies described herein assist in transferring loads to the framing components defining the rough openings in which those compound fenestration unit assemblies are positioned is seen in connection with the illustrative embodiment of a stacked corner gusset assembly as depicted in, e.g., FIG. 38. In that corner gusset assembly, corner gusset 770 is attached to a framing member defining an opening in which the compound fenestration assembly including fenestration units 702 and 704 is positioned. Fenestration unit 704 is not, however, directly attached to the framing member defining the opening in which the compound fenestration assembly is positioned. Because, as described herein, the fenestration unit 704 is connected to fenestration unit 702 at the end of the mull joint formed between the two fenestration units, forces on the fenestration unit 704 are, however, transferred to that framing member defining the opening through the interconnection between the joining strips and the corner gussets found at the end of the mull joint between fenestration units 700 to and 704.

A similar transfer of loads from fenestration unit 804 to fenestration unit 802 as depicted in, e.g., FIG. 45 occurs through the mull joint connections between the joining strips, corner gussets 870 and 880 and retainer plug 890 at the ends of the mull joint connecting the fenestration units 802 and 804.

Further, a similar transfer of loads from fenestration unit 902 to fenestration unit 904 (which is attached to a rough opening through corner gusset 970) occurs through mull joint connections between the joining strips 920 and 930, retainer plug bracket 980, corner gusset 970, and retainer plug 990 at the ends of a mull joint connecting fenestration units 902 and 904 as discussed in connection with, e.g., FIGS. 52-58.

Figure 62:
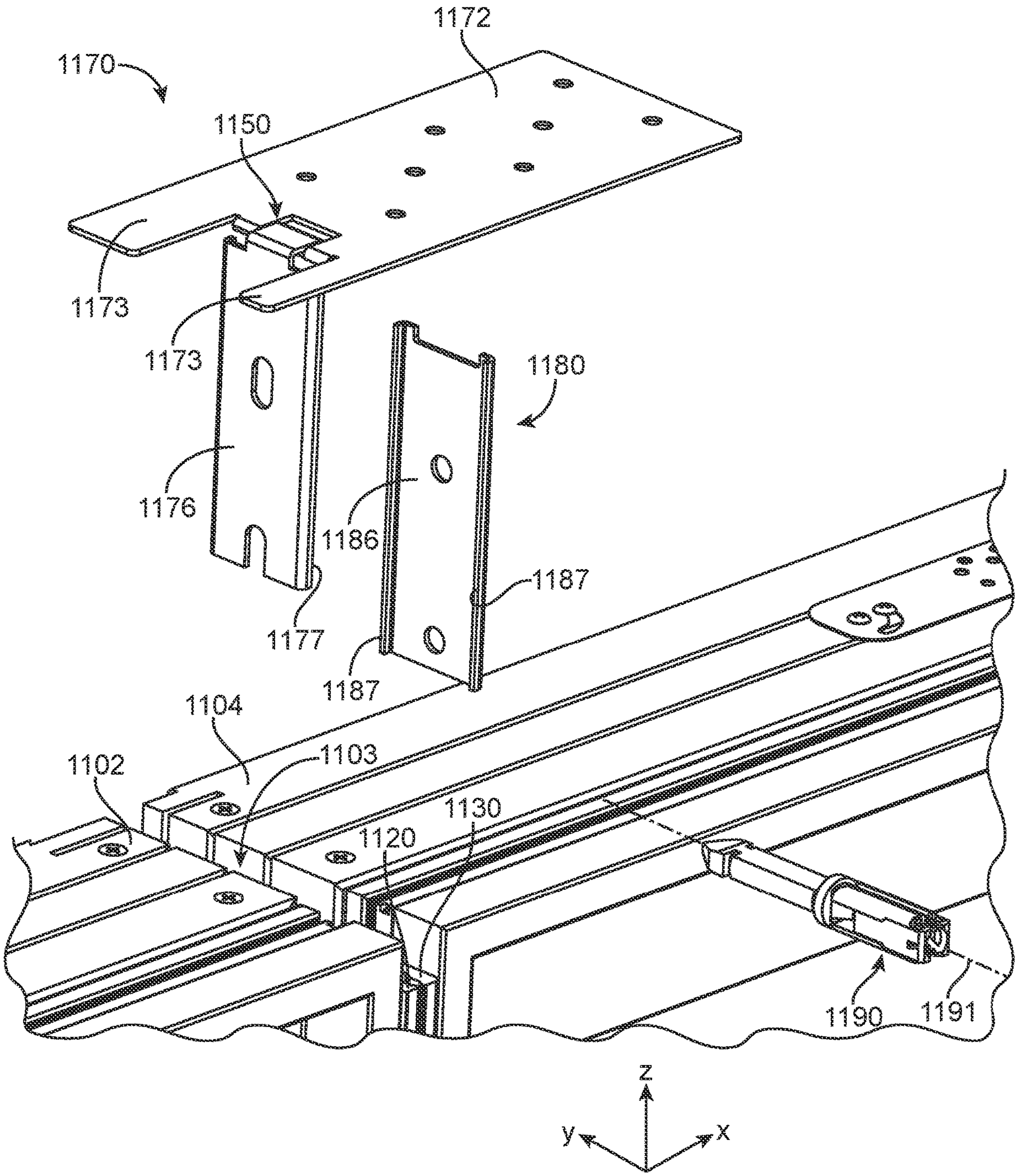
FIG. 62 is an exploded perspective view of another alternative embodiment of a corner gusset assembly including an adjustable corner gusset along with another alternative embodiment of a retainer plug that may be used in connection with the corner gusset assemblies described herein.

FIG. 62 is a perspective view of a portion of a pair of fenestration units 1102 and 1104 positioned next to each other and an exploded assembly view of another illustrative embodiment of a corner gusset assembly. Unlike other corner gusset assemblies described herein, the corner gusset assembly depicted in FIG. 62 is adjustable to allow for limited movement of the fenestration units 1102 and 1104 along the separation axis (aligned with the x-axis in FIG. 62) within an opening after assembly of the corner gusset assembly.

The depicted embodiment of the corner gusset assembly includes one illustrative embodiment of an adjustable corner gusset 1170 and a retainer plug bracket 1180, along with another illustrative embodiment of a retainer plug 1190. The depicted components of the corner gusset assembly can be assembled with a mull joint formed between the fenestration units 1102 and 1104 using joining strips 1120 and 1130. The joining strips 1120 and 1130 may, in one or more embodiments, be the same as or similar to those used in connection with other illustrative embodiments of mull joints as described herein. In many respects, for example, the corner gusset assembly depicted in FIG. 62 is similar to the corner gusset assembly depicted in FIG. 52, as well as in FIGS. 38 and 45.

The illustrative embodiments of the corner gusset 1170 and retainer plug bracket 1180 are, as in other illustrative embodiments described herein, positioned such that the corner gusset leg 1176 and bracket 1186 are located on opposite sides of the retainer plug recess 1103 such that they face each other across the mull joint.

The corner gusset leg 1176 of corner gusset 1170 may, in one or more embodiments, include raised ribs 1177 that mate with slots formed in joining strip 1120 in the same manner as locator plates 40 mate with slots 25 in joining strips 20 as depicted in, e.g., FIGS. 3 and 5. Similarly, bracket leg 1186 may, in one or more embodiments, include raised ribs 1187 or other features which may mate with slots formed in joining strip 1130 in the same manner as locator plates 40 mate with slots 25 in joining strips 20 as depicted in, e.g., FIGS. 3 and 5.

The raised ribs 1177 on corner gusset leg 1176 and corresponding mating features on joining strip 1120 represent only one embodiment of features that may cooperate to fix the corner gusset leg 1176 in position along the interior/exterior axis of the mull joint (i.e., along the y-axis) relative to the frame member of the fenestration unit 1102 to restrict movement of the corner gusset 1170 along that interior/exterior axis. Similarly, the raised ribs 1187 on bracket leg 1186 and corresponding mating features on joining strip 1130 represent only one embodiment of features that may cooperate to fix the bracket leg 1186 in position along the interior/exterior axis of the mull joint relative to the frame member of the fenestration unit 1104 to restrict movement of the retainer plug bracket 1180 along that interior/exterior axis.

In one or more embodiments, fixing the position of the corner gusset leg 1176 along the interior/exterior axis relative to the frame member of the fenestration unit 1102 and fixing the position of the bracket leg 1186 along the interior/exterior axis relative to the frame member of the fenestration unit 1104 as described herein may assist in transferring forces exerted on the fenestration units 1102 and 1104 (e.g., wind loads, etc.) to the framing members defining the rough opening in which the fenestration units are located.

Although the ribs 1177 and 1187 and corresponding slots in joining strips 1120 and 1130 provide one example of complementary mating features configured to fix the position of the corner gusset 1170 and retainer plug bracket 1180 relative to the fenestration units 1102 and 1104, many other complementary mating structures could be used in place of those depicted in connection with the illustrative embodiment so long as they provide the function of fixing the corner gusset leg 1176 and bracket leg 1186 in position along the interior/exterior axis between the fenestration units 1102 and 1104. Other complementary mating structures could include, for example, slots or channels in the frame members of the fenestration units 1102 and 1104 (in which case, the ribs 1177 and 1187 may face in the opposite direction, i.e., away from the retainer plug recess and towards the frame members of the fenestration units 1102 and 1104 such that the ribs are positioned within the slots/channels in the fenestration unit frame members, etc.). Still other examples of complementary mating features could include pins that cooperate with slots or apertures, etc.

Although the illustrative embodiment of corner gusset 1170 includes a base plate 1172 and a corner gusset leg 1176 that are, in many respects, similar to the base plate and corner gusset leg of corner gusset 970 depicted in FIG. 52, the base plate 1172 and corner gusset leg 1176 form one illustrative embodiment of an adjustable corner gusset that allows for adjustment of the position of an attached fenestration unit (e.g., fenestration unit 1102) along the separation axis after the fenestration unit is located within an opening.

That adjustment is provided by the sliding junction 1150 formed between the corner gusset leg 1176 and the base plate 1172. In the depicted illustrative embodiment, the sliding junction 1150 includes a tab and slot, with the tab and the slot forming a tab and slot assembly between the corner gusset leg 1176 and the base plate 1172. In one or more embodiments, at least a portion of the tab of the tab and slot assembly is located in the slot. As a result, the tab and slot assembly of the sliding junction 1150 restricts movement of the corner gusset leg 1176 along the interior/exterior axis (i.e., the axis aligned with the y-axis in the depicted embodiment) while allowing the corner gusset leg 1176 to move along the separation axis such that the fenestration unit 1102 (and components thereof) are configured to move relative to the base plate 1172 along the separation axis while being restricted from movement relative to the base plate 1172 along the interior/exterior axis.

Although the tab of the illustrative embodiment of a sliding junction of an adjustable corner gusset depicted in, e.g., FIGS. 62-69 is a part of or extends from the corner gusset leg and the slot is provided in the base plate, that arrangement may be reversed in one or more alternative embodiments. In other words, the sliding junction may be formed by a tab extending from the base plate, with the tab being positioned in a slot formed in or extending from the corner bracket leg.

Restricting movement of the mull joint along the interior/exterior axis while allowing for movement along the separation axis may provide one or more advantages. Like other corner gusset assemblies described herein, the depicted illustrative embodiment of the corner gusset assembly depicted in FIG. 62 also provides for transfer of loads on the fenestration units along the interior/exterior axis (e.g., wind loads, etc.) to framing members surrounding the fenestration units.

Further, allowing for movement between the corner gusset leg 1176 and the base plate 1172 along the separation axis provides an opportunity for adjustment of the position of fenestration unit 1102 in an opening after the fenestration unit 1102 is located in the opening. Further, the position of mulled fenestration units 1102 and 1104 may also be adjusted within an opening after the fenestration units have been assembled in the opening. These adjustments are made possible without impacting the ability of the corner gusset assembly to transfer loads on the fenestration units along the interior/exterior axis as discussed herein.

Figure 63:
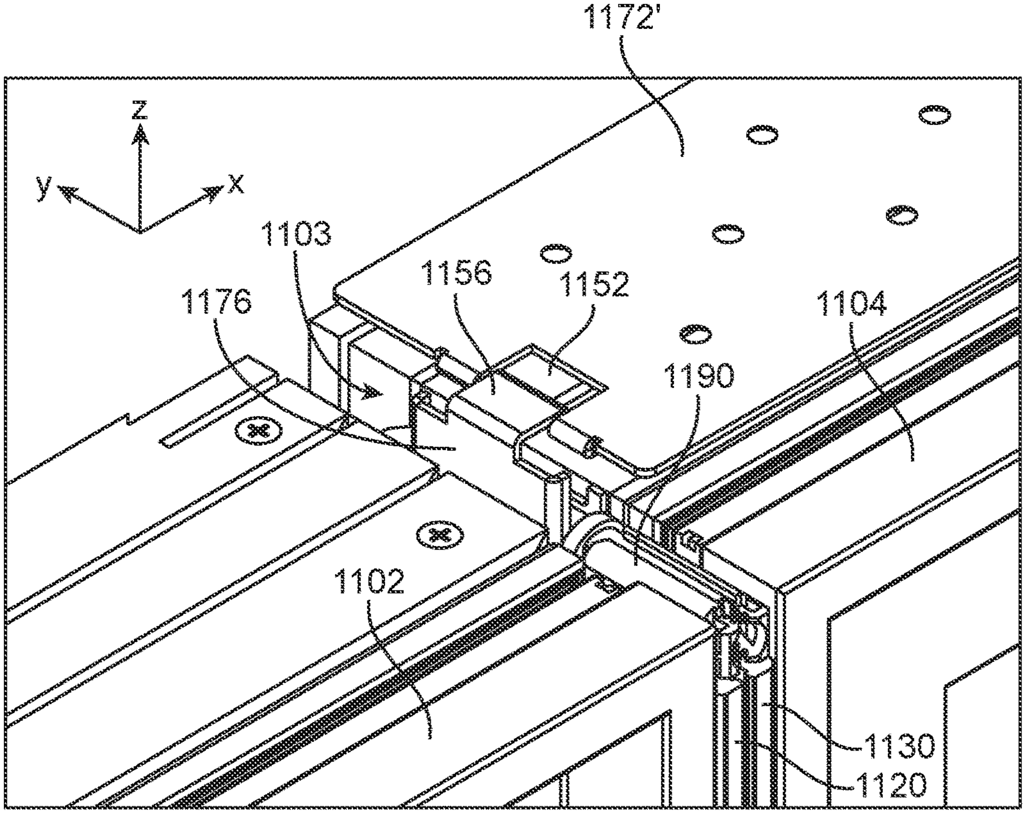
FIGS. 63-64 are perspective views of corner gusset assembly similar to the corner gusset assembly of FIG. 62 after assembly with the adjustable corner gusset in two different positions in FIGS. 63 and 64.
Figure 64:
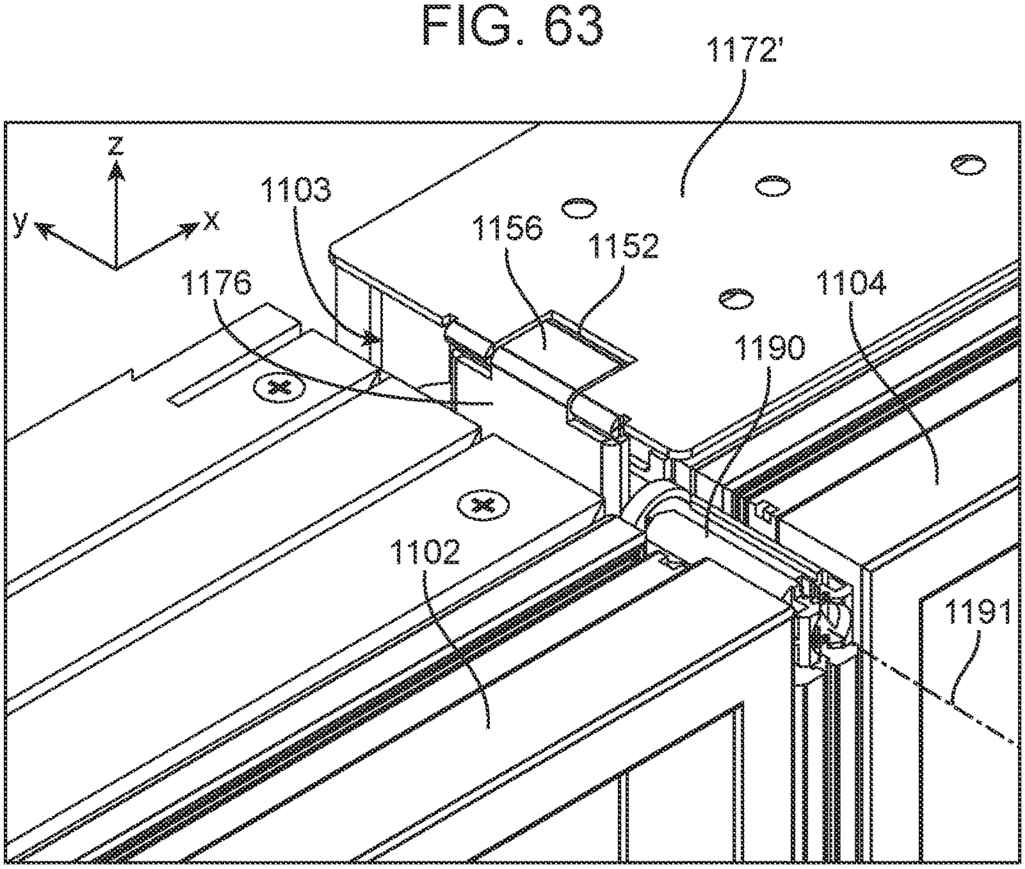

That adjustability along the separation axis is seen by comparing FIGS. 63-64, where another illustrative embodiment of a corner gusset assembly is depicted after installation on fenestration units 1102 and 1104. The corner gusset assembly depicted in FIGS. 63-64 includes a different base plate 1172' from the base plate 1172 depicted in FIG. 62. In particular, base plate 1172 includes a pair of optional extensions 1173 that may be positioned between fenestration unit 1102 and a framing member surrounding an opening to which base plate 1172 is attached. Alternative base plate 1172' does not include those extensions, but is, in all other respects, similar to the base plate 1172 depicted in FIG. 62.

As seen in FIGS. 63-64, the fenestration units 1102 and 1104 attached to each other by the mull joint formed using joining strips 1120 and 1130 along with retainer plug 1190 may be moved relative to the base plate 1172' along the separation axis. In particular, the fenestration units 1102 and 1104 are depicted in a leftmost position in FIG. 63 relative to the base plate 1172', while the fenestration units 1102 and 1104 are depicted after being shifted to the right relative to the base plate 1172' in FIG. 64. That movement can be seen in the changing relationship between the location of tab 1156 on corner gusset leg 1176 within slot 1152 provided in base plate 1172' between FIGS. 63 and 64.

Figure 67:
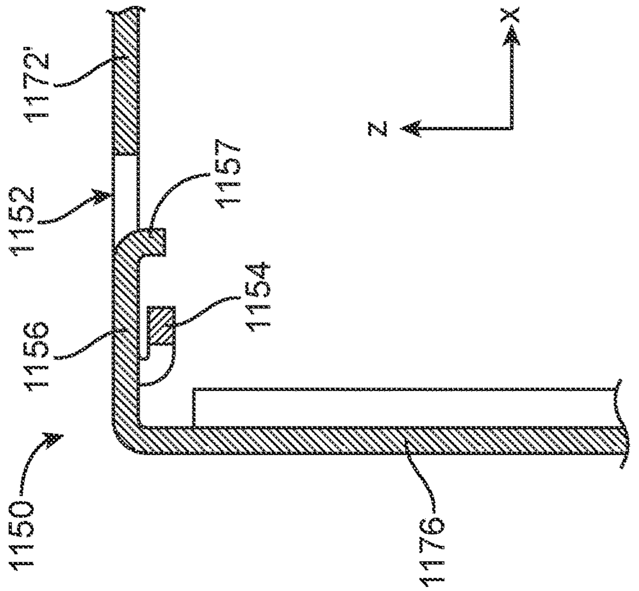
FIG. 67 is an enlarged cross-sectional view of a portion of the corner gusset assembly of FIG. 65 taken along line 67-67 in FIG. 65.
Figure 66:
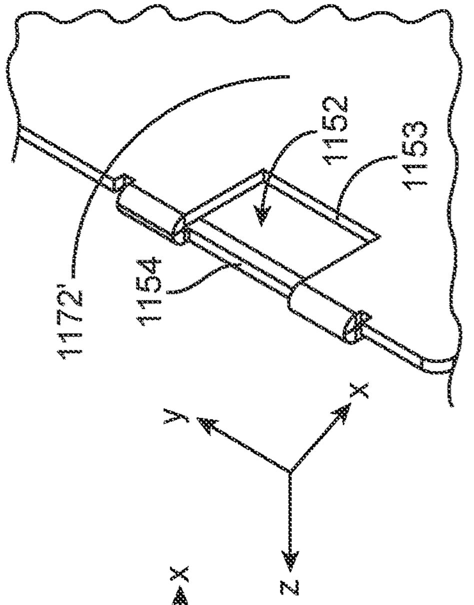
FIG. 66 is a perspective view of the base plate of the corner gusset assembly of FIG. 65.
Figure 65:
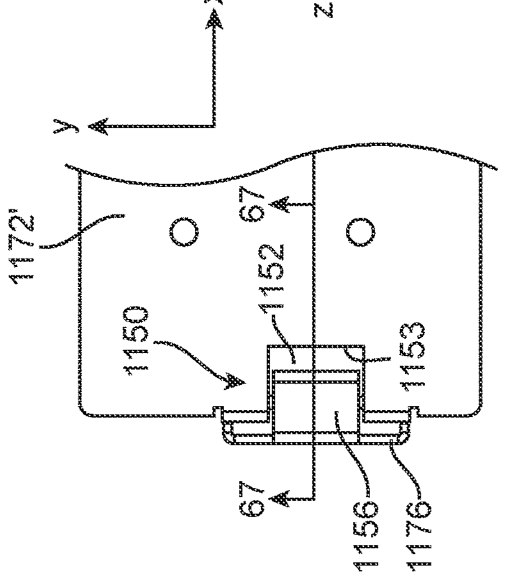
FIG. 65 is a top plan view of a portion of the corner gusset assembly of FIGS. 63-64.

Further details of the illustrative embodiment of the sliding junction provided between corner gusset leg 1176 and base plate 1172' are depicted in connection with FIGS. 65-67. In particular, FIG. 65 is a top plan view of the sliding junction 1150 between corner gusset leg 1176 and base plate 1172', while FIG. 66 is a perspective view of the slot 1152 formed and base plate 1172', and FIG. 67 is an enlarged cross-sectional view of the sliding junction 1150 taken along line 67-67 in FIG. 65.

Among the features depicted in this illustrative embodiment of a sliding junction formed between a corner gusset leg and a base plate of an adjustable corner gusset are the relationship between the width of the slot 1152 and the width of the tab 1156. In one or more embodiments, the slot width measured along the interior/exterior axis (i.e., the y-axis in the depicted views) may be greater than the tab width such that the tab 1156 can be received within the slot 1152. The slot width may, however, preferably not be too large relative to the tab width such that the sliding junction still functions to adequately restrict movement of the tab 1156 within the slot 1152 such that movement of the corner gusset leg 1176 relative to the base plate 1172' is also restricted. In one or more embodiments, the tab width may, for example, be equal to or greater than 0.5 times the slot width (alternatively, the tab width may be equal to or greater than 0.6 times the slot width, 0.7 times the slot width, 0.8 times the slot width, or 0.9 times the slot width).

As discussed herein, at least a portion of the tab is located in the slot to provide the desired restriction in movement between the tab and slot of the tab in slot assembly along the interior/exterior axis. Another feature depicted in the illustrative embodiment of the sliding junction of FIGS. 65-67 is the foot found at the distal end of tab 1156, with at least a portion of the foot extending along the separation axis (i.e., the x-axis in the depicted views) such that at least a portion of the tab 1156 is located in the slot 1152 to provide the desired restriction in movement between the tab and slot along the interior/exterior axis. In one or more embodiments, the foot of the tab 1156 may be described as being located in the same plane as the slot 1152 formed in the base plate 1172'

The foot of the tab 1156 may be described as having a foot length measured along the separation axis (i.e., the x-axis) while the slot 1152 may be described as having a slot depth also measured along the separation axis. In one or more embodiments, the foot length may be described as being equal to or less than the slot depth. In one or more alternatives, the foot length may be less than or equal to 0.5, 0.4, 0.3, 0.2, or 0.1 times the slot depth. Further, in one or more embodiments, the foot length may be described as being greater than a thickness of the joining strip used to secure the corner gusset leg on a fenestration unit as described herein (where the thickness of the joining strip is also measured along the separation axis).

In the depicted illustrative embodiment, the foot of the tab 1156 also includes an optional hook 1157 at its distal end, while the slot 1152 includes a catch 1154 located proximate the opening of the slot 1152. The catch 1154 may, in one or more embodiments, be described as closing the slot 1152 such that the slot 1152 and catch 1154 together form an aperture in the base plate 1172'.

In one or more embodiments in which the tab 1156 includes a hook and the slot 152 is in the form of an aperture formed in the base plate 1172', the hook and aperture may be described as defining a selected travel distance in two directions along the separation axis as the corner gusset leg 1176 moves relative to the base plate 1172'. The hook and aperture define a selected travel distance in two directions because the depth of the slot 1152 as defined by its bottom 1153 (see, e.g., FIGS. 66-67) provides a limit on movement in one direction along the separation axis, while interference between the hook 1157 and the catch 1154 provides a limit in the opposite direction along the separation axis.

Figure 68:
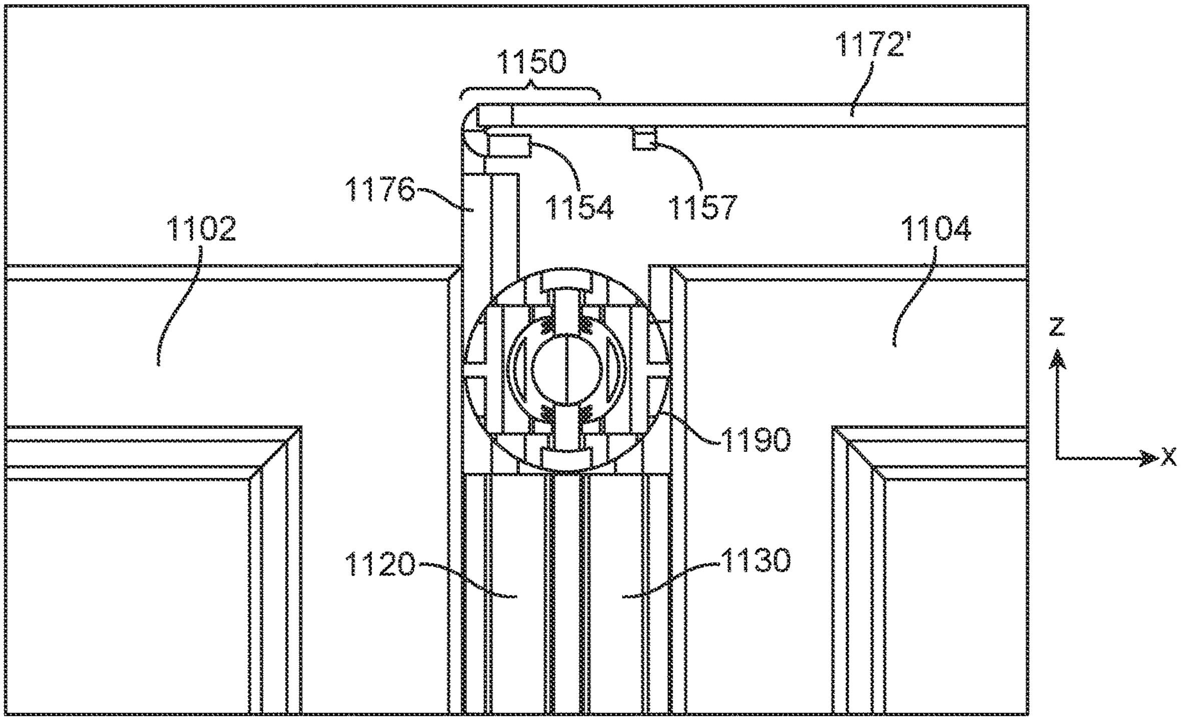
FIGS. 68-69 are enlarged views of the corner gusset assembly of FIG. 64, with FIG. 68 depicting the corner gusset leg and base plate being slightly raised relative to the fenestration units.
Figure 69:
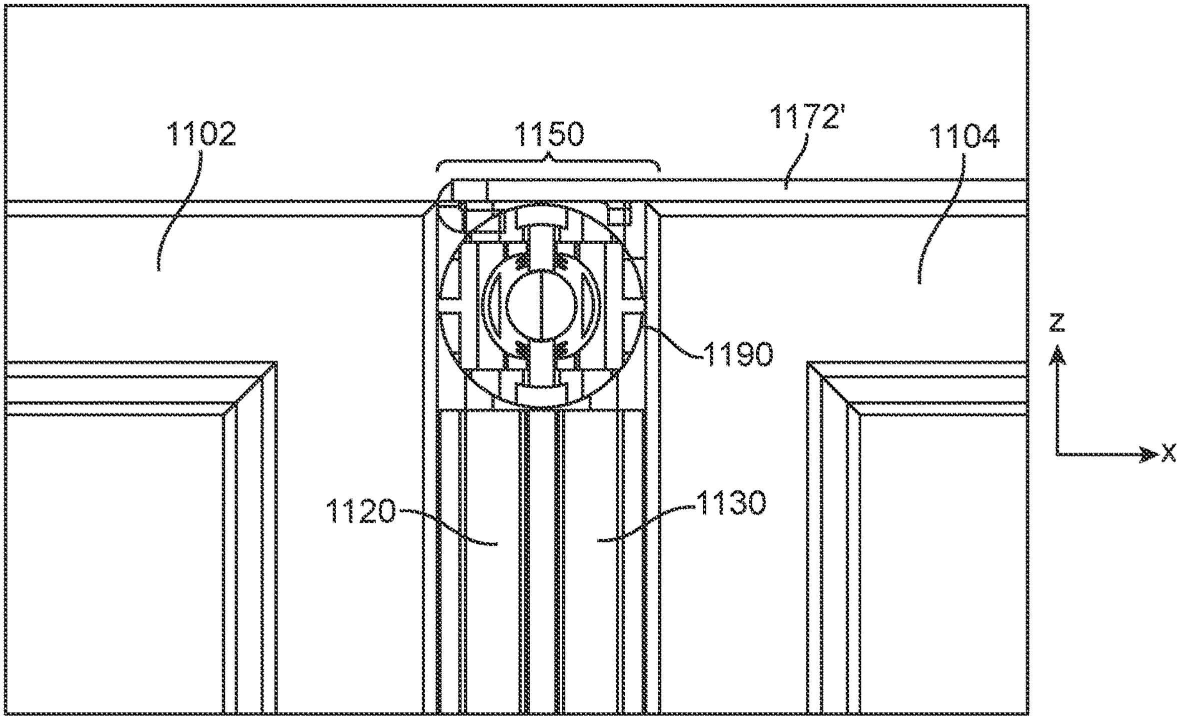

FIG. 68-69 depict the corner gusset assembly at the first end of the mull joint in an enlarged view taken along the interior/exterior axis (i.e., the y-axis). In particular, FIG. 68 depicts the corner gusset assembly with the corner gusset leg 1176 and base plate 1172' extended out of the mull joint formed between fenestration units 1102 and 1104 using joining strips 1120 and 1130. Hook 1157 and catch 1154 of the sliding junction 1150 are also depicted in this figure, along with retainer plug 1190. FIG. 69 depicts the corner gusset assembly of FIG. 68 with the corner gusset leg 1176 fully inserted in between the fenestration frame member of fenestration unit 1102 and joining strip 1120 while the base plate 1172' is positioned closer to the frame member of fenestration unit 1104.

Figure 70:
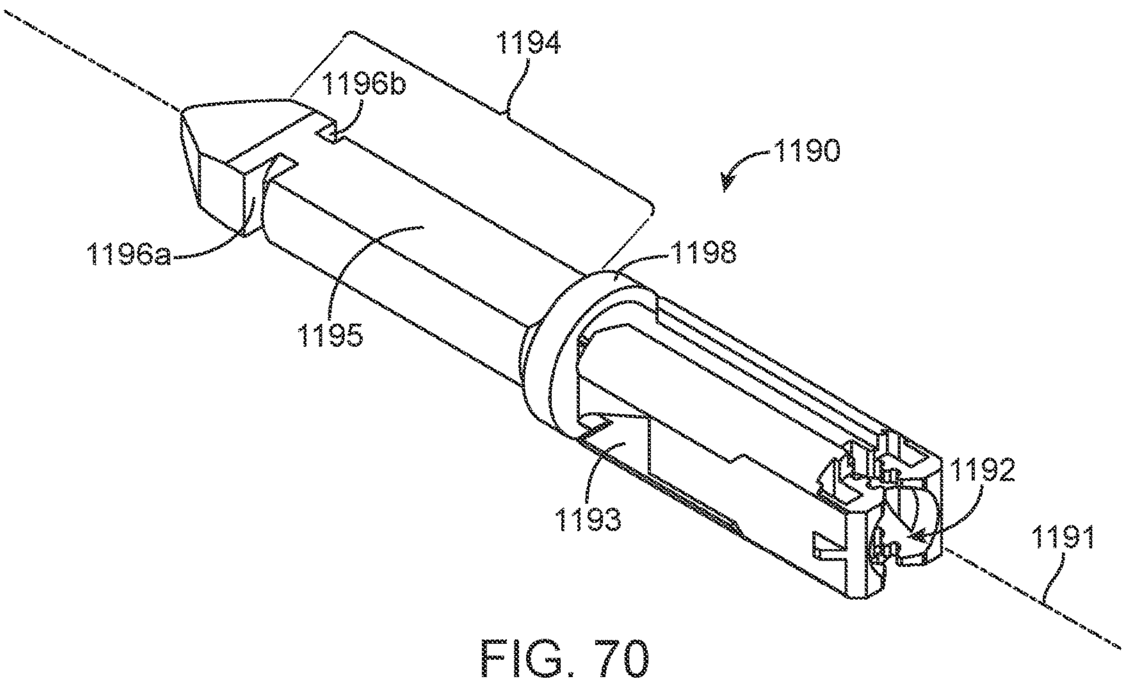
FIG. 70 is an enlarged perspective view of the alternative illustrative embodiment of the retainer plug depicted in FIG. 62.
Figure 71:
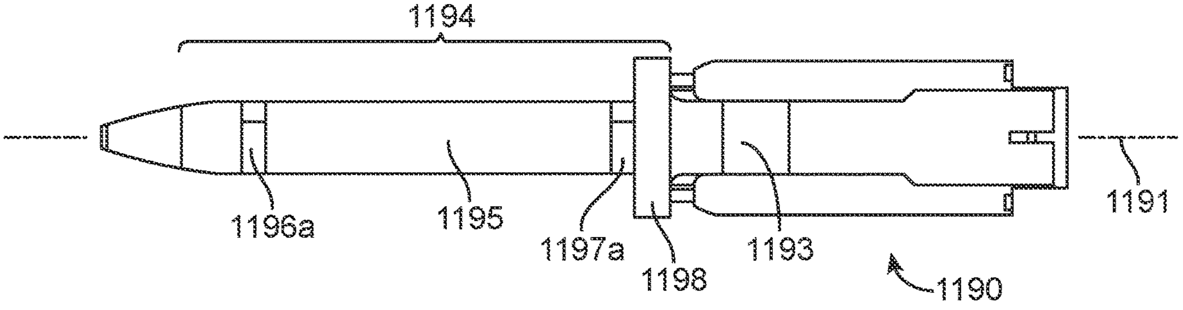
FIG. 71 is a plan view of the retainer plug of FIG. 70 with the retainer plug being positioned in its insertion orientation.
Figure 72:
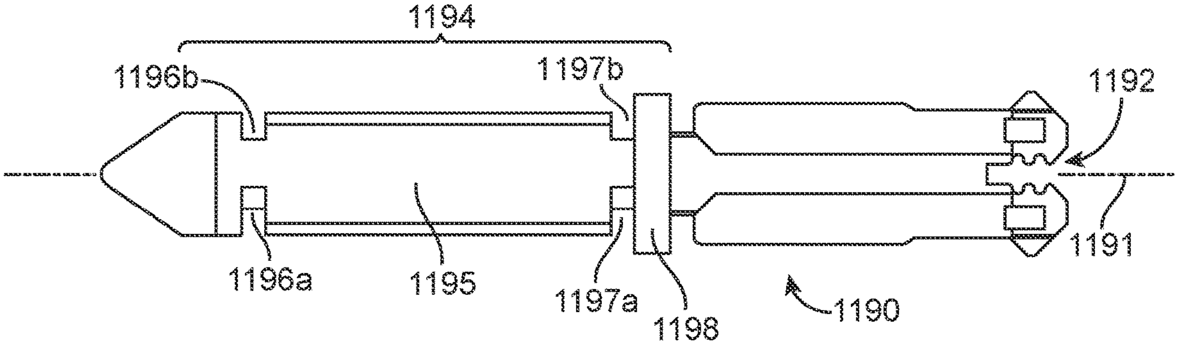
FIG. 72 is a plan view of the retainer plug of FIG. 70 with the retainer plug being positioned in its locked orientation.

The illustrative embodiment of retainer plug 1190 as seen in combination with the illustrative embodiment of a corner gusset assembly including an adjustable corner gusset as described herein may be used with or without an adjustable corner gusset. The illustrative embodiment of retainer plug 1190 is further detailed in FIGS. 70-72 and its interaction with features of a corner gusset assembly are depicted in connection with FIGS. 73-74.

While retainer plug 790 (depicted in, e.g., FIGS. 39-40 and 42-44), retainer plug 890 (depicted in, e.g., FIGS. 45-47), retainer plug 990 (depicted in, e.g., FIGS. 52 and 55-58), and retainer plug 1090 (depicted in, e.g., FIG. 61) are designed to be inserted into a retainer plug recess at the end of a mull joint and include components configured to expand to retain the retainer plug in position within the retainer plug recess without rotation of the retainer plug. The illustrative embodiment of retainer plug 1190 is, however, configured to be inserted into a retainer plug recess formed between fenestration units at an end of the mull joint in one rotational orientation (an insertion orientation) and, following insertion to a seated position, rotated within the retainer plug recess to a locked orientation in which the retainer plug mechanically interlocks with components that restrict movement of the first and second joining strips in a mull joint relative to each other along the interior/exterior axis that would result in disengagement of one or more channels on the joining strips from each other.

Similar to other illustrative embodiments of compound fenestration assemblies including mull joints as described herein, the corner gusset assembly at an end of the mull joint may include a retainer plug recess 1103, with the retainer plug recess 1103 located between frame members of the fenestration units 1102 and 1104 and proximate the ends of the first and second joining strips 1120 and 1130 used to form that mull joint.

The corner gusset assembly may, with reference to, e.g., FIG. 62, further include a retainer plug bracket 1180 attached to fenestration unit 1104 position opposite fenestration unit 1102 across the mull joint formed between the fenestration units 1102 and 1104. In a manner similar to that described herein with respect to other embodiments of retainer plug brackets, the retainer plug bracket 1180 may include a bracket leg 1186 positioned between the joining strip 1130 and a frame member of the fenestration unit 1104 at the end of the mull joint formed between fenestration units 1102 and 1104. The bracket leg 1186 is fixed in position along the interior/exterior axis (i.e., the y-axis) relative to the frame of the fenestration unit 1104 to restrict movement of the retainer plug bracket 1180 along the interior/exterior axis.

A retainer plug may be seated in the retainer plug recess 1103, with the retainer plug mechanically interlocking with both the corner gusset leg 1176 and the bracket leg 1186 when the retainer plug is in a seated position and a locked orientation in the retainer plug recess. The mechanical interlock between the retainer plug and both the corner gusset leg 1176 and the bracket leg 1186 restricts movement of the joining strips 1120 and 1130 relative to each other along the interior/exterior axis (i.e., the y-axis) that would result in disengagement of the channels on the joining strips from each other (as described in connection with other embodiments of joining strips described herein).

Although the corner gusset assembly depicted in FIGS. 62-65, 68-69, and 73-74 uses the illustrative embodiment of retainer plug 1190 to provide the mechanical interlocking structures needed to restrict movement of the joining strips 1120 and 1130 (and their respective attached fenestration units 1102 and 1104) relative to each other along the interior/exterior axis, other retainer plugs may be used in place of the depicted retainer plug 1190 (with appropriate adaptation of their respective interlocking features).

The illustrative embodiment of retainer plug 1190 defines a retainer plug axis 1191 that extends along the length of the retainer plug 1190, with the retainer plug axis 1191 being generally aligned with the interior/exterior axis (i.e., the y-axis) when the retainer plug 1190 is in its seated position within the retainer plug recess 1103.

With reference to, e.g., FIGS. 70-74, the illustrative embodiment of retainer plug 1190 may include an optional sealant port 1192 that is in communication with a sealant reservoir in a manner similar to that described above with respect to other illustrative embodiments of retainer plugs as described herein. Sealant introduced into the sealant reservoir through the optional sealant port 1192 may exit from that reservoir through apertures 1193 in the retainer plug 1190 such that the sealant can provide an additional level of fixation as well as sealing the mull joint around the retainer plug 1190.

Figure 73:
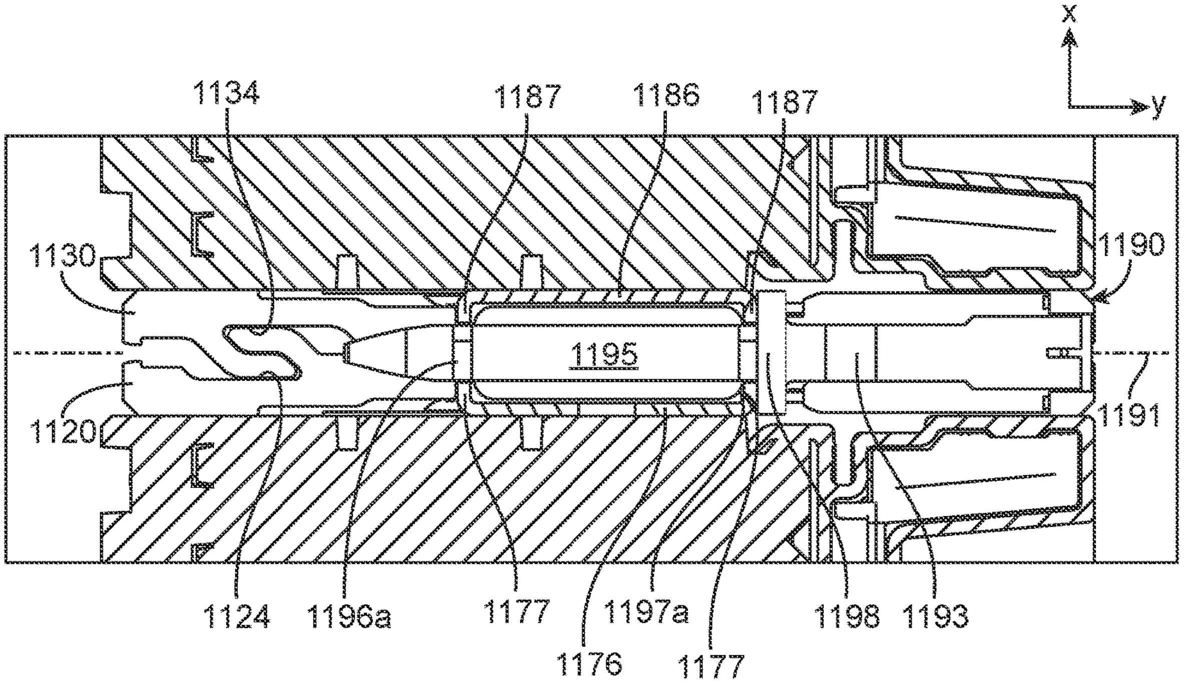
FIG. 73 is a plan view of the retainer plug of FIG. 70 located in the mull joint of FIG. 63 with the retainer plug in its insertion orientation and with the view being taken from above the retainer plug recess and the tab 1156 removed to depict the relationship between the retainer plug, corner gusset leg, and bracket leg as well as the frame members of the fenestration units being attached across the mull joint.
Figure 74:
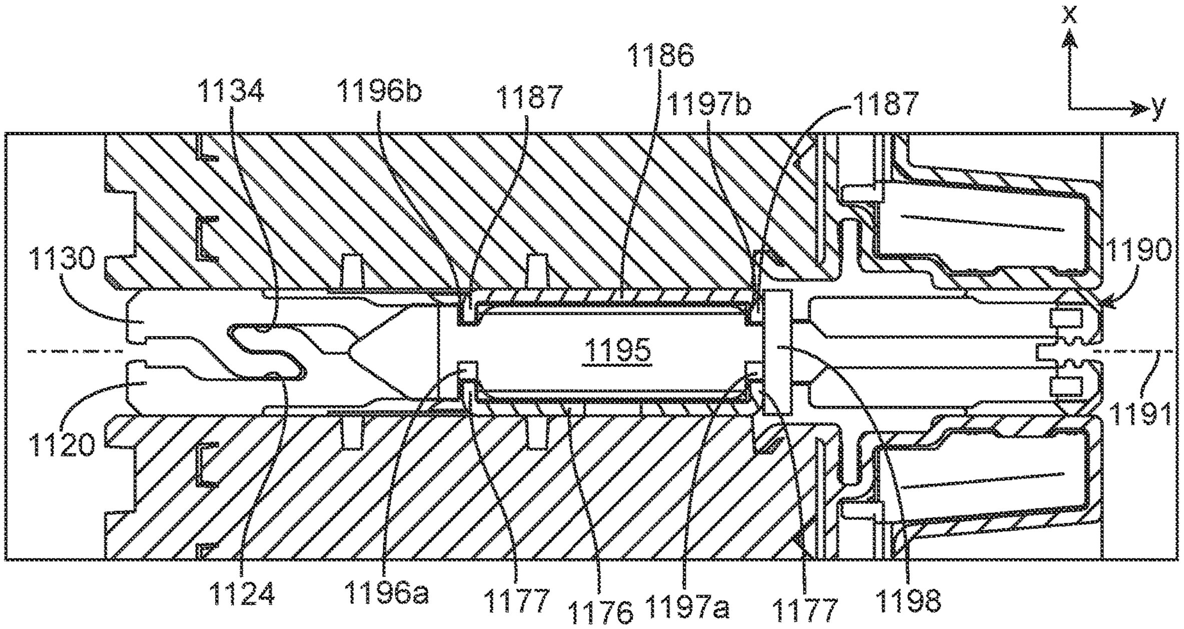
FIG. 74 depicts the components of FIG. 73 after rotating the retainer plug to its locked orientation

The illustrative embodiment of retainer plug 1190 includes a locking section 1194 positioned between the corner gusset leg 1176 and the bracket leg 1186 when the retainer plug 1190 is in the seated position within the retainer plug recess 1103 as seen in, e.g., FIGS. 73-74. In one or more embodiments, the corner gusset leg 1176 and the bracket leg 1186 may be positioned directly across from each other on opposite sides of the retainer plug recess 1103 (see, e.g., FIGS. 73-74).

The locking section 1194 of the illustrative embodiment of retainer plug 1190 includes a stem 1195 that extends along the retainer plug axis 1191. The locking section 1194 of the illustrative embodiment of retainer plug 1190 also includes a pair of channels 1196*a* and 1196*b* (referred to in common as channels 1196 herein) that are formed into the stem 1195, with the channels 1196 being formed into the stem 1195 transverse to the retainer plug axis 1191. The pair of channels 1196 is, in one or more embodiments, located between the corner gusset leg 1176 and the bracket leg 1186 when the retainer plug 1190 is in its seated position. Also in one or more embodiments, the pair of channels 1196 may be described as being located on opposite sides of the stem in a direction transverse to the retainer plug axis 1191.

The stem 1195 of the locking section 1194 of the illustrative embodiment of retainer plug 1190 also includes a second pair of channels 1197*a* and 1197*b* (referred to in common as channels 1197 herein) that are formed into the stem 1195, with the channels 1197 being formed into the stem 1195 transverse to the retainer plug axis 1191. The pair of channels 1197 is, in one or more embodiments, located between the corner gusset leg 1176 and the bracket leg 1186 when the retainer plug 1190 is in its seated position. Also in one or more embodiments, the pair of channels 1197 may be described as being located on opposite sides of the stem in a direction transverse to the retainer plug axis 1191.

When the retainer plug 1190 is in its locked orientation in the seated position within the retainer plug recess 1103 as seen in, e.g., FIG. 74, channel 1196*a* is in engagement with the corner gusset leg 1176 to form a mechanical interlock and channel 1196*b* is in engagement with the bracket leg 1186 to form a mechanical interlock. In the depicted illustrative embodiment, one mechanical interlock is formed between a rib 1177 on the corner gusset leg 1176 and channel 1196*a* and another mechanical interlock is formed between rib 1187 on the bracket leg 1186 and channel 1196*b*.

When the retainer plug 1190 is in its locked orientation in the seated position within the retainer plug recess as seen in, e.g., FIG. 74, embodiments of a retainer plug 1190 that include a second pair of channels 1197 may include a mechanical interlock formed between channel 1197*a* and corner bracket leg 1176, as well as a mechanical interlock formed between channel 1197*b* and bracket leg 1186. In the depicted illustrative embodiment, one mechanical interlock formed by the second pair of channels is formed between a rib 1177 on the corner gusset 1176 and channel 1197*a* and another mechanical interlock is formed between a rib 1187 on the bracket leg 1186 and channel 1197*b*.

Although pairs of channels 1196 and 1197 are referred to herein as first and second pairs, it should be understood that the identification of those pairs of channels could be reversed, i.e., the pair of channels 1196 could be referred to as the second pair of channels and the pair of channels 1197 could be referred to as the first pair of channels. Furthermore, although two pairs of channels 1196 and 1197 are depicted in connection with illustrative embodiment of retainer plug 1190, it should be understood that as few as one pair of channels could be provided on a retainer plug as described herein and, further, three or more pairs of channels could be provided on a retainer plug (with, e.g., appropriate structure to form mechanical interlocks between the retainer plug, corner bracket leg, and bracket leg as needed).

As depicted in FIG. 74 and as discussed above in connection with the various mechanical interlocks formed between the channels, corner gusset leg and bracket leg, the illustrative embodiment of retainer plug 1190 as a locked orientation in which those mechanical interlocks are formed. With reference to FIG. 73, however, the retainer plug 1190 also has an insertion orientation in which the channels formed into the stem 1195 of the locking section 1194 of the locking section 1194 do not engage the corner bracket leg 1176 or the bracket leg 1186. In that insertion orientation, the locking section 1194 can be advanced between the corner bracket leg 1176 and the bracket leg 1186 to position the channels between appropriate structure on those legs.

In optional feature depicted in connection with the illustrative embodiment of retainer plug 1190 is the positioning flange 1198 located adjacent the stem 1195 of the retainer plug 1190. In the depicted illustrative embodiment, the positioning flange 1198 is located adjacent pair of channels 1197. In embodiments of a retainer plug including a positioning flange such as, e.g., illustrative embodiment of retainer plug 1190, the positioning flange 1198 may a bot at least one of the corner gusset leg 1176 and the bracket leg 1186 when the retainer plug 1190 is in the seated position in the retainer plug recess with the stem 1195 of the retainer plug 1190 located between the corner gusset leg 1176 and the bracket leg 1186.

Rotation of the retainer plug 1190 around the retainer plug axis 1191, however, rotates the channels into engagement with features on the legs 1176 and 1186 of the corner bracket assembly. Correspondingly, rotation of the retainer plug 1190 around the retainer plug axis 1191 in the opposite direction rotates those channels out of engagement with features on the legs 1176 and 1186 of the corner bracket assembly. As a result, although the orientation of retainer plug 1190 as seen in, e.g., FIG. 73, may be referred to as an insertion orientation, the retainer plug 1190 may also be removed from the retainer plug recess 1103 when the retainer plug 1190 is in its insertion orientation (assuming that no other fixation of the retainer plug 1190 in the retainer plug recess 1103 is present (e.g., sealant, mechanical fasteners, etc.).

Another feature depicted in the pairs of channels 1196 and 1197 on illustrative embodiment of retainer plug 1190 are the asymmetry within each pair of channels. For example, channels 1196*a* and 1196*b* are not symmetrical with each other on opposite sides of a z-y plane containing retainer plug axis 1191. Additionally, channels 1197*a* and 1197*b* are also not symmetrical with each other on opposite sides of a z-y plane containing retainer plug axis 1191. That asymmetry provides a mechanical stop along with tactile feedback for a user rotating the retainer plug 1190 from the insertion orientation of FIG. 73 to the locked orientation of FIG. 74.

Although the depicted illustrative embodiment of retainer plug 1190 includes pairs of channels located on opposite sides of the stem 1195, in one or more alternative embodiments, a retainer plug used in one or more embodiments of a corner gusset assembly as described herein may include as few as one channel and a positioning flange located adjacent the stem of the retainer plug. Described in connection with the various features depicted in illustrative embodiment of retainer plug 1190, for example, only channel 1196*a* could be provided on the stem 1195 along with positioning flange 1198. Rotation of the retainer plug 1190 into its locked orientation as seen in, e.g., FIG. 74 would cause the channel 1196*a* to form a mechanical interlock with the corner gusset leg 1176, thus locking retainer plug 1190 in position relative to corner gusset leg 1176. Positioning flange 1198 would prevent bracket leg 1186 from moving to the left along the interior/exterior axis (i.e., the y-axis) in FIG. 74, thereby preventing joining strip 1130 from moving to the left along the interior/exterior axis such that the interlocking channels 1124/1134 in joining strips 1120 and 1130 could disengage from each other. A similar result could be provided by a retainer plug 1190 including only channel 1197*a* or by including both channels 1196*a* and 1197*a*.

Figure 75:
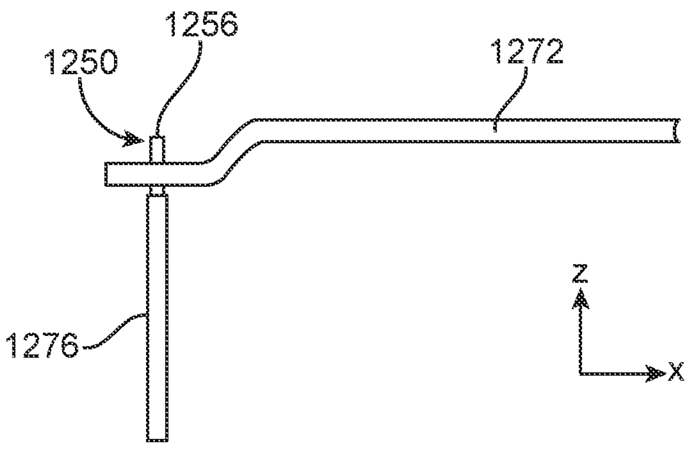
FIGS. 75-77 depict another alternative embodiment of an adjustable corner gusset as described herein in side elevation, top plan, and end views.
Figure 76:
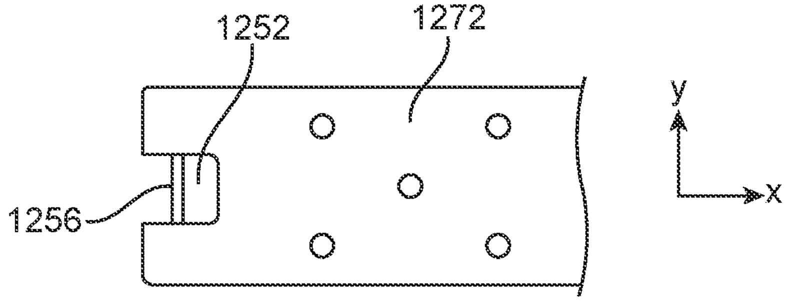
Figure 77:
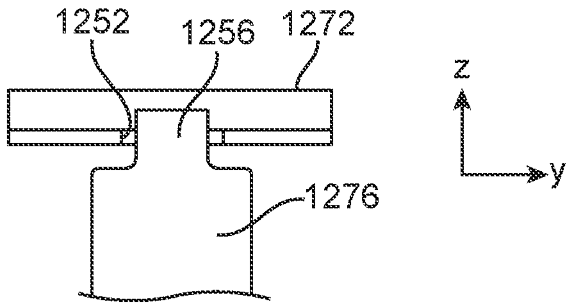

Various alternative embodiments of sliding junctions formed between corner gusset legs and base plates of adjustable corner gussets that could be used in corner gusset assemblies as described herein are depicted in FIGS. 75-78. For example, FIGS. 75-77 depicts one embodiment including a base plate 1272 and a corner gusset leg 1276. The sliding junction 1250 formed between the corner gusset leg 1276 and the base plate 1272 includes a slot 1252 and tab 1256 extending upward along the z-axis from the corner gusset leg 1276. As a result, movement of the corner gusset leg 1276 relative to the base plate 1272 along an interior/exterior axis (i.e., the y-axis in FIGS. 75-77) is restricted due to interference between the tab 1256 and the slot 1252, while movement of the corner gusset leg 1276 and its tab 1256 relative to the base plate 1272 along the separation axis (i.e., the x-axis in FIGS. 75-77) is allowed.

Figure 78:
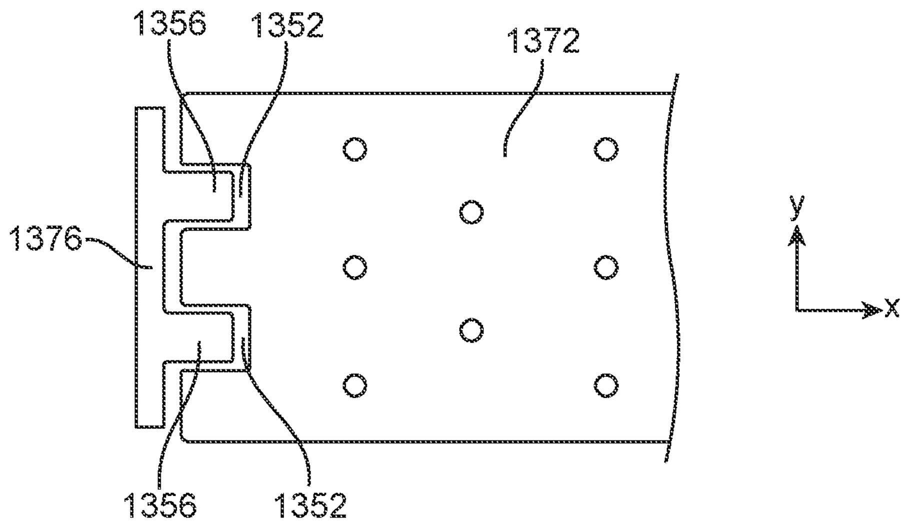
FIG. 78 depicts another alternative embodiment of an adjustable corner gusset as described herein.

The illustrative embodiment of an adjustable corner gusset as depicted in FIG. 78 demonstrates the concept that, although various illustrative embodiments of adjustable corner gussets described herein may include only a single tab and slot combination forming a sliding junction, sliding junctions may include two or more tab and slot assemblies. The depicted illustrative embodiment of FIG. 78 includes a pair of slots 1352 and corresponding pair of tabs 1356 attached to a corner gusset leg 1376. As a result, movement of the corner gusset leg 1376 relative to the base plate 1372 along an interior/exterior axis (i.e., the y-axis in FIG. 78) is restricted due to interference between the tabs 1356 and the slots 1352, while movement of the corner gusset leg 1376 and its tabs 1376 relative to the base plate 1372 along the separation axis (i.e., the x-axis in FIG. 78) is allowed.

Figure 79:
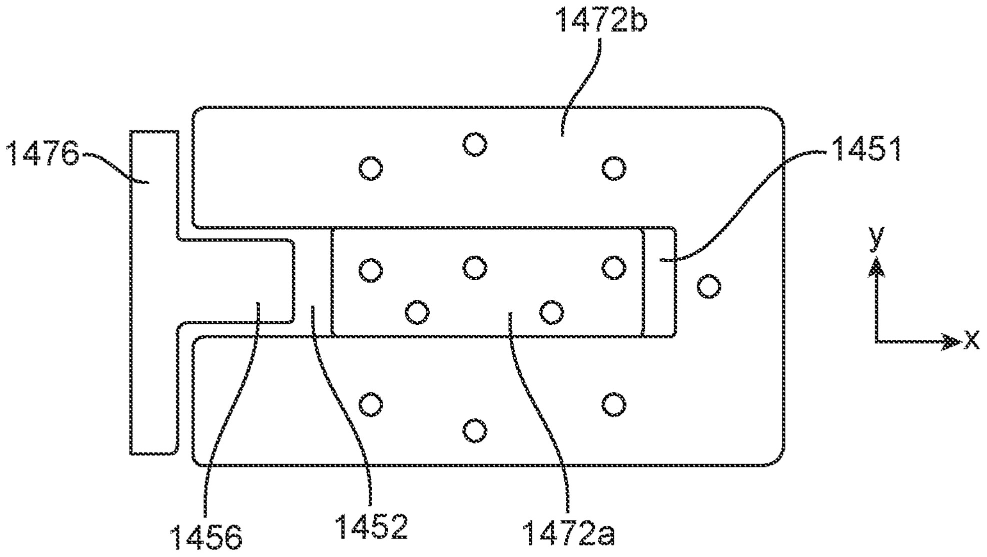
FIG. 79 depicts another alternative embodiment of an adjustable corner gusset as described herein.

Still another alternative embodiment of an adjustable corner gusset that may be used in one or more embodiments of a corner gusset assembly used in a compound fenestration assembly as described herein is depicted in FIG. 79. This alternative embodiment depicts the concept that although described as a single unitary article, a base plate used in an adjustable corner gusset may be provided in two or more components which, together, form a slot capable of restricting movement along an interior/exterior axis while allowing movement along a separation axis as described herein. In particular, the depicted illustrative embodiment of the adjustable corner gusset of FIG. 79 includes a base plate formed by components 1472*a* and 1472*b*. Slot 1452 is provided by components 1472*a* and 1472*b*, with a tab 1456 attached to a corner gusset leg 1476 positioned in the slot 1452 in a manner similar to that described herein with respect to other illustrative embodiments of sliding junctions provided in adjustable corner gussets as described herein.

One potential use for a multicomponent base plate may be in the adjustment of the depth of slot 1452 in which tab 1456 is positioned. In particular, in her component 1472*a* may be moved within an outer component 1472*b* to change the depth of slot 1452. In the depicted embodiment, space 1451 at the end of component 1472*a* opposite slot 1452 provides for adjustability in the depth of slot 1452. For example, components 1472*a* and 1472*b* could be moved relative to each other along the separation axis (i.e., the x-axis in FIG.

79) to increase the depth of slot 1452 or, conversely, to decrease the depth of slot 1452.

The mulling system components described herein may be constructed of any suitable material or combination of materials e.g., metal, wood, plastic, fiberglass, etc.

Alternative Embodiments

The following alternative embodiments of compound fenestration assemblies methods are also described herein.

Embodiment 1. A compound fenestration assembly comprising:

- a first frame member of a first fenestration unit attached to a second frame member of a second fenestration unit along a mull joint having a first end and a second end,
  - wherein the mull joint defines a mull joint axis extending along a length of the mull joint between the first and second ends of the mull joint,
  - wherein the first and second frame members comprise exterior sides facing in the same direction and interior sides facing in an opposite direction from the exterior sides, wherein an interior/exterior axis extends between the interior and exterior sides in a direction transverse to the mull joint axis,
  - wherein the first frame member faces the second frame member across the mull joint, wherein a separation axis extends through the mull joint between the first and second frame members, the separation axis extending in a direction transverse to both the mull joint axis and the interior/exterior axis;
- a first joining strip attached to the first frame member of the first fenestration unit, the first joining strip comprising a first end proximate the first end of the mull joint, wherein the first joining strip comprises a channel aligned with the mull joint axis, the channel opening towards the exterior side of the first fenestration unit;
- a second joining strip attached to the second frame member of the second fenestration unit, the second joining strip comprising a first end proximate the first end of the mull joint, wherein the second joining strip comprises a channel aligned with the mull joint axis, the channel opening towards the interior side of the second fenestration unit such that the channel on the first joining strip mechanically interlocks with the channel on the second joining strip, wherein the mechanically interlocking channels prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis;
- a retainer plug recess at the first end of the mull joint, the retainer plug recess located between the first frame member of the first fenestration unit and the second frame member of the second fenestration unit;
- a corner gusset assembly at the first end of the mull joint, the corner gusset assembly comprising:
  - a corner gusset attached to the first fenestration unit, wherein the first corner gusset comprises:
    - a corner gusset leg positioned between the first joining strip and the first frame member of the first fenestration unit at the first end of the mull joint, wherein the corner gusset leg is fixed in position along the interior/exterior axis relative to the first frame member of the first fenestration unit to restrict movement of the corner gusset along the interior/exterior axis, and
    - a base plate attached to the corner gusset leg and extending away from a corner of the first fenestration unit proximate the first end of the mull joint, wherein the base plate extends away from the first fenestration unit in a direction aligned with the separation axis, wherein base plate is configured for attachment to an interior surface of an opening in which the first fenestration unit is located, and wherein the retainer plug recess is located between the base plate and the first ends of the first and second joining strips proximate the first end of the mull joint; and
  - a retainer plug bracket attached to the second fenestration unit, wherein the retainer plug bracket comprises:
    - a bracket leg positioned between the second joining strip and the second frame member of the second fenestration unit at the first end of the mull joint, wherein the bracket leg is fixed in position along the interior/exterior axis relative to the second frame member of the second fenestration unit to restrict movement of the retainer plug bracket along the interior/exterior axis;
- a retainer plug seated in the retainer plug recess, wherein the retainer plug mechanically interlocks with both the corner gusset leg and the bracket leg when the retainer plug is in a seated position in the retainer plug recess, wherein the mechanical interlock between the retainer plug and both the corner gusset leg and the bracket leg restricts movement of the first and second joining strips relative to each other along the interior/exterior axis that would result in disengagement of the channels on the first and second joining strips from each other.

Embodiment 2. An assembly according to embodiment 1, wherein the corner gusset leg and the bracket leg are located directly opposite from each other on opposite sides of the retainer plug recess along the separation axis.

Embodiment 3. An assembly according to embodiment 1, wherein the retainer plug bracket comprises a retainer plug guide attached to the bracket leg, wherein the retainer plug guide extends away from the second fenestration unit in a direction aligned with the separation axis, and wherein the retainer plug recess is located between the retainer plug guide and the first ends of the first and second joining strips proximate the first end of the mull joint, and further wherein the retainer plug guide is located between the base plate of the corner gusset and the retainer plug recess.

Embodiment 4. An assembly according to embodiment 1, wherein the retainer plug comprises a locking section positioned between the corner gusset leg and the bracket leg when the retainer plug is in the seated position, the locking section comprising a compressed configuration and an expanded configuration, wherein a width of the locking section as measured between the first and second fenestration units along the separation axis is larger in the expanded configuration than in the compressed configuration, and wherein the locking section of the retainer plug mechanically interlocks with the corner gusset leg and the bracket leg.

Embodiment 5. An assembly according to embodiment 4, wherein the locking section is configured to move from the expanded configuration to the compressed configuration as the retainer plug is advanced into the retainer plug recess in a first direction along the interior/exterior axis towards the seated position.

Embodiment 6. An assembly according to embodiment 5, wherein the locking section is configured to move from the compressed configuration to the expanded configuration when the retainer plug reaches the seated position after moving from the expanded configuration to the compressed configuration as the retainer plug is advanced in the first direction towards the seated position.

Embodiment 7. An assembly according to embodiment 5, wherein the locking section of the retainer plug mechanically interlocks with both the corner gusset leg and the bracket leg when the retainer plug is in the seated position and the locking section is in the expanded configuration, and wherein the mechanical interlock between the locking section and the corner gusset leg and the bracket leg restricts movement of the retainer plug out of the seated position in a second direction along the interior/exterior axis, wherein the first direction is opposite the second direction.

Embodiment 8. An assembly according to embodiment 4, wherein the locking section of the retainer plug mechanically interlocks with both the corner gusset leg and the bracket leg when the retainer plug is in the seated position and the locking section is in the expanded configuration.

Embodiment 9. An assembly according to embodiment 1, wherein the retainer plug comprises a wing attached to a stem located between the corner gusset leg and the bracket leg, wherein the wing extends from a first end attached to the stem to a second end distal from the first end, wherein the wing is biased away from the stem such that the second end of the wing moves away from the stem in the absence of a force acting on the wing in a direction towards the stem.

Embodiment 10. An assembly according to embodiment 9, wherein the retainer plug comprises a sealant port in fluid communication with a sealant reservoir positioned between the first and second frame members and the first ends of the first and second joining strips, and wherein the stem is attached to the sealant reservoir and extends away from the sealant reservoir along the interior/exterior axis when the retainer plug is in the seated position.

Embodiment 11. An assembly according to embodiment 9, wherein the second end of the wing mechanically interlocks with one of the corner gusset leg or the bracket leg when the retainer plug is in the seated position in the retainer plug recess.

Embodiment 12. An assembly according to embodiment 9, wherein the second end of the wing is configured to move towards the stem as the retainer plug is advanced into the retainer plug recess in a first direction along the interior/exterior axis towards the seated position in the retainer plug recess.

Embodiment 13. An assembly according to embodiment 12, wherein the second end of the wing is configured to move away from the stem when the retainer plug reaches the seated position after the second end of the wing moves toward the stem as the retainer plug is advanced towards the seated position.

Embodiment 14. An assembly according to embodiment 12, wherein the second end of the wing mechanically interlocks with one of the corner gusset leg and the bracket leg when the retainer plug is in the seated position in the retainer plug recess, and wherein the mechanical interlock between the second end of the wing and one of the corner gusset leg and the bracket leg restricts movement of the retainer plug out of the seated position in a second direction along the interior/exterior axis, wherein the first direction is opposite the second direction.

Embodiment 15. An assembly according to embodiment 9, wherein the wing comprises a first wing and wherein the retainer plug comprises a second wing attached to the stem, wherein the second wing is located between the corner gusset leg and the bracket leg, wherein the second wing extends from a first end attached to the stem to a second end distal from the first end, wherein the second wing is biased away from the stem such that the second end of the second wing moves away from the stem in the absence of a force acting on the second wing in a direction towards the stem.

Embodiment 16. An assembly according to embodiment 15, wherein the second end of the first wing mechanically interlocks with the corner gusset leg when the retainer plug is in the seated position in the retainer plug recess, and wherein the second end of the second wing mechanically interlocks with the bracket leg when the retainer plug is in the seated position in the retainer plug recess.

Embodiment 17. An assembly according to embodiment 15, wherein the second end of the second wing is configured to move towards the stem as the retainer plug is advanced into the retainer plug recess in a first direction along the interior/exterior axis towards the seated position in the retainer plug recess.

Embodiment 18. An assembly according to embodiment 17, wherein the second end of the second wing is configured to move away from the stem when the retainer plug reaches the seated position after the second end of the second wing moves toward the stem as the retainer plug is advanced towards the seated position.

Embodiment 19. An assembly according to embodiment 17, wherein the second end of the first wing mechanically interlocks with the corner gusset leg when the retainer plug is in the seated position in the retainer plug recess, and wherein the second end of the second wing mechanically interlocks with the bracket leg when the retainer plug is in the seated position in the retainer plug recess, and wherein the mechanical interlock between the second end of the first wing and the corner gusset leg and the mechanical interlock between the second end of the second wing and the bracket leg restrict movement of the retainer plug out of the seated position in a second direction along the interior/exterior axis, wherein the first direction is opposite the second direction.

Embodiment 20. An assembly according to embodiment 1, wherein the first frame member of the first fenestration unit is shorter than the second frame member of the second fenestration unit, and wherein the first joining strip comprises a length measured along the mull joint axis that is shorter than a length of the second joining strip along measured along the mull joint axis.

Embodiment 21. An assembly according to embodiment 1, wherein the retainer plug comprises a sealant port in fluid communication with a sealant reservoir positioned between the first and second frame members and the first ends of the first and second joining strips.

Embodiment 22. An assembly according to embodiment 21, wherein the sealant reservoir is located between the corner gusset leg and the exterior sides of the first and second frame members of the first and second fenestration units.

Embodiment 23. An assembly according to embodiment 21, wherein the sealant reservoir comprises an exterior end proximate the exterior sides of the first and second frame members of the first and second fenestration units, and the sealant port comprises an exterior sealant port opening in the exterior end of the sealant reservoir, the exterior sealant port opening towards the exterior sides of the first and second frame members of the first and second fenestration units.

Embodiment 24. An assembly according to embodiment 21, wherein the sealant reservoir comprises an exterior end proximate the exterior sides of the first and second frame members of the first and second fenestration units, and wherein the sealant port comprises an intermediate sealant port located between the exterior end of the sealant reservoir and the corner gusset leg, the intermediate port facing away from the first ends of the first and second joining strips.

Embodiment 25. A compound fenestration assembly comprising:

a first frame member of a first fenestration unit attached to a second frame member of a second fenestration unit along a mull joint having a first end and a second end, wherein the mull joint defines a mull joint axis extending along a length of the mull joint between the first and second ends of the mull joint, wherein the first and second frame members comprise exterior sides facing in the same direction and interior sides facing in an opposite direction from the exterior sides, wherein an interior/exterior axis extends between the interior and exterior sides in a direction transverse to the mull joint axis, wherein the first frame member faces the second frame member across the mull joint, wherein a separation axis extends through the mull joint between the first and second frame members, the separation axis extending in a direction transverse to both the mull joint axis and the interior/exterior axis;

a first joining strip attached to the first frame member of the first fenestration unit, the first joining strip comprising a first end proximate the first end of the mull joint, wherein the first joining strip comprises a channel aligned with the mull joint axis, the channel opening towards the exterior side of the first fenestration unit;

a second joining strip attached to the second frame member of the second fenestration unit, the second joining strip comprising a first end proximate the first end of the mull joint, wherein the second joining strip comprises a channel aligned with the mull joint axis, the channel opening towards the interior side of the second fenestration unit such that the channel on the first joining strip mechanically interlocks with the channel on the second joining strip, wherein the mechanically interlocking channels prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis;

a retainer plug recess at the first end of the mull joint, the retainer plug recess located between the first frame member of the first fenestration unit and the second frame member of the second fenestration unit;

a corner gusset assembly at the first end of the mull joint, the corner gusset assembly comprising:

a corner gusset attached to the first fenestration unit, wherein the first corner gusset comprises:

a corner gusset leg positioned between the first joining strip and the first frame member of the first fenestration unit at the first end of the mull joint, wherein the corner gusset leg is fixed in position along the interior/exterior axis relative to the first frame member of the first fenestration unit to restrict movement of the corner gusset along the interior/exterior axis, and a base plate attached to the corner gusset leg and extending away from a corner of the first fenestration unit proximate the first end of the mull joint, wherein the base plate extends away from the first fenestration unit in a direction aligned with the separation axis, wherein base plate is configured for attachment to an interior surface of an opening in which the first fenestration unit is located, and wherein the retainer plug recess is located between the base plate and the first ends of the first and second joining strips proximate the first end of the mull joint; and a retainer plug bracket attached to the second fenestration unit, wherein the retainer plug bracket comprises:

a bracket leg positioned between the second joining strip and the second frame member of the second fenestration unit at the first end of the mull joint, wherein the bracket leg is fixed in position along the interior/exterior axis relative to the second frame member of the second fenestration unit to restrict movement of the retainer plug bracket along the interior/exterior axis;

a retainer plug seated in the retainer plug recess, wherein the retainer plug mechanically interlocks with both the corner gusset leg and the bracket leg when the retainer plug is in a seated position in the retainer plug recess, wherein the mechanical interlock between the retainer plug and both the corner gusset leg and the bracket leg restricts movement of the first and second joining strips relative to each other along the interior/exterior axis that would result in disengagement of the channels on the first and second joining strips from each other;

wherein the corner gusset leg and the bracket leg are located directly opposite from each other on opposite sides of the retainer plug recess along the separation axis;

wherein the retainer plug comprises a locking section positioned between the corner gusset leg and the bracket leg when the retainer plug is in the seated position, the locking section comprising a compressed configuration and an expanded configuration, wherein a width of the locking section as measured between the first and second fenestration units along the separation axis is larger in the expanded configuration than in the compressed configuration;

and wherein the locking section of the retainer plug mechanically interlocks with both the corner gusset leg and the bracket leg when the retainer plug is in the seated position and the locking section is in the expanded configuration.

Embodiment 26. A method of forming a mull joint in a compound fenestration assembly, the method comprising:

attaching a first joining strip to a first frame member of a first fenestration unit, wherein the first joining strip comprises a channel, wherein the channel is aligned with a mull joint axis and opens towards an exterior side of the first fenestration unit, wherein the mull joint axis is aligned with the length of the first frame member along one side of the first fenestration unit;

attaching a second joining strip to a second frame member of a second fenestration unit, wherein the second joining strip comprises a channel, wherein the channel is aligned with the mull joint axis and opens towards an interior side of the second fenestration unit;

aligning the first frame member of the first fenestration unit with the second frame member of the second fenestration unit into alignment with each other such that an exterior side of the second fenestration unit is aligned with the exterior side of the first fenestration unit and an interior side of the first fenestration is aligned with the interior side of the second fenestration unit, and wherein the aligning mechanically interlocks the channel on the first joining strip with the channel on the second joining strip, wherein the mechanically interlocked channels prevent movement of the first frame member away from the second frame member along a separation axis extending through the first and second frame members and the first and second joining strips in a direction transverse to the mull joint axis;

locking the first fenestration unit in position relative to the second fenestration unit after mechanically interlocking the channels on the first and second joining strips by one or more of:

inserting a retainer plug into a retainer plug recess provided at one end of the first and second joining strips, wherein the retainer plug recess is formed between the first frame member of the first fenestration unit and the second frame member of the second fenestration unit, wherein the retainer plug forms a mechanical interlock between the first and second fenestration units;

inserting a cavity leg of a first end plug in an opening of an intermediate end plug cavity, wherein the intermediate end plug cavity is formed between the first joining strip and the second joining strip when the channels on the first and second joining strips are mechanically interlocked with each other, wherein the cavity leg prevents disengagement of the mechanically interlocking channels on the first and second joining strips at the first ends of first and second joining strips;

inserting a trim strip into a trim slot formed between the first and second joining strips, the trim slot being located between the first frame member of the first fenestration unit and the second frame member of the second fenestration unit.

Embodiment 27. A method according to embodiment 26, wherein the first joining strip extends over a majority of the length of the first frame member and the second joining strip extends over a majority of the length of the second frame member.

Embodiment 28. A method according to embodiment 26, wherein the channel of the first joining strip extends along the entire length of the of the first joining strip and wherein the channel of the second joining strip extends along the entire length of the of the second joining strip.

Embodiment 29. A method according to embodiment 26, wherein the mull joint comprises a first end proximate a first end of the first joining strip and a first end of the first frame member of the first fenestration unit and a second end proximate a second end of the second joining strip and a second end of the second frame member of the second fenestration unit, and wherein the method comprises:

positioning the compound fenestration assembly in an opening;

attaching the first end of the mull joint to a first side of the opening in which the compound fenestration assembly is located; and attaching the second end of the mull joint to a second side of the opening in which the compound fenestration assembly is located, wherein the second side is located opposite from the first side such that the first fenestration unit and the second fenestration unit span the opening along the mull joint between the first and second sides.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of fenestration mulling systems and methods are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A compound fenestration assembly comprising:

a first frame member of a first fenestration unit attached to a second frame member of a second fenestration unit along a mull joint having a first end and a second end, wherein the mull joint defines a mull joint axis extending along a length of the mull joint between the first and second ends of the mull joint, wherein the first and second frame members comprise exterior sides facing in the same direction and interior sides facing in an opposite direction from the exterior sides, wherein an interior/exterior axis extends between the interior and exterior sides in a direction transverse to the mull joint axis, wherein the first frame member faces the second frame member across the mull joint, wherein a separation axis extends through the mull joint between the first and second frame members, the separation axis extending in a direction transverse to both the mull joint axis and the interior/exterior axis;

a first joining strip attached to the first frame member of the first fenestration unit, the first joining strip comprising a first end proximate the first end of the mull joint and a second end proximate the second end of the mull joint, wherein the first joining strip comprises a pair of channels extending along the length of the first frame member, wherein each channel of the pair of channels is aligned with the mull joint axis and opens towards the exterior side of the first fenestration unit; and a second joining strip attached to the second frame member of the second fenestration unit, the second joining strip comprising a first end proximate the first end of the mull joint and a second end proximate the second end of the mull joint, wherein the second joining strip comprises a pair of channels extending along the length of the second frame member, wherein each channel of the pair of channels on the second joining strip is aligned with the mull joint axis and opens towards the interior side of the second fenestration unit such that each channel of the pair of channels on the first joining strip mechanically interlocks with one channel of the pair of channels on the second joining strip to form two sets of interlocking channels, wherein the mechanically interlocking channels prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis;

wherein the two sets of interlocking channels are aligned with each other along the interior/exterior axis;

and wherein, when the first joining strip and the second joining strip are assembled to form the two sets of interlocking channels, a thickness of the first joining strip and the second joining strip as measured between the first frame member and the second frame member along the separation axis at a first set of the two sets of interlocking channels is the same as the thickness of the first joining strip and the second joining strip as measured between the first frame member and the second frame member along the separation axis at a second set of the two sets of interlocking channels.

2. An assembly according to claim 1, wherein, when the first joining strip and the second joining strip are assembled to form the two sets of interlocking channels, a combined thickness of the first joining strip and the second joining strip as measured between the first frame member and the second frame member along the separation axis at a first set of the two sets of interlocking channels is less than twice a sum of a thickness of the first joining strip plus a thickness of the second joining strip as measured along the separation axis in the first set of the two sets of interlocking channels.

3. An assembly according to claim 1, wherein the first and second joining strips are separate and discrete lengths of a common profile.

4. An assembly according to claim 1, wherein the first and second joining strips consist essentially of one or more non-metallic materials.

5. An assembly according to claim 1, wherein the first joining strip extends over a majority of the length of the first frame member and the second joining strip extends over a majority of the length of the second frame member.

6. An assembly according to claim 1, wherein the pair of channels of the first joining strip extend along the entire length of the of the first joining strip and wherein the pair of channels of the second joining strip extend along the entire length of the of the second joining strip.

7. An assembly according to claim 1, wherein the interior and exterior sides of the first and second frame members define a frame depth along the interior/exterior axis, and wherein the mechanically interlocking channels on the first and second joining strips are positioned such that a bottom of the channel on the first joining strip that is closest to the interior side of the first frame member is located within 20% or less of the frame depth from the interior side of the first frame member and a bottom of the channel on the second joining strip that is closest to the exterior side of the second frame member is located within 20% or less of the frame depth from the exterior side of the second frame member.

8. An assembly according to claim 1, wherein the interior and exterior sides of the first and second frame members define a frame depth along the interior/exterior axis, and wherein the mechanically interlocking channels on the first and second joining strips are positioned such that a bottom of the channel on the first joining strip that is closest to the interior side of the first frame member is located within 15% or less of the frame depth from the interior side of the first frame member and a bottom of the channel on the second joining strip that is closest to the exterior side of the second frame member is located within 15% or less of the frame depth from the exterior side of the second frame member.

9. A compound fenestration assembly comprising:

a first frame member of a first fenestration unit attached to a second frame member of a second fenestration unit along a mull joint having a first end and a second end, wherein the mull joint defines a mull joint axis extending along a length of the mull joint between the first and second ends of the mull joint, wherein the first and second frame members comprise exterior sides facing in the same direction and interior sides facing in an opposite direction from the exterior sides, wherein an interior/exterior axis extends between the interior and exterior sides in a direction transverse to the mull joint axis, wherein the first frame member faces the second frame member across the mull joint, wherein a separation axis extends through the mull joint between the first and second frame members, the separation axis extending in a direction transverse to both the mull joint axis and the interior/exterior axis;

a first joining strip attached to the first frame member of the first fenestration unit, the first joining strip comprising a first end proximate the first end of the mull joint and a second end proximate the second end of the mull joint, wherein the first joining strip comprises a pair of channels extending along the length of the first frame member, wherein each channel of the pair of channels is aligned with the mull joint axis and opens towards the exterior side of the first fenestration unit; and a second joining strip attached to the second frame member of the second fenestration unit, the second joining strip comprising a first end proximate the first end of the mull joint and a second end proximate the second end of the mull joint, wherein the second joining strip comprises a pair of channels extending along the length of the second frame member, wherein each channel of the pair of channels on the second joining strip is aligned with the mull joint axis and opens towards the interior side of the second fenestration unit such that each channel of the pair of channels on the first joining strip mechanically interlocks with one channel of the pair of channels on the second joining strip to form two sets of interlocking channels, wherein the mechanically interlocking channels prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis;

wherein the two sets of interlocking channels are aligned with each other along the interior/exterior axis;

wherein, when the first joining strip and the second joining strip are assembled to form the two sets of interlocking channels, a thickness of the first joining strip and the second joining strip as measured between the first frame member and the second frame member along the separation axis at a first set of the two sets of interlocking channels is the same as a thickness of the first joining strip and the second joining strip as measured between the first frame member and the second frame member along the separation axis at a second set of the two sets of interlocking channels;

and wherein, when the first joining strip and the second joining strip are assembled to form the two sets of interlocking channels, a combined thickness of the first joining strip and the second joining strip as measured between the first frame member and the second frame member along the separation axis at a first set of the two sets of interlocking channels is less than twice a sum of a thickness of the first joining strip plus a thickness of the second joining strip as measured along the separation axis in the first set of the two sets of interlocking channels.

10. An assembly according to claim 9, wherein the first and second joining strips are separate and discrete lengths of a common profile.

11. An assembly according to claim 9, wherein the first and second joining strips consist essentially of one or more non-metallic materials.

12. An assembly according to claim 9, wherein the first joining strip extends over a majority of the length of the first frame member and the second joining strip extends over a majority of the length of the second frame member.

13. An assembly according to claim 9, wherein the pair of channels of the first joining strip extend along the entire length of the of the first joining strip and wherein the pair of channels of the second joining strip extend along the entire length of the of the second joining strip.

14. An assembly according to claim 9, wherein the interior and exterior sides of the first and second frame members define a frame depth along the interior/exterior axis, and wherein the mechanically interlocking channels on the first and second joining strips are positioned such that a bottom of the channel on the first joining strip that is closest to the interior side of the first frame member is located within 20% or less of the frame depth from the interior side of the first frame member and a bottom of the channel on the second joining strip that is closest to the exterior side of the second frame member is located within 20% or less of the frame depth from the exterior side of the second frame member.

15. A method of forming a mull joint, the method comprising:

attaching a first joining strip to a first frame member of a first fenestration unit, wherein the first joining strip comprises a pair of channels extending along a length of the first frame member, wherein each channel of the pair of channels is aligned with a mull joint axis and opens towards an exterior side of the first fenestration unit, wherein the mull joint axis is aligned with the length of the first frame member along one side of the first fenestration unit;

attaching a second joining strip to a second frame member of a second fenestration unit, wherein the second joining strip comprises a pair of channels extending along the length of the second frame member, wherein each channel of the pair of channels on the second joining strip is aligned with the mull joint axis and opens towards an interior side of the second fenestration unit; and aligning the first frame member of the first fenestration unit with the second frame member of the second fenestration unit into alignment with each other such that an exterior side of the second fenestration unit is aligned with the exterior side of the first fenestration unit and an interior side of the first fenestration is aligned with the interior side of the second fenestration unit, and wherein the aligning mechanically interlocks each channel of the pair of channels on the first joining strip with one channel of the pair of channels on the second joining strip to form two sets of interlocking channels, wherein the mechanically interlocked channels prevent movement of the first frame member away from the second frame member along a separation axis extending through the first and second frame members and the first and second joining strips in a direction transverse to the mull joint axis, wherein the two sets of interlocking channels are aligned with each other along the interior/exterior axis;

wherein, when the first joining strip and the second joining strip are assembled to form the two sets of interlocking channels, a thickness of the first joining strip and the second joining strip as measured between the first frame member and the second frame member along the separation axis at a first set of the two sets of interlocking channels is the same as the thickness of the first joining strip and the second joining strip as measured between the first frame member and the second frame member along the separation axis at a second set of the two sets of interlocking channels.

16. A method according to claim 15, wherein, when the first joining strip and the second joining strip are assembled to form the two sets of interlocking channels, a combined thickness of the first joining strip and the second joining strip as measured between the first frame member and the second frame member along the separation axis at a first set of the two sets of interlocking channels is less than twice a sum of a thickness of the first joining strip plus a thickness of the second joining strip as measured along the separation axis in the first set of the two sets of interlocking channels.

17. A method according to claim 15, wherein the first joining strip extends over a majority of the length of the first frame member and the second joining strip extends over a majority of the length of the second frame member.

18. A method according to claim 15, wherein the pair of channels of the first joining strip extend along the entire length of the of the first joining strip and wherein the pair of channels of the second joining strip extend along the entire length of the of the second joining strip.

19. An assembly according to claim 1, wherein the first and second joining strips are separate and discrete lengths of a common profile, and wherein the first joining strip extends over a majority of the length of the first frame member and the second joining strip extends over a majority of the length of the second frame member.

20. An assembly according to claim 9, wherein the first and second joining strips are separate and discrete lengths of a common profile, and wherein the first joining strip extends over a majority of the length of the first frame member and the second joining strip extends over a majority of the length of the second frame member.

* * * * *